(12) United States Patent
Takahashi

(10) Patent No.: US 9,804,373 B2
(45) Date of Patent: Oct. 31, 2017

(54) DECENTERED OPTICAL SYSTEM, IMAGE PROJECTION APPARATUS INCORPORATING A DECENTERED OPTICAL SYSTEM, AND IMAGING APPARATUS INCORPORATING A DECENTERED OPTICAL SYSTEM

(71) Applicant: OLYMPUS CORPORATION, Tokyo (JP)

(72) Inventor: Koichi Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 102 days.

(21) Appl. No.: 14/878,095

(22) Filed: Oct. 8, 2015

(65) Prior Publication Data

US 2016/0103306 A1 Apr. 14, 2016

(30) Foreign Application Priority Data

Oct. 8, 2014 (JP) .................................. 2014-207380
Oct. 8, 2014 (JP) .................................. 2014-207381

(51) Int. Cl.
*G09G 5/00* (2006.01)
*G02B 17/08* (2006.01)
*G02B 27/01* (2006.01)

(52) U.S. Cl.
CPC ....... *G02B 17/0816* (2013.01); *G02B 17/086* (2013.01); *G02B 27/0103* (2013.01); *G02B 27/0172* (2013.01); *G02B 2027/0105* (2013.01); *G02B 2027/0174* (2013.01); *G02B 2027/0178* (2013.01); *G02B 2027/0194* (2013.01)

(58) Field of Classification Search
CPC .............. G02B 17/0816; G02B 17/086; G02B 17/0103; G02B 17/0172; G02B 2027/0105; G02B 2027/0174; G02B 2027/0178; G02B 2027/0194
See application file for complete search history.

(56) References Cited

U.S. PATENT DOCUMENTS 5,745,295 A * 4/1998 Takahashi .......... G02B 17/0816
                                                                         359/621
6,643,062 B1 * 11/2003 Kamo .................... G02B 13/22
                                                                         359/431

(Continued)

FOREIGN PATENT DOCUMENTS

| JP | 9-146037 | 6/1997 |
| JP | 2002-318366 | 10/2002 |
| JP | 2013-29704 | 2/2013 |

*Primary Examiner* — Peter D McLoone
(74) *Attorney, Agent, or Firm* — Andrews Kurth Kenyon LLP

(57) ABSTRACT

The first optical element 10 and the second optical element 20 are spaced away from each other in an effective area through which a light beam passes, and satisfy the following condition (1):

$$0 < D_{MAX}/f \leq 0.3 \qquad (1)$$

where $D_{MAX}$ is the maximum value of a distance as measured in the effective area through which the light beam passes on a section including a center chief ray of the light beam in a direction parallel with the center chief ray between the second surface 12 of the first optical element 10 and the first surface 21 of the second optical element 20, and f is the focal length of the decentered optical system 1.

33 Claims, 42 Drawing Sheets

(56) References Cited

U.S. PATENT DOCUMENTS

| | | | | |
|---|---|---|---|---|
| 8,529,072 B2* | 9/2013 | Maeda | .................. | G02B 17/086 |
| | | | | 353/33 |
| 8,724,229 B2* | 5/2014 | Takahashi | ............ | G02B 17/086 |
| | | | | 359/669 |
| 2013/0027784 A1* | 1/2013 | Takahashi | ............ | G02B 17/086 |
| | | | | 359/669 |
| 2017/0153455 A1* | 6/2017 | Takahashi | .......... | G02B 27/0172 |

* cited by examiner

FIG.3 Example 1

Example 1

Direct-vision optical path

FIG.10 Example2

Example2

FIG.13
Example2
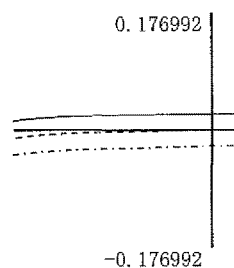
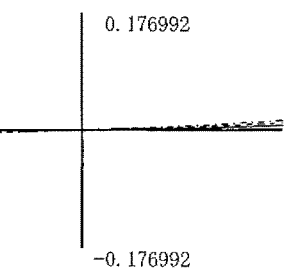
———— 617nm
-------- 525nm
-·-·-·-· 464nm

FIG.14  Example2  Direct-vision optical path

Example 2
Direct-vision optical path

FIG.18 Example3

FIG.19  Example3

FIG.22 Example 3
Direct-vision optical path

FIG.23  Example 3  Direct-vision optical path

FIG.26 Example 4

FIG.27 Example 4

Example4
Direct-vision optical path

Example 4
Direct-vision optical path

FIG.34 Example5

FIG.35 Example5

FIG.39 Example 5 Direct-vision optical path

DECENTERED OPTICAL SYSTEM, IMAGE PROJECTION APPARATUS INCORPORATING A DECENTERED OPTICAL SYSTEM, AND IMAGING APPARATUS INCORPORATING A DECENTERED OPTICAL SYSTEM

REFERENCE TO RELATED APPLICATIONS

This application claims the benefit of Japanese Patent Applications 2014-207380 filed on Oct. 8, 2014, and 2014-207381 filed on Oct. 8, 2014, the contents of which are incorporated by reference.

BACKGROUND OF THE INVENTION

The present invention relates to a decentered optical system having decentered optical surfaces as well as an image projection apparatus and an imaging apparatus, each incorporating a decentered optical system.

So far there has been an image projection apparatus known in the art, which makes use of small-size or compact image display devices to enlarge or scale up original images on these devices through an optical system for projection of the enlarged images (see Patent Publications 1, 2, 3). There is now a mounting demand for this image projection apparatus to be smaller in size and lighter in weight for more enhanced portability. In order to present images, there is also an increasing demand for an optical system capable of enlarging original images on the display devices to a certain degree for projection of them at a wide angle of view and representing them at a high resolution. Some means known to fill such demands include an apparatus in which a projection optical system comprises a decentered mirror that is a concave mirror decentered with respect to the visual axis of a viewer for enlargement and projection of an enlarged virtual image on an image display device.

Patent Publications 1, 2 and 3 each disclose a decentered optical system comprising a first prism having at least one rotationally asymmetric surface and a second prism having an exit surface defined by a convex or concave surface.

Patent Publication 1: JP(A) 9-146037
Patent Publication 2: JP(A) 2002-318366
Patent Publication 3: JP(A) 2013-29704

SUMMARY OF THE INVENTION

According to one embodiment of the invention, there is a decentered optical system provided, characterized by comprising:

a first optical element comprising at least three, mutually decentered optical surfaces including a first surface through which light can transmit, a second surface through which light can transmit and which is capable of internal reflection, and a third surface through which light can transmit and which is capable of internal reflection, wherein said first optical element is filled inside with a medium having a refractive index greater than 1, and at least one of the three optical surfaces has a rotationally asymmetric configuration, and a second optical element located on a second surface side of said first optical element and comprising at least two, mutually decentered optical surfaces including a first surface through which light can transmit and a second surface through which light can transmit and which has an outwardly concave configuration, wherein said second optical element is filled inside with a medium having a refractive index greater than 1, and at least one of said two optical surfaces has a rotationally asymmetric configuration, wherein:

said first optical element and said second optical element are spaced away from each other in an effective area through which a light beam passes, and satisfy the following condition (1):

$$0 < D_{MAX}/f \leq 0.3 \tag{1}$$

where $D_{MAX}$ is the maximum value of a distance as measured in an effective area through which said light beam passes on a section including a center chief ray of said light beam in a direction parallel with said center chief ray between the second surface of said first optical element and the first surface of said second optical element, and f is the focal length of said decentered optical system.

According to one embodiment of the invention, there is a decentered optical system provided, characterized by comprising:

a first optical element comprising at least three, mutually decentered optical surfaces including a first surface through which light can transmit, a second surface through which light can transmit and which is capable of internal reflection, and a third surface through which light can transmit and which is capable of internal reflection, wherein said first optical element is filled inside with a medium having a refractive index greater than 1, and at least one of the three optical surfaces has a rotationally asymmetric configuration, a second optical element located on a second surface side of said first optical element and comprising at least two, mutually decentered optical surfaces including a first surface through which light can transmit and a second surface through which light can transmit and which has an outwardly concave configuration, wherein said second optical element is filled inside with a medium having a refractive index greater than 1, and at least one of said two optical surfaces has a rotationally asymmetric configuration, and a third optical element located on a third surface side of said first optical element and comprising at least two, mutually decentered optical surfaces including a first surface through which light can transmit and which has an outwardly convex configuration and a second surface through which light can transmit, wherein said third optical element is filled inside with a medium having a refractive index greater than 1.

BRIEF EXPLANATION OF THE DRAWINGS

FIG. 13 is an aberration diagram for Example 2 of the decentered optical system.

DETAILED DESCRIPTION OF EMBODIMENTS

A decentered optical system according to one embodiment as well as an image projection apparatus and an imaging apparatus, each incorporating that decentered optical system will now be explained with reference to the accompanying drawings.

An object of the invention is to provide an decentered optical system capable of projecting or taking images over a wide field of view at a high resolution albeit having a compact and simple structure as well as an image projection apparatus and an imaging apparatus, each incorporating that decentered optical system. Another object of the invention is to provide an image projection apparatus capable of viewing external images having reduced aberrations when the decentered optical system is used on a projection-onto-eyeball type image projection apparatus.

Means for Achieving the Objects

Figure 1:
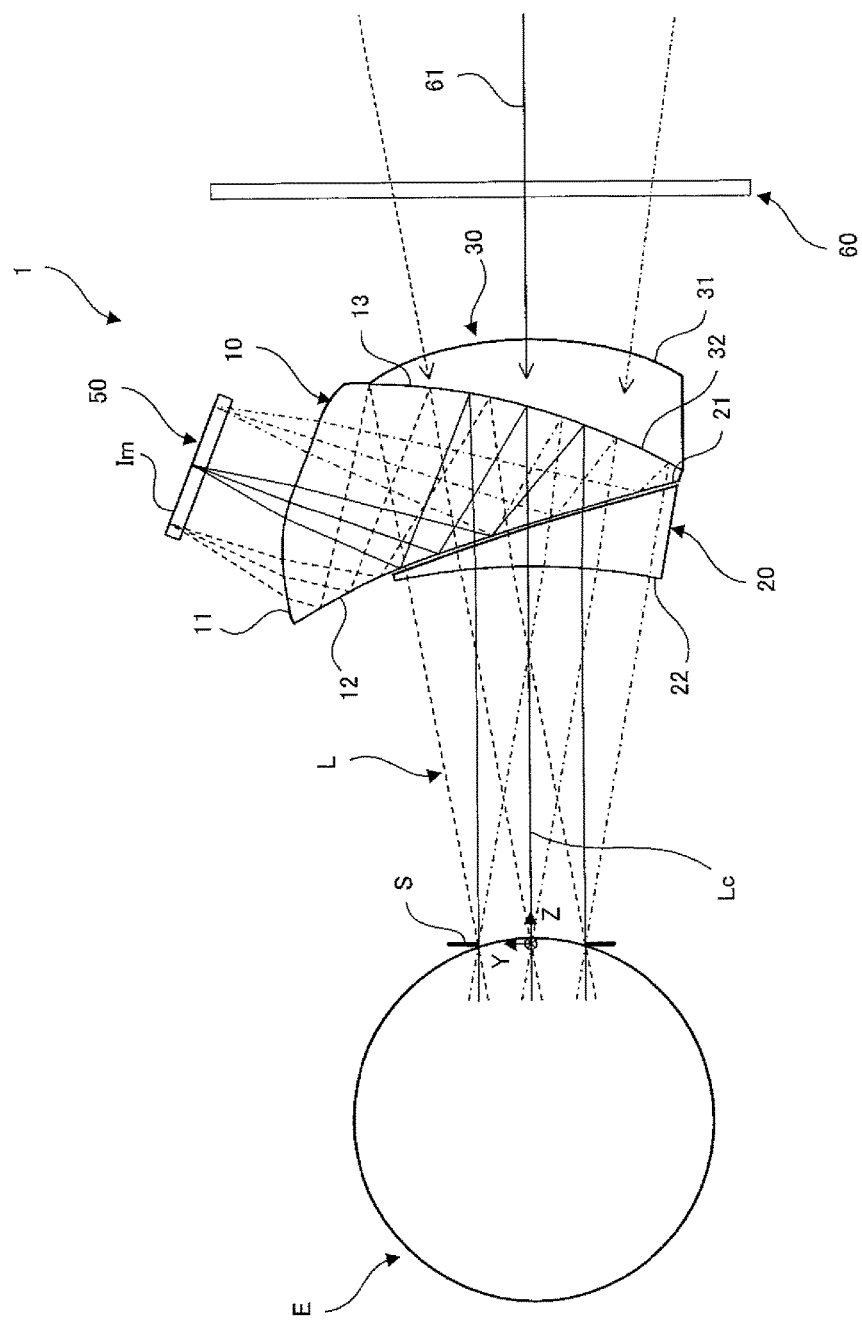
FIG. 1 is a sectional view of the decentered optical system according to one embodiment of the invention.

FIG. 1 is a sectional view of the decentered optical system according to one embodiment of the invention.

A decentered optical system 1 according to one embodiment of the invention preferably comprises a first optical element 10 comprising at least three, mutually decentered optical surfaces including a first surface 11 through which light can transmit, a second surface 12 through which light can transmit and which is capable of internal reflection, and a third surface 13 through which light can transmit and which is capable of internal reflection, wherein said first optical element is filled inside with a medium having a refractive index greater than 1, and at least one of the three optical surfaces has a rotationally asymmetric configuration, and a second optical element 20 located on a second surface 12 side of said first optical element 10 and comprising at least two, mutually decentered optical surfaces including a first surface 21 through which light can transmit and a second surface 22 through which light can transmit and which has an outwardly concave configuration, wherein said second optical element is filled inside with a medium having a refractive index greater than 1, and at least one of said two optical surfaces has a rotationally asymmetric configuration, wherein said first optical element 10 and said second optical element 20 are spaced away from each other in an effective area through which a light beam passes, and satisfy the following condition (1):

$$0 < D_{MAX}/f \leq 0.3 \quad (1)$$

where $D_{MAX}$ is the maximum value of a distance as measured in an effective area through which a light beam L passes on a section including a center chief ray Lc of the light beam L in a direction parallel with the center chief ray Lc between the second surface 12 of the first optical element 10 and the first surface 21 of the second optical element 20, and f is the focal length of the decentered optical system 1.

It is also preferable that the decentered optical system 1 according to the embodiment described herein comprises a first optical element 10 comprising at least three, mutually decentered optical surfaces including a first surface 11 through which light can transmit, a second surface 12 through which light can transmit and which is capable of reflection, and a third surface 13 through which light can transmit and which is capable of internal reflection, wherein said first optical element 10 is filled inside with a medium having a refractive index greater than 1, and at least one of the three optical surfaces has a rotationally asymmetric configuration; a second optical element 20 located on the second surface 12 side of the first optical element 10 and comprising at least two, mutually decentered optical surfaces including a first surface 21 through which light can transmit and a second surface 22 through which light can transmit and which has an outwardly concave configuration, wherein the second optical element 20 is filled inside with a medium having a refractive index greater than 1; and a third optical element 30 located on a third surface 13 side of the first optical element 10 and comprising at least two, mutually decentered optical surfaces including a first surface 31 through which light can transmit and which has an outwardly convex configuration and a second surface 32 through which light can transmit, wherein the third optical element 30 is filled inside with a medium having a refractive index greater than 1.

The merits obtainable from such construction of the decentered optical system 1 are now explained.

Referring first to the decentered optical system 1 described herein, there is the first optical element 10 used, which comprises at least three, mutually decentered optical surfaces: the first surface 11 through which light can transmit, the second surface 12 through which light can transmit and which is capable of reflection, and the third surface 13 through which light can transmit and which is capable of internal reflection, and is filled inside with a medium having a refractive index greater than 1. This permits the decentered prism to take an internal reflection optical path, and images observed or taken to be cleared of chromatic aberrations. It is also possible to prevent an increase in number of optical elements used for correction of chromatic aberrations, and fold an optical path by reflection to make the optical system itself smaller than a refractive optical system.

At least one of the three optical surfaces forming part of the first optical element 10 has preferably a rotationally asymmetric configuration because it can impart optical power to light beams and works more in favor of correction of decentration aberrations.

Further, by use of the second optical element 20 that is located on the second surface 12 side of the first optical element 10, comprises at least two, mutually decentered optical surfaces: the first surface 21 through which light can transmit and the second surface 22 through which light can transmit, is filled inside with a medium having a refractive index greater than 1, and may be constructed from two mutually decentered, refracting surfaces, the opposite surfaces of the first 10 and the second optical element 20 may come close to each other and have a similar configuration. Referring to the second surface 22 of the second optical element 20, the concave surface may be located externally in a position axially opposite to the viewer's eyeball (an entrance pupil in the case of an imaging optical system) so that the second surface 22 can be configured in such a way as to be concave with respect to the eye. In other words, two such surfaces may be modified in such a way as to hold back aberrations and conform well to a wide field of view.

How to keep track of light rays when the decentered optical system 1 is used with an image projection apparatus is now explained. A light ray exiting out from an image plane Im defined by the display surface of an image display device 50 enters the first optical element 10 from the first surface 11, and is then reflected off from the second surface 12. The light ray reflected off from the second surface 12 is reflected off from the third surface 13, leaving the first optical element 10 from the second surface 12. The light ray exiting out from the first optical element 10 enters the second optical element 20 from the first surface 21, exiting out from the second surface 22. The light ray exiting out from the second optical element 20 is projected onto a viewer's pupil E through an aperture stop S as an exit pupil.

The second optical element 20 allows for correction of aberrations including decentration aberrations because at least one of the two optical surfaces has a rotationally asymmetric curved configuration in such a way as to give optical power to light beams and make correction for decentration aberrations.

The first 10 and the second optical element 20 are spaced away from each other in the effective area through which light beams pass to provide for a total-reflection area by internal reflection off the second surface 12 of the first optical element 10.

Further, satisfaction of Condition (1) by the decentered optical system 1 allows for location of the two optical elements with an appropriate separation in between. Exceeding the maximum value of Condition (1) causes the optical elements to be separated off. This in turn makes an eye relief or distance short, rendering images less observable, and causes the apparatus to gain in thickness and get large as well. Satisfaction of Condition (1) ensures that the opposing surfaces or the second 12 and the first surface 21 of the first 10 and the second optical element 20 come close in shape, resulting in reductions of various aberrations as well.

It is here to be noted that the focal length f may vary depending on the azimuth direction. In that case, the focal length f is preferably substituted by both a focal length f(X) in the X-direction and a focal length f(Y) in the Y-direction. It follows that the focal length f preferably satisfies both Conditions (1-1) and (1-2).

$$0 < D_{MAX}/f(X) \leq 0.3 \quad (1\text{-}1)$$

$$0 < D_{MAX}/f(Y) \leq 0.3 \quad (1\text{-}2)$$

The X- and Y-directions are here explained. In FIG. 1, assume that the Z-direction is defined by a direction opposite to the direction of a center chief ray Lc exiting out from the decentered optical system 1 to the viewer's pupil E, the Y-Z plane is defined by a plane including a center chief ray before and after its bending or flexion by reflection, and the X-Z plane is defined by a direction passing through the emergent center chief ray Lc and vertical to the Y-Z plane. Thus, the Y-direction is defined by a direction vertical to the X-Z plane while the X-direction is defined by a direction vertical to the Y-Z plane.

As the lower limit value of Condition (1) is set at preferably 0.0002 and more preferably 0.00025, it facilitates prevention of contact of the first 10 with the second optical element 20 due to external pressure, and as the upper limit value of Condition (1) is set at preferably 0.2 and more preferably 0.1, it works more in favor of reductions of various aberrations because the second surface 12 of the first optical element 10 comes closer to the first surface 21 of the second optical element 20. It is preferable for decentered optical system 1 to satisfy the following condition (1'):

$$0.00025 < D_{MAX}/f \leq 0.1 \tag{1'}$$

According to the decentered optical system 1 described herein, it is possible to project or take images at high resolutions yet in a small-sized simple arrangement.

For the decentered optical system 1 described herein, it is preferable that the second surface 22 of the second optical element 20 is configured in such a way as to have a plurality of symmetric surfaces in the effective area. The second surface 22 of the second optical element 20 may be configured as a near-aplanatic surface inclusive of a spherical surface, a rotationally symmetric aspheric surface, a toric surface or a rotationally asymmetric surface to make the exit angle of emergent light small from its center to its periphery so that chromatic aberration of magnification occurring on that surface can be reduced or minimized.

In the decentered optical system 1 described herein, it is preferable for the first 10 and the second optical element 20 to satisfy the following Conditions (2) and (3).

$$-2 < (Dc-Dup)/D_{MAX} < 2 \tag{2}$$

$$-2 < (Dc-Dun)/D_{MAX} < 2 \tag{3}$$

where Dc is a separation on said center chief ray between said first optical element and said second optical element, Dup is a separation at a first end on the second surface side of said first optical element in said effective area, and Dun is a separation at a second end opposite to said first end in said effective area.

Conditions (2) and (3) are provided to view or observe good images with the respective upper and lower light rays or, alternatively, to view or observe clear-cut images as far as the perimeter of the screen. Satisfaction of both conditions allows the second surface 12 of the first optical element 10 to become similar in shape to the first surface 21 of the second optical element 20 so that aberrations are reduced or held back.

Being short of the lower limits to Conditions (2) and (2) may possibly lead to interferences between the first 10 and the second optical element 20. Exceeding the upper limit to Condition (2) may cause some considerable aberrations to occur on the second surface 12 of the first optical element 10 and the first surface 21 of the second optical element 20 due to the upper light rays, resulting in a lowering of the upper image quality as compared with the center. Exceeding the upper limit to Condition (2) causes some considerable aberrations to occur on the second surface 12 of the first optical element 10 and the first surface 21 of the second optical element 20 due to the lower light rays, resulting in a lowering of the lower image quality as compared with the center.

The lower limit value of each of Conditions (2) and (3) should be set at preferably −0.8, more preferably −0.5, and most preferably −0.2, and the upper limit value of each of Conditions (2) and (3) should be set at preferably 0.8, more preferably 0.5, and most preferably 0.2.

In the decentered optical system 1 described herein, the second surface 12 of the first optical element 10 and the first surface 21 of the second optical element 20 have substantially the same surface configuration in the effective area so that aberrations can be reduced or held back.

In the decentered optical system 1 described herein, the second surface 12 of the first optical element 10 and the first surface 21 of the second optical element 20 are each a rotationally asymmetric surface so that aberrations can be reduced or held back.

In the decentered optical system 1 described herein, the maximum value of the absolute value of the exit angles of all chief rays from the second surface 22 of the optical element 20 is not greater than 10° so that chromatic aberration of magnification can be reduced or held back. Exceeding the upper limit may possibly give rise to as much chromatic aberration as cannot be corrected by other optical element.

If the maximum value of the absolute value of the exit angles of all chief rays from the second surface 22 of the second optical element 20 is not greater than 50, the decentered optical element 1 described herein works more in favor of chromatic aberration-of-magnification reductions.

In the decentered optical system 1 described herein, it is preferable for the second surface 22 of the second optical element 20 to satisfy the following Condition (4).

$$-4 \leq R1P_o/ER \leq -0.01 \tag{4}$$

where $R1P_o$ is the radius of curvature of the second surface 22 of the second optical element 20, and ER is the eye relief.

Satisfaction of Condition (4) ensures that the second surface 22 of the second optical element 20 is configured as a near-aplanatic surface so that the exit angle of emergent light from the second surface 22 can be kept very small (preferably down to about 0°) from the center to the perimeter of the screen thereby keeping chromatic aberration of magnification from occurring on that surface. Note here that the radius of curvature $R1P_o$ of the second surface 22 of the second optical element 20 is preferably of the order of −8 mm≤$R1P_o$≤−100 mm and the eye relief ER is preferably of the order of 8 mm≤ER≤45 mm.

It is also understood that the radius of curvature $R1P_o$ of the second surface 22 of the second optical element 20 may vary depending on the azimuth direction. In that case, the radius of curvature $R1P_o$ of the second surface 22 of the second optical element 20 may be substituted by both the radius of curvature $R1P_o(X)$ in the X-direction and the radius of curvature $R1P_o(Y)$ in the Y-direction: it may satisfy the following two Conditions (4-1) and (4-2).

$$-4 \leq R1P_o(X)/ER \leq -0.01 \tag{4-1}$$

$$-4 \leq R1P_o(Y)/ER \leq -0.01 \tag{4-2}$$

The lower limit value of Condition (4) should be set at preferably −3.0 and more preferably −2.0, and the upper limit value of Condition (4) should be set at preferably −0.3 and more preferably −0.5.

In the decentered optical system 1 described herein, it is preferable for the second surface 22 of the second optical element 20 to satisfy the following Condition (5).

$$-4 \leq R1P_o/f \leq -0.1 \tag{5}$$

where $R1P_o$ is the radius of curvature of the second surface 22 of the second optical element 20, and f is the focal length of the overall decentered optical system 1.

In a retrofocus arrangement in negative-positive order, the focal length f is shorter than the eye relief as viewed in inverse or back ray tracing, working in favor of taking hold of the eye relief ER. However, the focal length f is not that largely different from the eye relief ER. Therefore, there is the same advantage obtained as in Condition (4): it is possible to hold back the occurrence of chromatic aberration of magnification. Note here that the radius of curvature $R1P_o$ of the second surface 22 of the second optical element 20 is preferably of the order of $-8 \text{ mm} \le R1P_o \le -100 \text{ mm}$ and the eye relief ER is preferably of the order of $8 \text{ mm} \le ER \le 45 \text{ mm}$.

It is also understood that the radius of curvature $R1P_o$ of the second surface 22 of the second optical element 20 may vary depending on the azimuth direction. In that case, the radius of curvature $R1P_o$ of the second surface 22 of the second optical element 20 may be substituted by both the radius of curvature $R1P_o(X)$ in the X-direction and the radius of curvature $R1P_o(Y)$ in the Y-direction: it may satisfy the following two Conditions (5-1) and (5-2).

$$-6 \le R1P_o(X)/f \le -0.1 \quad (5\text{-}1)$$

$$-6 \le R1P_o(Y)/f \le -0.1 \quad (5\text{-}2)$$

The lower limit value of Condition (5) should be set at preferably −4.0 and more preferably −3.5, and the upper limit value of Condition (5) should be set at preferably −0.4 and more preferably −0.7.

In the decentered optical system 1 described herein, it is preferable for the second surface 22 of the second optical element 20 to satisfy the following Condition (5').

$$-4.2 \le R1P_o/f \le -0.4 \quad (5')$$

where $R1P_o$ is the radius of curvature of the second surface 22 of the second optical element 20, and f is the focal length of the overall decentered optical system 1.

By satisfaction of this Condition (5'), the exit angle of emergent light from the second surface 22 can be smaller so much so that the amount of chromatic aberration of magnification occurring at this surface can be further reduced.

Preferably, the decentered optical system 1 described herein further comprises a third optical element 30 having at least two, mutually decentered optical surfaces including a first 31 and a second surface 32 which are located on the third surface 13 side of the first optical element 10 through which light can transmit, and filled inside with a medium having a refractive index greater than 1.

When an external world is observed only through the first 10 and the second optical element 20, there is only an unnatural image obtained. As the third optical element 30 having mutually decentered surfaces is located on the external world side of the first optical element 10, it allows combined power to get small with respect to external light (preferably down to nearly zero). This in turn makes it possible for the viewer to make natural, substantially distortion-free see-through observations at a magnification close to almost 1.

Further, by use of the third optical element 30 comprising at least two optical surfaces including the first surface 31 which is located on the third surface 13 side of the first optical element 10, through which light can transmit and which has an outwardly convex shape, and the second surface 32 through which light can transmit, and filled inside with a medium having a refractive index greater than 1, combined power relative to external light is reduced (to preferably almost zero), and it is possible for the viewer to make natural, substantially distortion-free see-through observations at a magnification close to almost 1.

Referring here to a direct-vision optical path through the decentered optical system 1, a light ray exiting out from an image plane (not shown) enters the third optical element 30 from the first surface 31, exiting out from the second surface 32. The light ray exiting out from the third optical element 30 enters the first optical element 10 from the third surface 13, exiting out from the second surface 12. The light ray exiting out from the first optical element 10 enters the second optical element 20 from the first surface 21, exiting out from the second surface 22. Exiting out from the second optical element 20, the light ray passes through the aperture stop S as an exit pupil for projection onto the viewer's eye E.

In the decentered optical system 1 described herein, it is preferable for the second 20 and the third optical element 30 to satisfy the following Condition (6).

$$0.1 \le |R2Pi - R1P_o|/D2Pi1P_o \le 12 \quad (6)$$

where R2 Pi is the radius of curvature of the first surface 31 of the third optical element 30, $R1P_o$ is the radius of curvature of the second surface 22 of the second optical element 20, and $D2Pi1P_o$ is a distance between the first surface 31 of the third optical element 30 and the second surface 22 of the second optical element 20 in a direction along the center chief ray of a light beam.

The position of the first surface of the third optical element 30 is separated off the second surface 22 of the second optical element 20 by a distance corresponding to the total thickness of the first, second and third optical elements 10, 20 and 30. For this reason, the angle of incidence of external light on the optical surface with the position of the viewer's pupil as the entrance pupil must be reduced as much as possible. This is the condition to hold back various aberrations thereby making observations of natural external images. In an extreme case where the angle of incidence of external light is zero, the surface of incidence becomes an aplanatic surface where spherical aberration, coma and astigmatism will not occur.

Indeed, however, the decentered optical system 1 is generally a non-rotationally symmetric free-form surface optical system; the first surface of the supplementary prism 1 does not provide any perfect aplanatic surface for the reasons of a power layout that has preferably a less negative power, and the like. A preferential condition here is to bring the power of the direct-vision optical path relative to external light close to zero rather than the aplanatic condition for the second surface 2 of the supplementary prism 2. It is thus preferable to satisfy Condition (6).

It is here to be noted that the radius of curvature may vary depending on the azimuth direction. In that case, the radius of curvature R2Pi may be substituted by both the radius of curvature R2Pi(X) in the X-direction and the radius of curvature R2Pi(Y) in the Y-direction, and the radius of curvature $R1P_o$ may be substituted by both the radius of curvature $R1P_o(X)$ in the X-direction and the radius of curvature $R1P_o(Y)$ in the Y-direction: it is preferable to satisfy both the following Conditions (6-1 and (6-2).

$$0.1 \le |R2Pi(X) - R1P_o(X)|/D2Pi1P_o \le 12 \quad (6\text{-}1)$$

$$0.1 \le |R2Pi(Y) - R1P_o(Y)|/D2Pi1P_o \le 12 \quad (6\text{-}2)$$

The X- and Y-directions are here explained. In FIG. 1, assume that the Z-direction is defined by a direction opposite to the direction of a center chief ray Lc exiting out from the decentered optical system 1 to the viewer's pupil E, the Y-Z plane is defined by a plane including a center chief ray before and after its bending or flexion by reflection, and the X-Z plane is defined by a direction passing through the emergent center chief ray Lc and vertical to the Y-Z plane. Thus, the Y-direction is defined by a direction vertical to the X-Z plane while the X-direction is defined by a direction vertical to the Y-Z plane.

The lower limit value of Condition (6) should be set at preferably 0.2 and more preferably 0.5, and the upper limit value of Condition (6) should be set at preferably 10 and more preferably 9. With respect to the above-defined Y-direction, the lower limit value of Condition (6-2) should be set at preferably 0.3 and more preferably 0.5, and the upper limit value of Condition (6-2) should be set at preferably 10, more preferably 9 and most preferably 2.

In the decentered optical system 1 described herein, the second surface 12 of the first optical element 10 and the first surface 21 of the second optical element 20 have the same surface configuration in the effective area so that aberrations can be held back.

In the decentered optical system 1 described herein, it is preferable that the second 12 and the third surface 13 of the first optical element 10 are located in opposition to each other, and the third surface 13 of the first optical element 10 is a reflecting surface concave on the second surface 12 side of the first optical element 10.

The second surface 12 of the first optical element 10 that is an internal reflecting surface also serves as an exit surface from which light exits out after internal reflection takes place twice: it has two optical actions. This does not only contribute more to the bending effect of this prism, but is also effective for reducing the size of the optical element itself. The third surface 13 of the first optical element 10 that is a reflecting surface having power is a so-called back-surface concave mirror having a concave surface shape, and it is this surface that bears a primary positive power of the overall optical system. Although this surface must have the necessary positive power, resulting in the occurrence of spherical aberration, coma and so on, yet they are corrected by the negative power of the second surface that is a reflecting surface.

In the decentered optical system 1 described herein, it is preferable to cement together the third surface 13 of the first optical element 10 and the second surface 32 of the third optical element 30. Cementing allows for integration of the optical elements, dispensing with any adjustment and leading to a lesser number of assembling steps. Cementing is also effective for a coated mirror such as a half mirror, because the coated surface is unlikely to be exposed to the outside air, resulting in improvements in resistance.

In the decentered optical system 1 described herein, the third surface 13 of the first optical element 10 is preferably a rotationally asymmetric surface. The third surface 13 of the first optical element 10 bears a primary positive power of the decentered optical system 1. As this surface is defined by the rotationally asymmetric surface, it allows for correction for decentration and other aberrations occurring thereat, leading to improvements in the optical performance of the overall optical system.

In the decentered optical system 1 described herein, the second surface 12 of the first optical element 10 is preferably a rotationally asymmetric surface. The second surface 12 of the first optical element 10 has two optical actions: internal reflection and transmission for exiting out or, the second surface 12 has an effect on two aberration corrections. As is the case with the third surface, this surface is defined by the rotationally asymmetric surface that has a striking effect on correction of decentration and other aberrations and, hence, contributes to improvements in the optical performance of the overall optical system.

In the decentered optical system 1 described herein, the first surface 11 of the first optical element 10 is preferably a rotationally asymmetric surface. The first surface 11 of the first optical element 10 is proximate to the plane of the image display device, through which a light beam having a small diameter transmits, and acts to make correction for off-axis aberrations.

In the decentered optical system 1 described herein, the second 20 and the third optical element 30 preferably satisfy the following Condition (7).

$$0.1 \leq \phi 2/\phi 1 \leq 1.3 \tag{7}$$

where $\phi 1$ is the power of the second surface of said second optical element at a point of intersection with the center chief ray, and $\phi 2$ is the power of the first surface of said third optical element at a point of intersection with the center chief ray.

Condition (7) is necessary to observe as natural external images as possible. Being less than the lower limit to Condition (7) causes the see-through magnification of external images to get low with the result that there is a large difference with the external images seen through the naked eyes. Exceeding the upper limit to Condition (7) causes the curvature of the second surface of the second optical element to get small, resulting in incapability of making correction for chromatic aberration of magnification upon viewing of electronic images and a lowering of the optical performance of the overall optical system.

It is here to be appreciated that the power of the surface may vary depending on the azimuth direction. In that case, the power $\phi 1$ of the surface may be substituted by both the power $\phi 1(X)$ of the surface in the X-direction and the power $\phi 1(Y)$ of the surface in the Y-direction, and the power $\phi 2$ of the surface may be substituted by both the power $\phi 2(X)$ of the surface in the X-direction and the power $\phi 2(Y)$ of the surface in the Y-direction. In other words, it is preferable to satisfy the following Conditions (7-1) and (7-2).

$$0.15 \leq \phi 2(X)/\phi 1(X) \leq 1.3 \tag{7-1}$$

$$0.15 \leq \phi 2(Y)/\phi 1(Y) \leq 1.3 \tag{7-2}$$

The lower limit value of Condition (7) should be set at preferably 0.25 and more preferably 0.3, and the upper limit value of Condition (7) should be set at preferably 1.1 and more preferably 0.95.

In the decentered optical system 1 described herein, the third surface 13 of the first optical element 10 has preferably such a half mirror structure as to reflect off light from within the first optical element 10 and allow for transmission of light from outside the first optical element 10.

The third surface 13 of the first optical element 10 that is opposite to the third optical element 30 and acts as an internal reflecting surface may be configured as a half mirror to observe external images and provide simultaneous viewing of electronic images on the image display device or the like in a superposed way.

In the decentered optical system 1 described herein, the third surface 13 of the first optical element 10 has preferably a hologram structure having properties varying with the angle of incident light.

The third surface 13 of the first optical element 10 that is opposite to the third optical element 30 and acts as an internal reflecting surface may be configured as a hologram to observe external images and providing for simultaneous viewing of electronic images on the image display device or the like in a superposed way.

In the decentered optical system 1 described herein, there is preferably a quantity-of-light control 60 located externally to the first surface 31 side of the third optical element 30 for the purpose of controlling the quantity of light.

As the quantity-of-light control 60 is located externally to the third optical element 30, it makes it easy to observe electronic images clearly while incident light 61 coming from outside is reduced. Note here that the quantity-of-light control 60 includes, but is not limited to, a liquid crystal shutter, an optical filter for reducing the quantity of light, and a polarizing filter.

Specific examples of one embodiment according to the invention are now explained.

Figure 2:
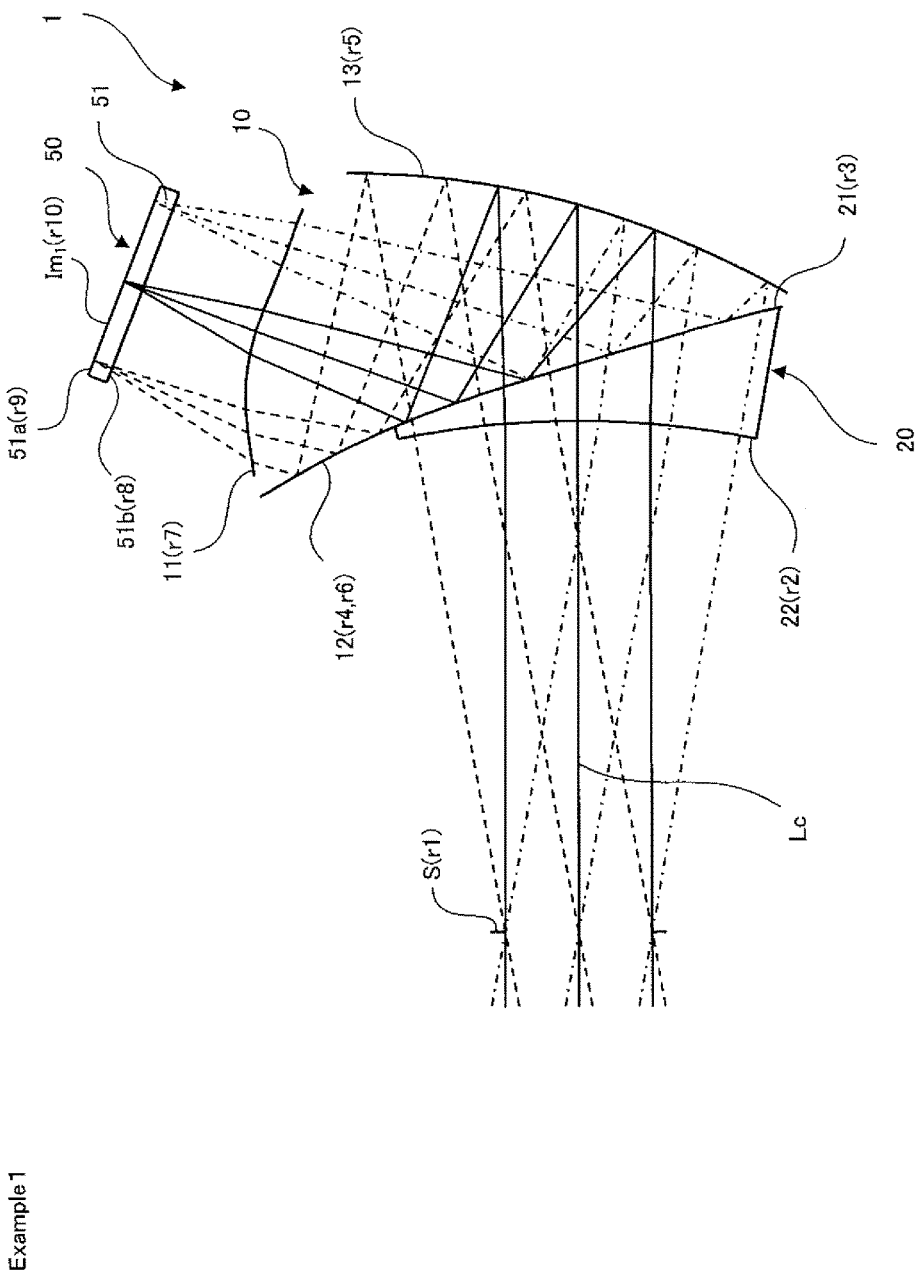
FIG. 2 is a sectional view of Example 1 of the decentered optical system including a center chief ray.
Figure 3:
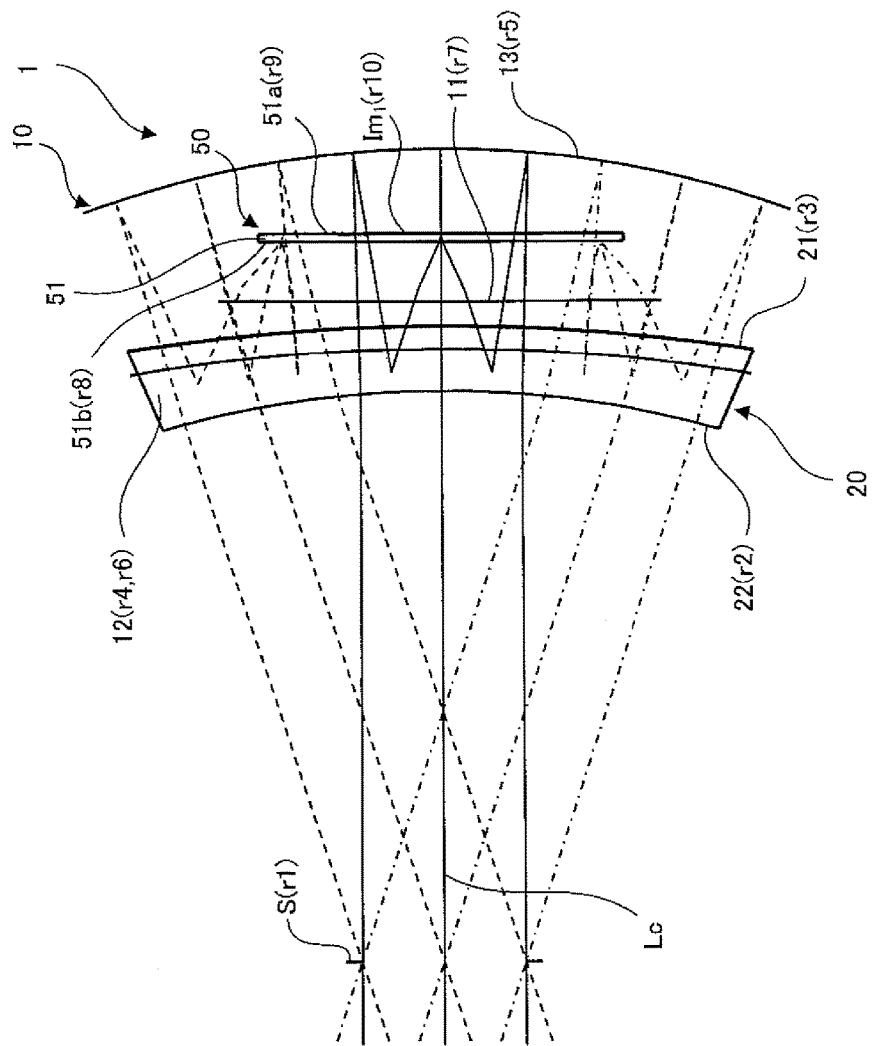
FIG. 3 is a plan view of Example 1 of the decentered optical system.
Figure 4:
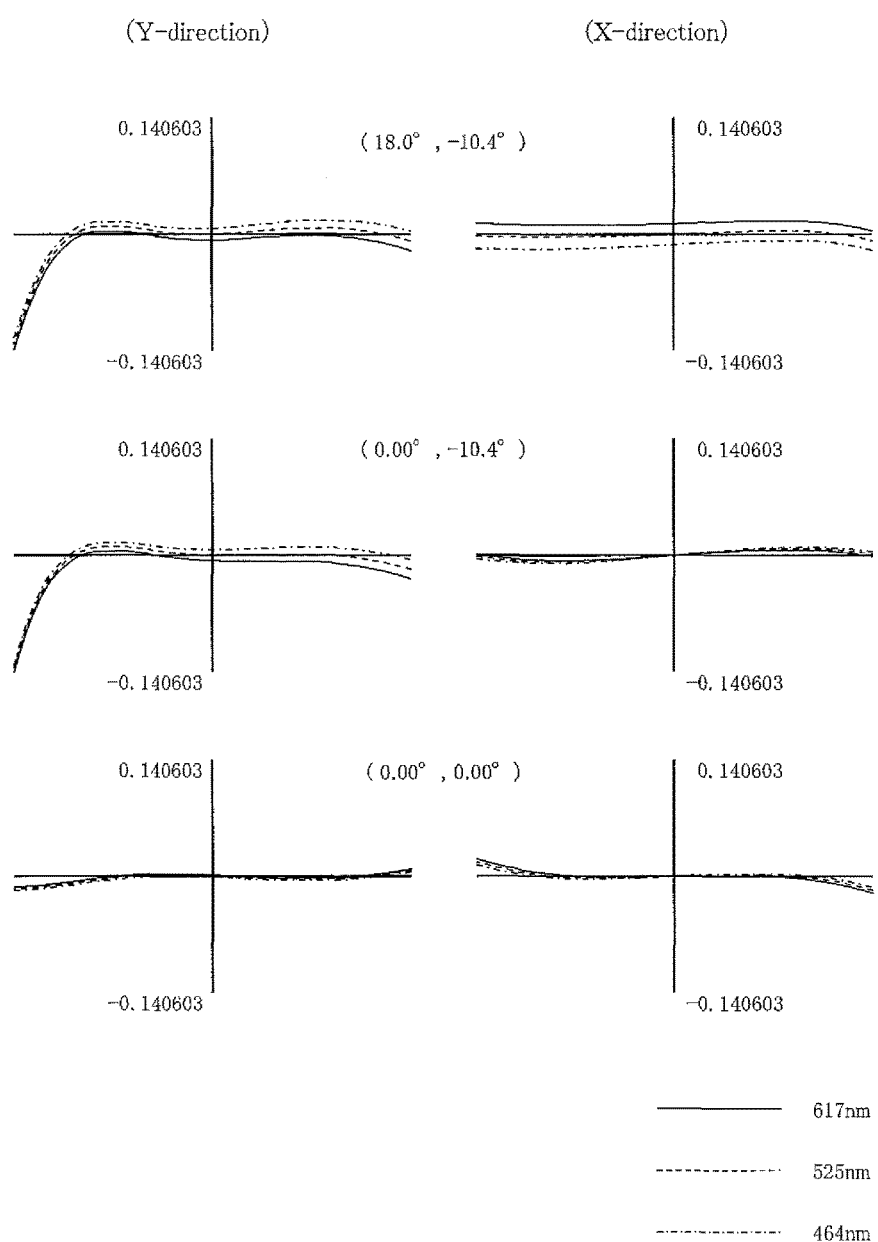
FIG. 4 is an aberration diagram for Example 1 of the decentered optical system.
Figure 5:
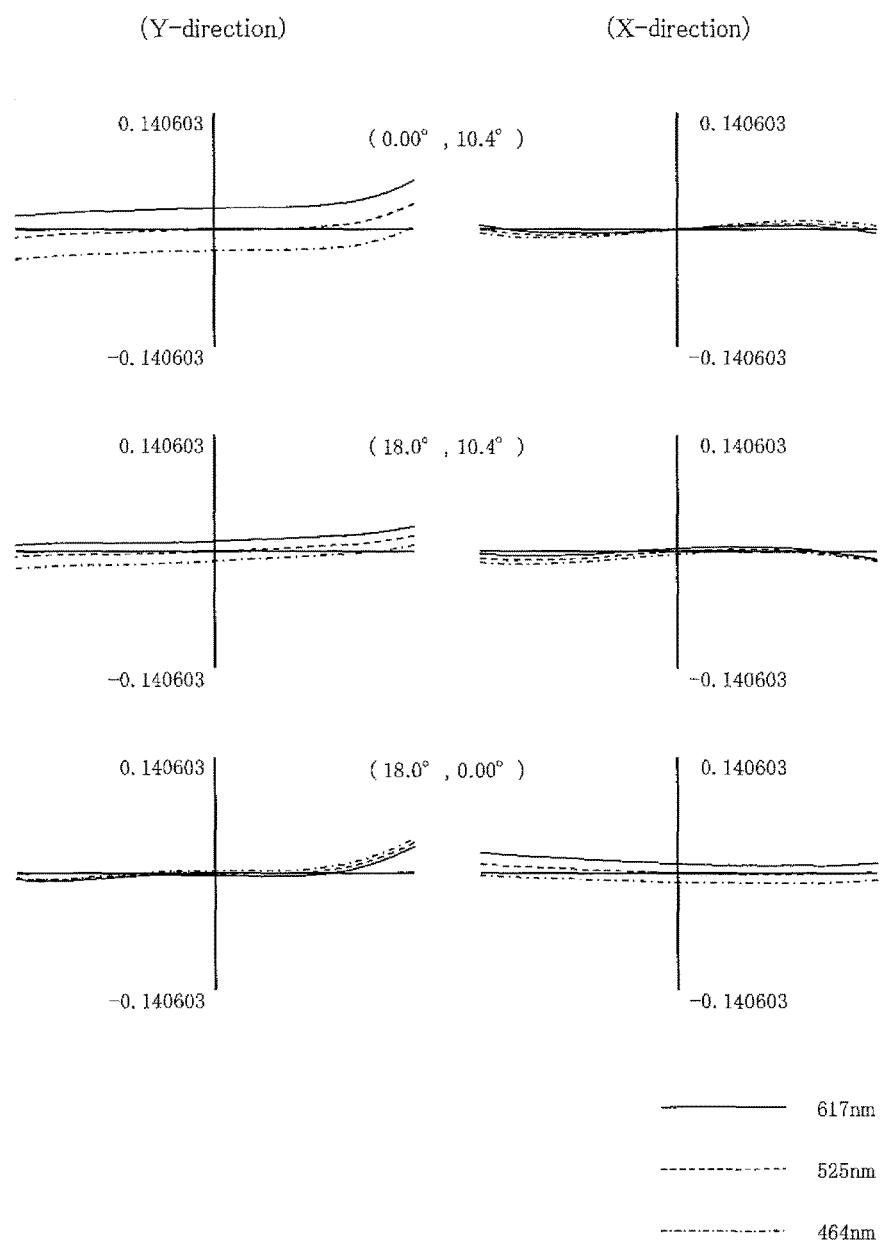
FIG. 5 is an aberration diagram for Example 1 of the decentered optical system.

FIG. 2 is a sectional view of Example 1 of the decentered optical system including a center chief ray, and FIG. 3 is a plan view of Example 1 of the decentered optical system. FIGS. 4 and 5 are aberration diagrams for Example 1 of the decentered optical system.

In order from an image plane $Im_1$ (an image display plane in the case of a projection optical system, and an imaging plane in the case of an imaging optical system) toward an object plane (a projection plane for virtual or real images in the case of a projection optical system, and an object plane in the case of an imaging optical system), Example 1 of the decentered optical system 1 includes a first optical element 10 and a second optical element 20, and an aperture stop S as an exit pupil (an exit pupil or an aperture stop in the case of a viewing optical system, and an entrance pupil or an aperture stop in the case of an imaging optical system) is formed on the object plane side of the second optical element 20. Assume here that a center chief ray Lc is defined by a light ray passing from the image plane $Im_1$ through the center of the exit pupil to the center of the object plane. The respective surfaces of the first 10 and the second optical element 20 are decentered with respect to the center chief ray Lc.

Ray tracing in the case of using the decentered optical system 1 with an image projection apparatus is here explained. A light ray exiting out from the image plane $Im_1$ as the display plane of an image display device 50 passes through an entrance surface 51a and an exit surface 51b of a cover glass 51, entering the first optical element 10 from its first surface 11. The light ray incident from the first surface 11 is reflected off from a second surface 12 and then a third surface 13, leaving the first optical element 10 from its second surface 12. The light ray exiting out from the first optical element 10 enters the second optical element 20 from its first surface 21. Exiting out from the second optical element 20, the light ray passes through the aperture stop S as the exit pupil for projection onto a viewer's pupil, a screen or the like.

Example 1 of the decentered optical system 1 further includes a direct-vision optical path using the third surface 13 of the first optical element 10 as a transmitting surface.

Figure 6:
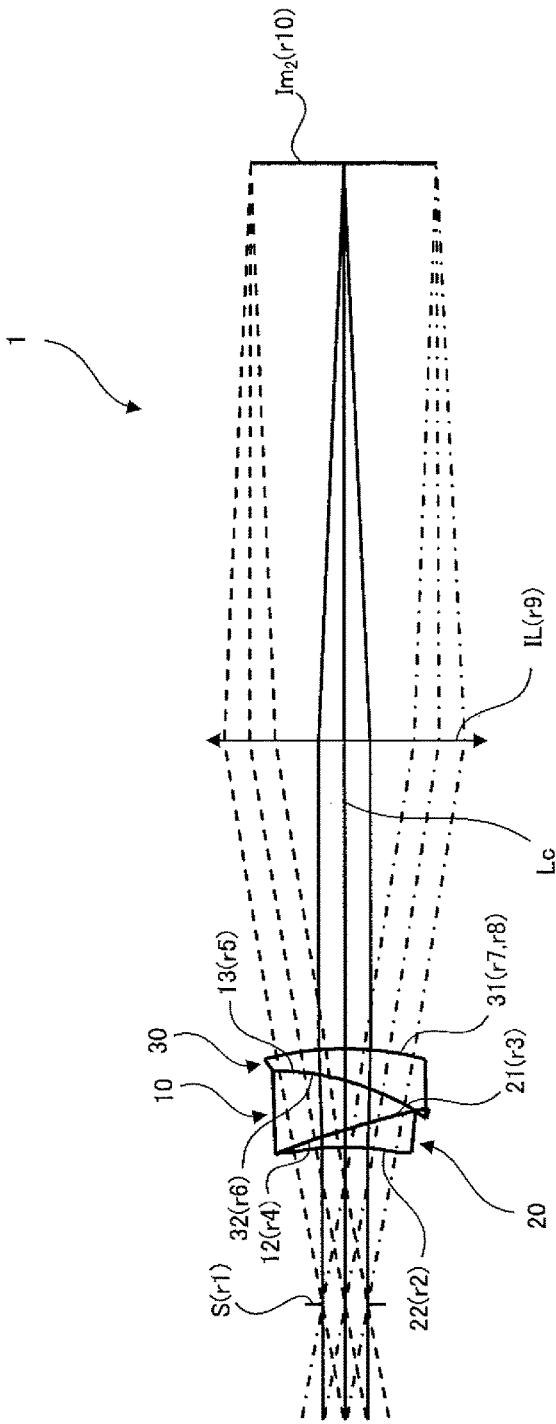
FIG. 6 is a sectional view of the direct-vision optical path through Example 1 of the decentered optical system including a center chief ray.
Figure 7:
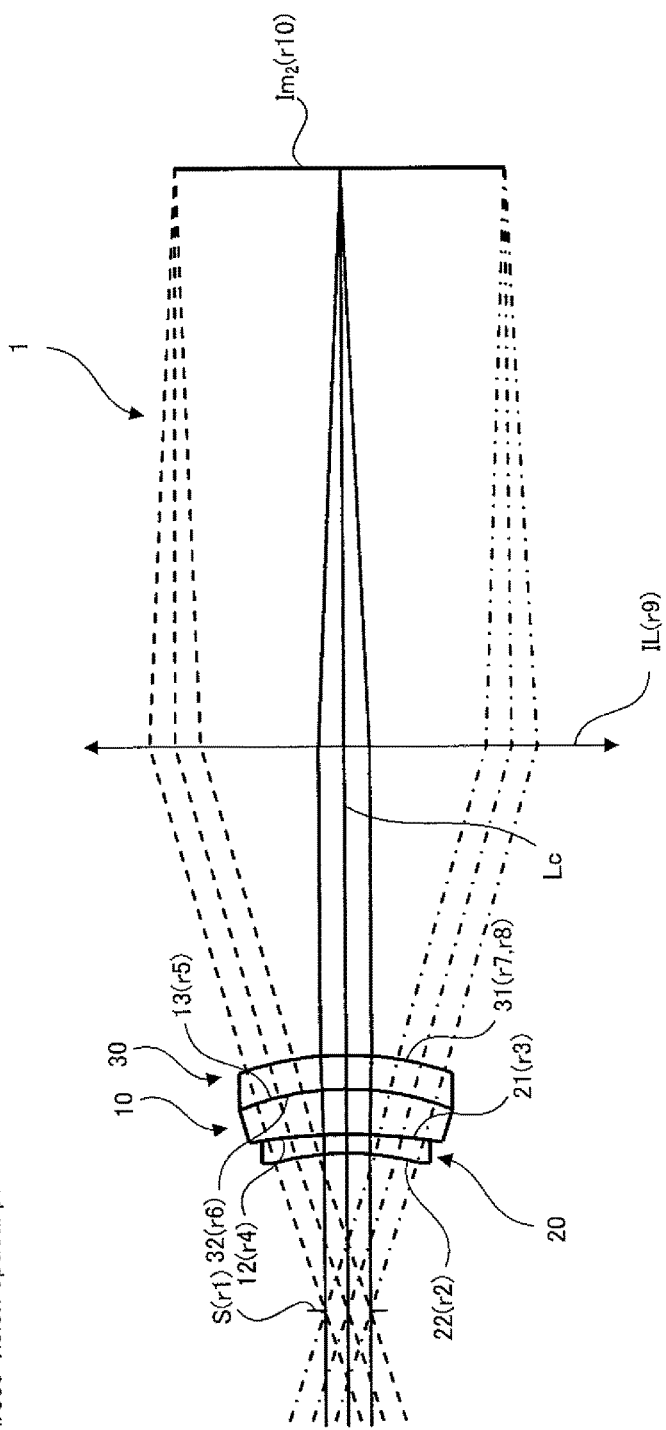
FIG. 7 is a plan view of the direct-vision optical path through Example 1 of the decentered optical system.
Figure 8:
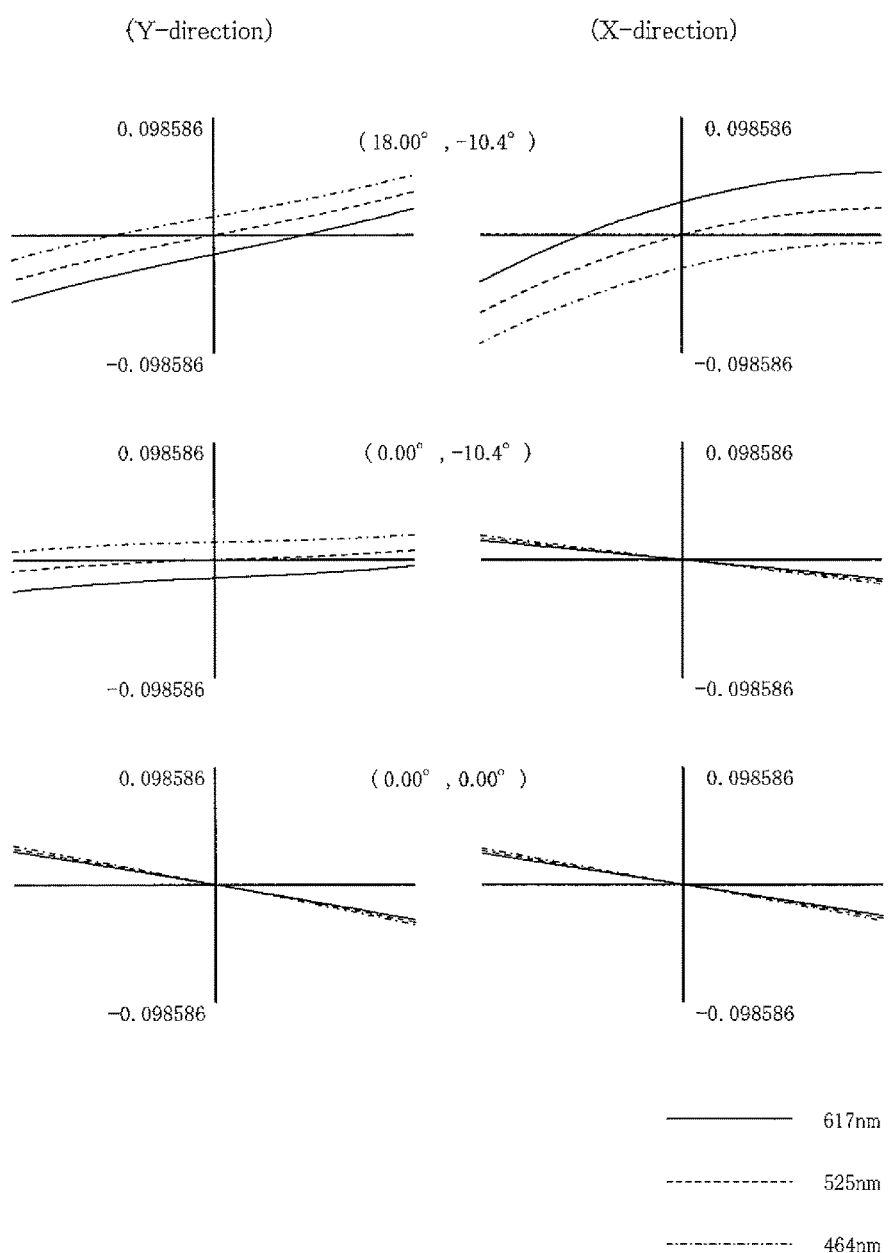
FIG. 8 is an aberration diagram for the direct-vision optical path through Example 1 of the decentered optical system.
Figure 9:
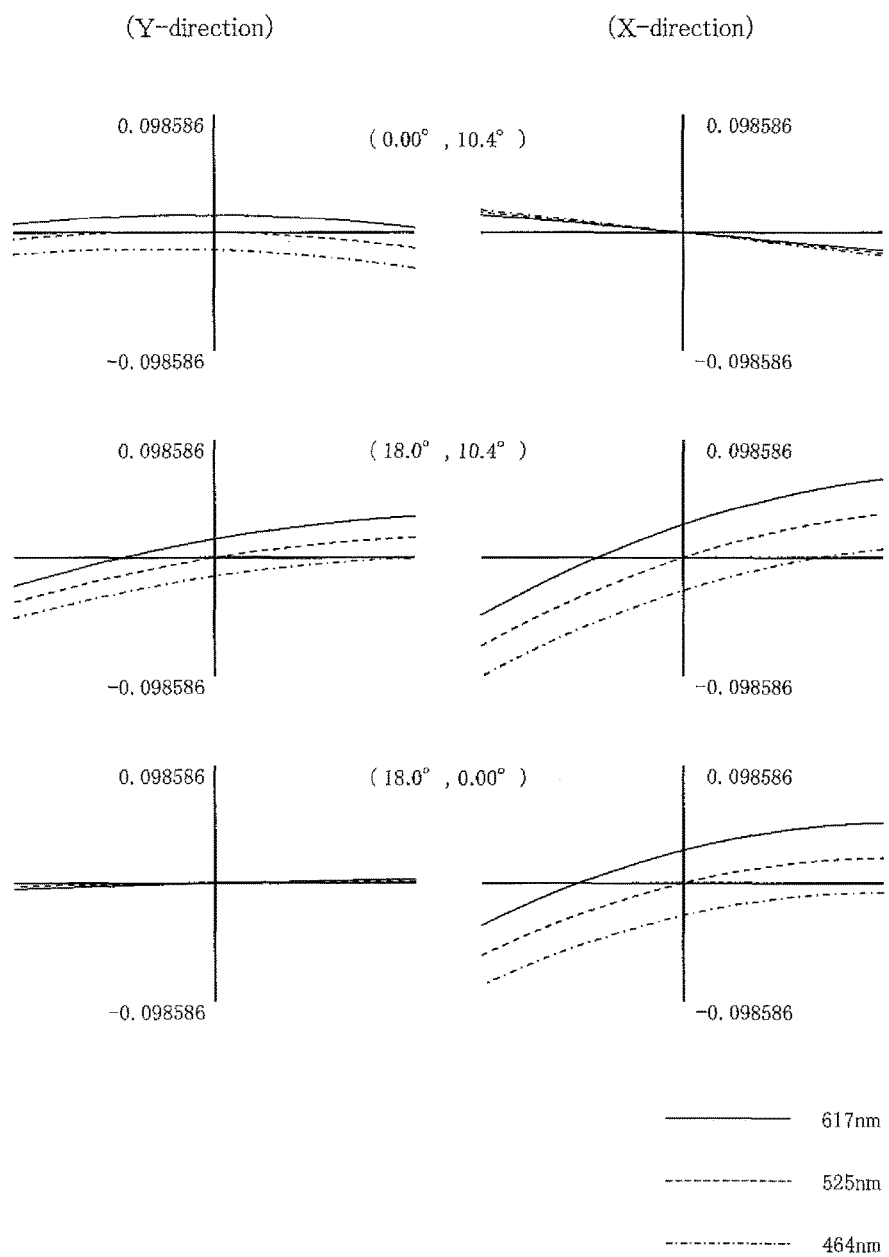
FIG. 9 is an aberration diagram for the direct-vision optical path through Example 1 of the decentered optical system.

FIG. 6 is a sectional view of a direct-vision optical path through Example 1 of the decentered optical system including the center chief ray, and FIG. 7 is a plan view of the direct-vision optical path through Example 1 of the decentered optical system. FIGS. 8 and 9 are aberration diagrams for the direct-vision optical path through Example 1 of the decentered optical system.

When the decentered optical system 1 is used as a direct-vision optical path through a see-through optical system, it includes a third optical element 30, a first optical element 10 and a second optical element 20 in order from an image plane $Im_2$ toward an object plane, and an aperture stop S as an exit pupil is formed on the image plane side of the second optical element 20. Assume here that a center chief ray Lc is defined by a light ray passing from the image plane $Im_2$ through the center of the exit pupil to the center of the object plane. The respective surfaces of the third 30, the first 10 and the second optical element 20 are decentered with respect to the center chief ray Lc.

Ray tracing through the direct-vision optical path through the decentered optical system 1 is now explained. As shown in FIG. 1, a light ray exiting out from the image plane $Im_2$ transmits through a quantity-of-light control 60 and enters the third optical element 30 from its first surface 31, exiting out from its second surface 32. The light ray exiting out from the second surface 32 of the third optical element 30 enters the first optical element 10 from its third surface 13. The light ray incident on the third surface 13 leaves the first optical element 10 from its second surface 12. The light ray exiting out from the first optical element 10 enters the second optical element 20 from its first surface 21, exiting out from the second surface 22. Exiting out from the second optical element 20, the light ray passes through the aperture stop S as the exit pupil for projection onto a viewer's pupil, a screen or the like.

It is here to be noted that Example 1 of the decentered optical system 1 may be used in the form of an image projection apparatus with an image display device 50 located at the image plane $Im_1$ or an imaging apparatus with an imaging device located at $Im_1$. While an ideal lens IL is shown in FIGS. 6 and 7, it is understood that as a matter of fact, the image plane $Im_2$ will be far away in the distance with the ideal lens IL removed. Note here that if an image-formation (imaging) plane is located in the position of the aperture stop S and the aperture stop is located in the position of the image plane $Im_1$, there may then be an image-formation optical system assembled.

Figure 10:
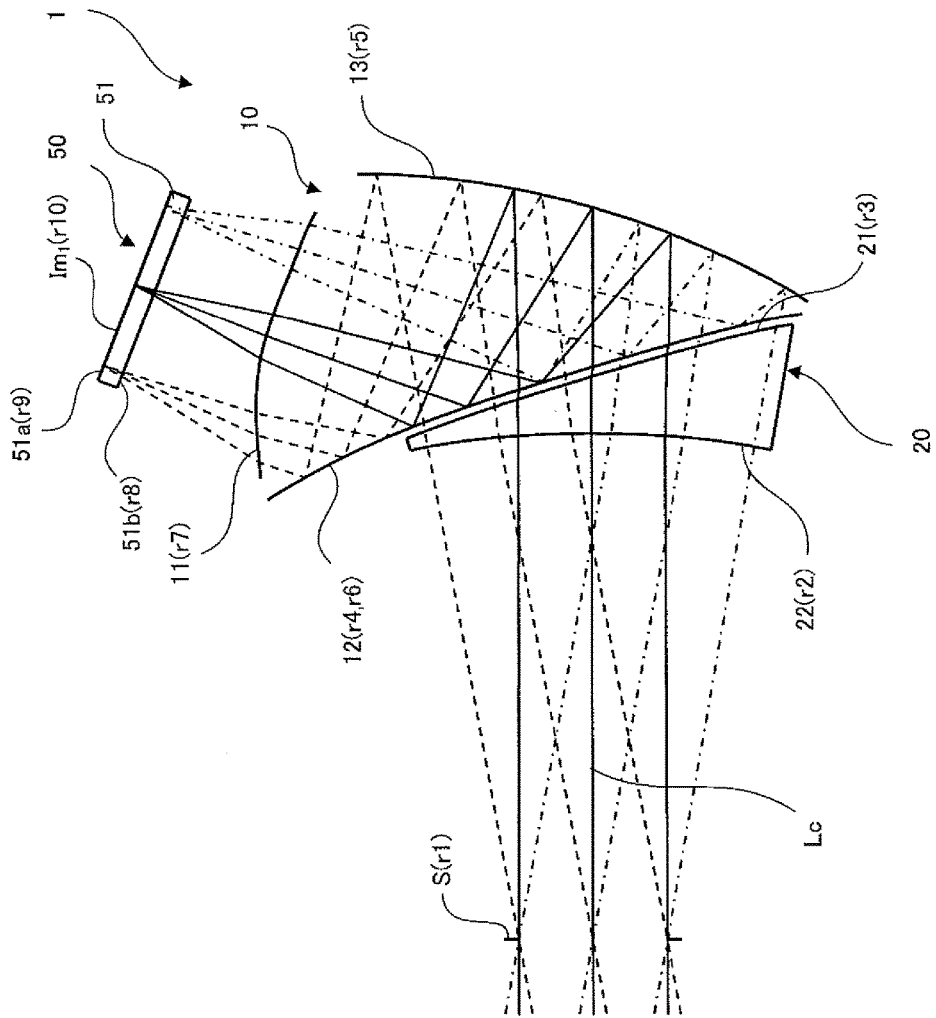
FIG. 10 is a sectional view of Example 2 of the decentered optical system including a center chief ray.
Figure 11:
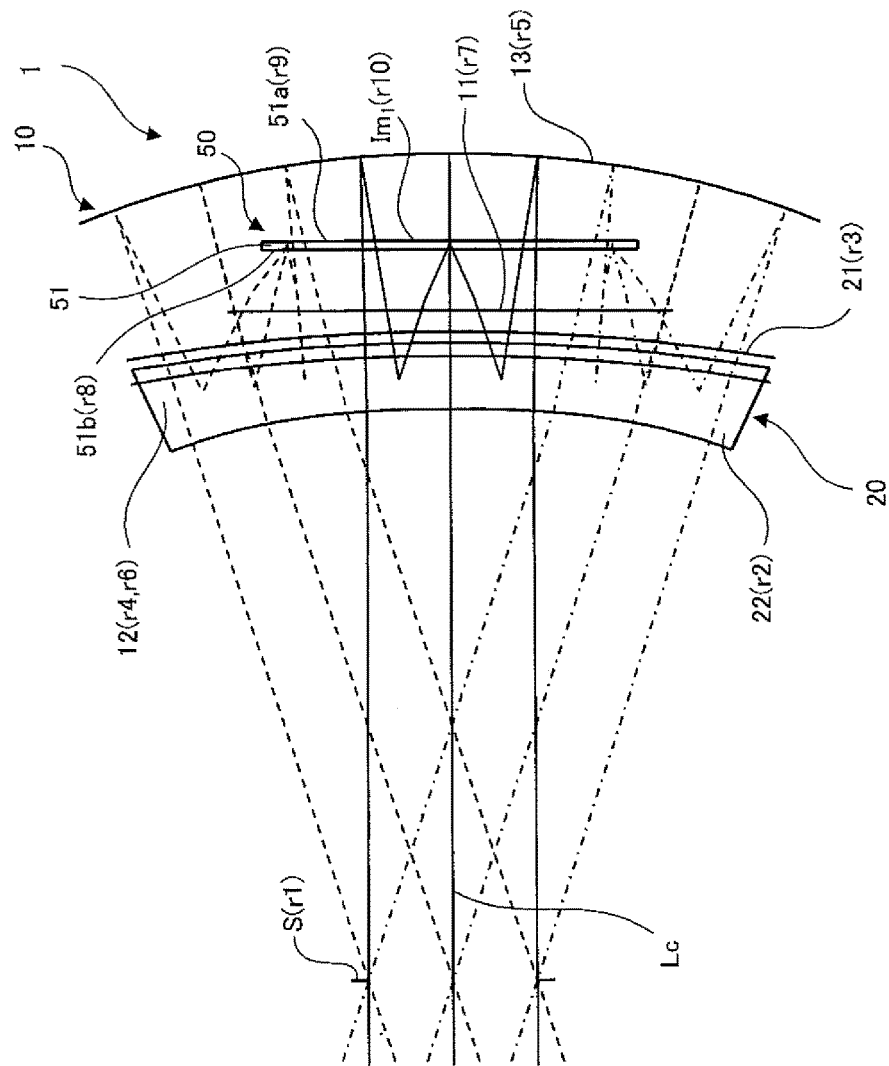
FIG. 11 is a plan view of Example 2 of the decentered optical system.
Figure 12:
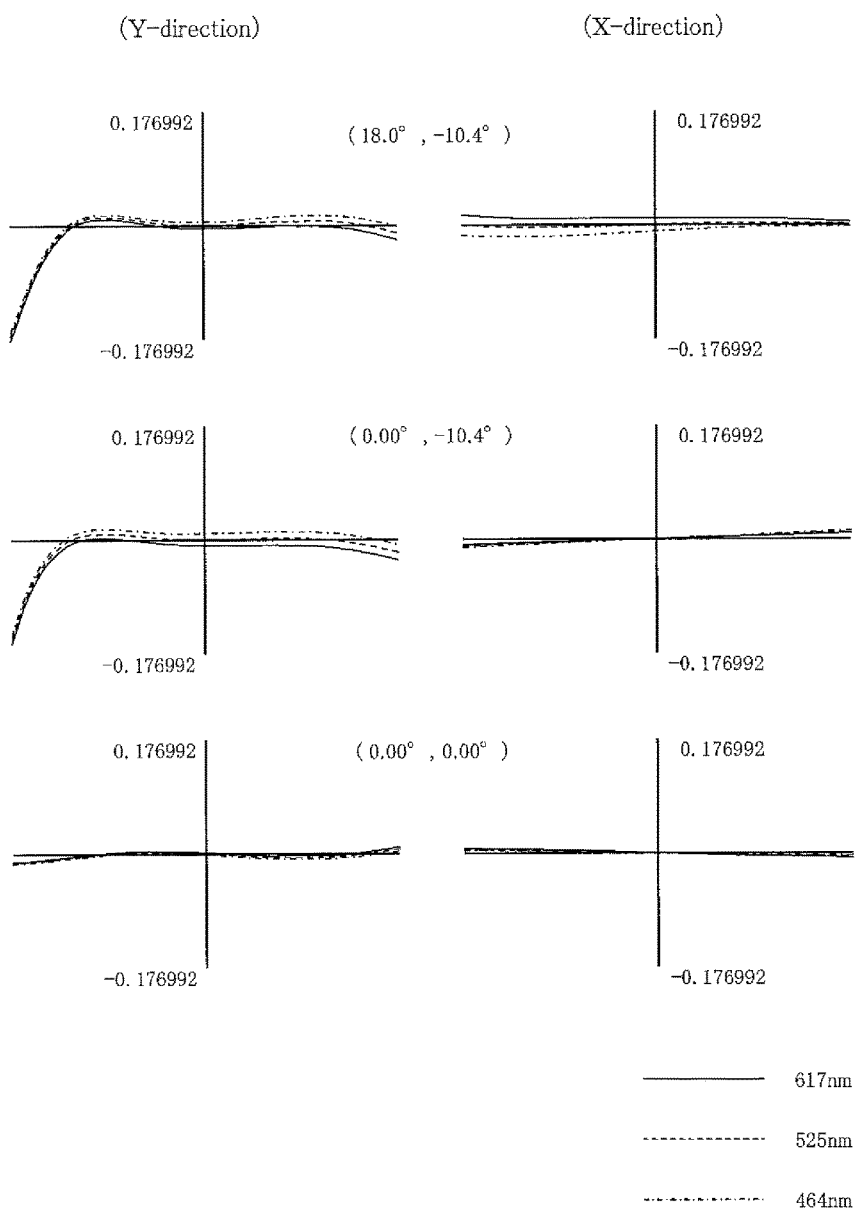
FIG. 12 is an aberration diagram for Example 2 of the decentered optical system.

FIG. 10 is a sectional view of Example 2 of the decentered optical system including a center chief ray, and FIG. 11 is a plan view of Example 2 of the decentered optical system. FIGS. 12 and 13 are aberration diagrams for Example 2 of the decentered optical system.

In order from an image plane $Im_1$ toward an object plane, Example 2 of the decentered optical system includes a first optical element 10 and a second optical element 20, and an aperture stop S is formed as an exit pupil on the object plane side of the second optical element 20. Assume here that a center chief ray Lc is defined by a light ray passing from the image plane $Im_1$ through the center of the exit pupil to the center of the object plane. The respective surfaces of the first 10 and the second optical element 20 are decentered with the center chief ray Lc.

Reference is here made to ray tracing in the case where the decentered optical system 1 is used with an image projection apparatus. A light ray exiting out from the image plane $Im_1$ as the display plane of an image display device 50 passes through the entrance 51a and exit surface 51b of a cover glass 51, entering the first optical element 10 from its first surface 11. The light ray incident from the first surface 11 is reflected off from a second surface 12 and then a third surface 13, leaving the first optical element 10 from its second surface 12. The light ray exiting out from the first optical element 10 enters the second optical element 20 from its first surface 21, leaving the second optical element 20 from its second surface 22. Exiting out from the second optical element 20, the light ray passes through the aperture stop S as the exit pupil for projection onto a viewer's pupil, a screen or the like.

Example 2 of the decentered optical system 1 further includes a direct-vision optical path using the third surface 13 of the first optical element 10 as a transmitting surface.

Figure 14:
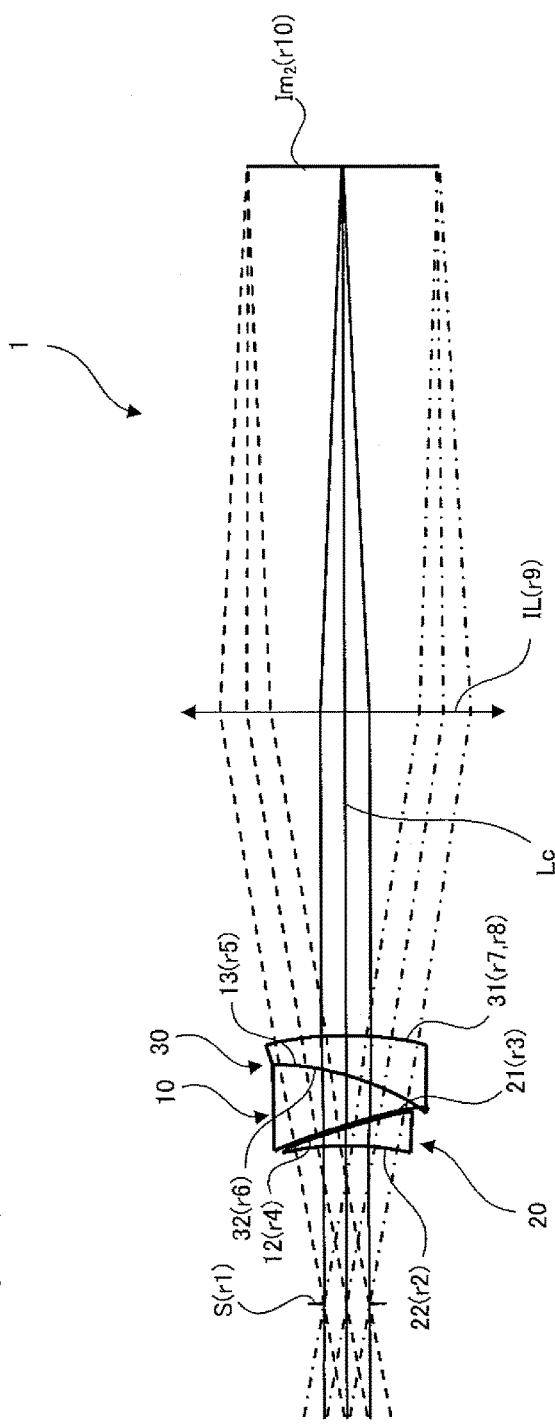
FIG. 14 is a sectional view of the direct-vision optical path through Example 2 of the decentered optical system including a center chief ray.
Figure 15:
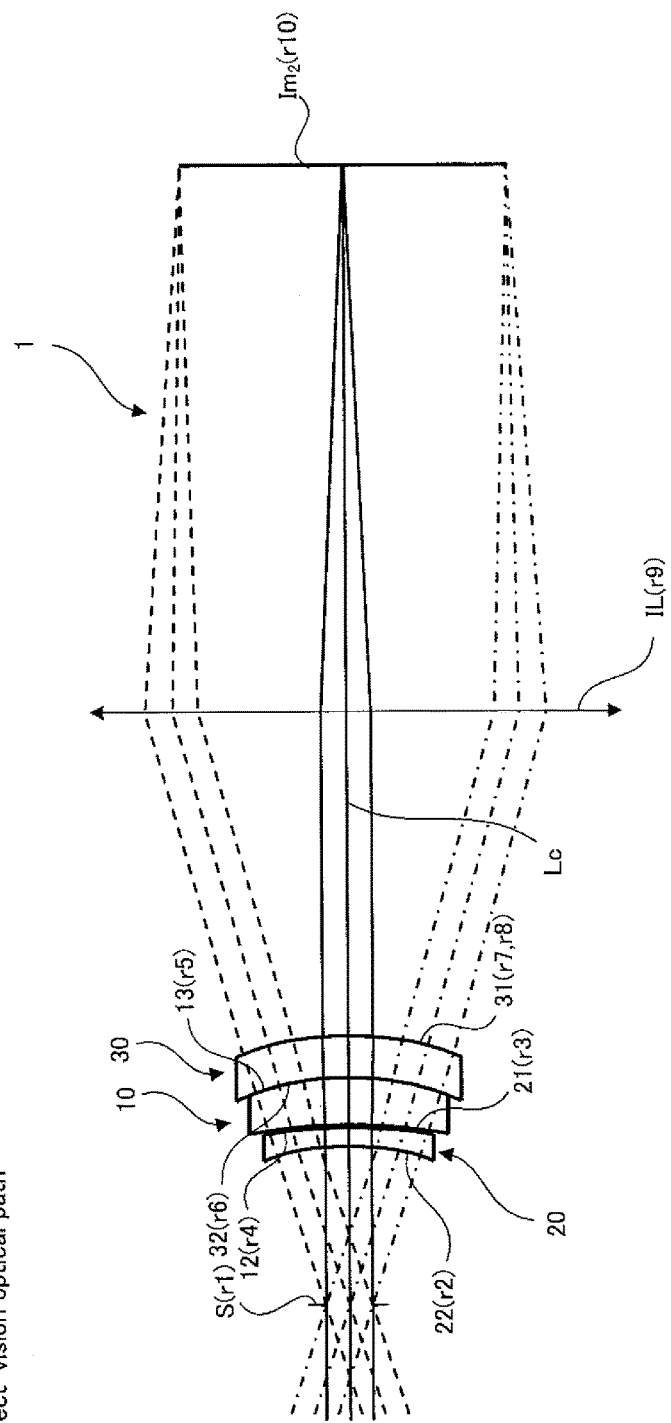
FIG. 15 is a plan view of the direct-vision optical path through Example 2 of the decentered optical system.
Figure 16:
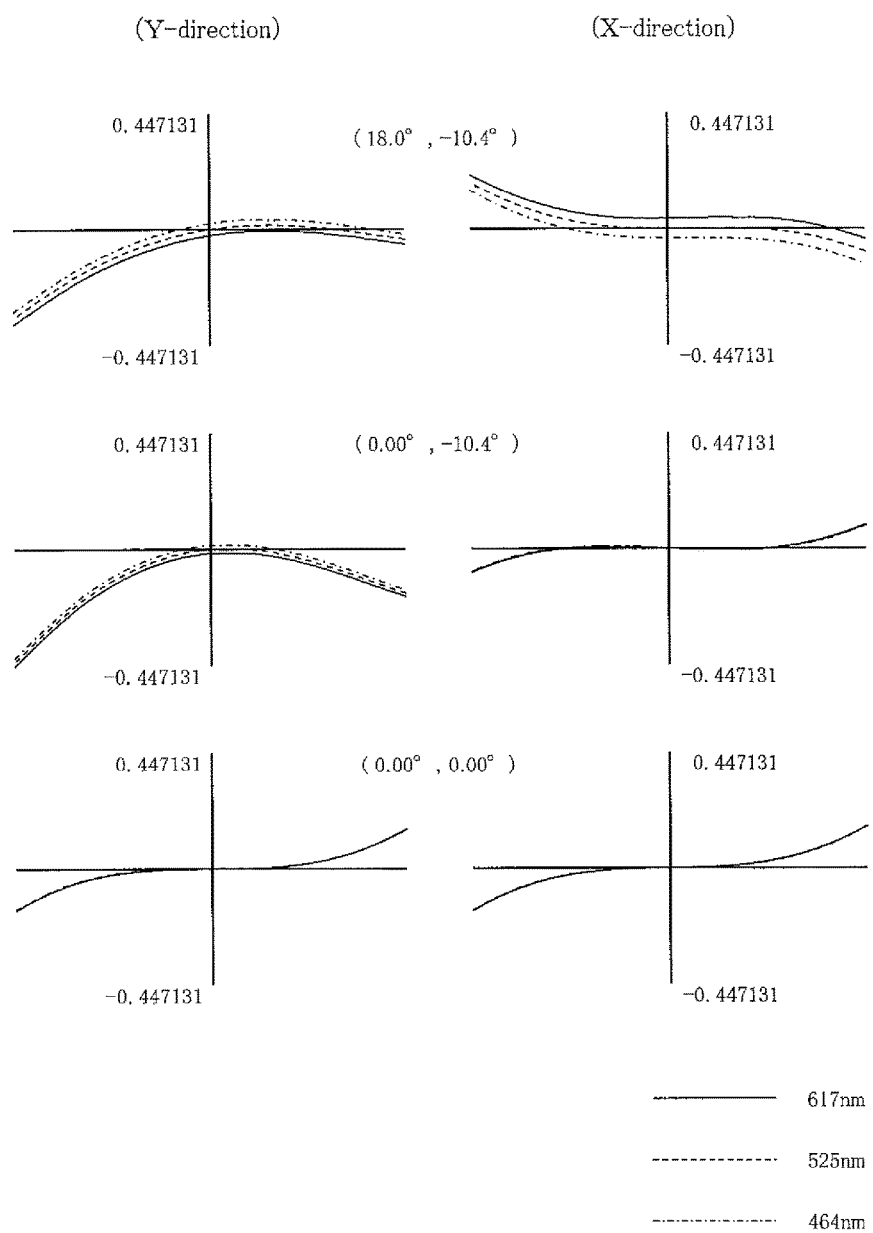
FIG. 16 is an aberration diagram for the direct-vision optical path through Example 3 of the decentered optical system.
Figure 17:
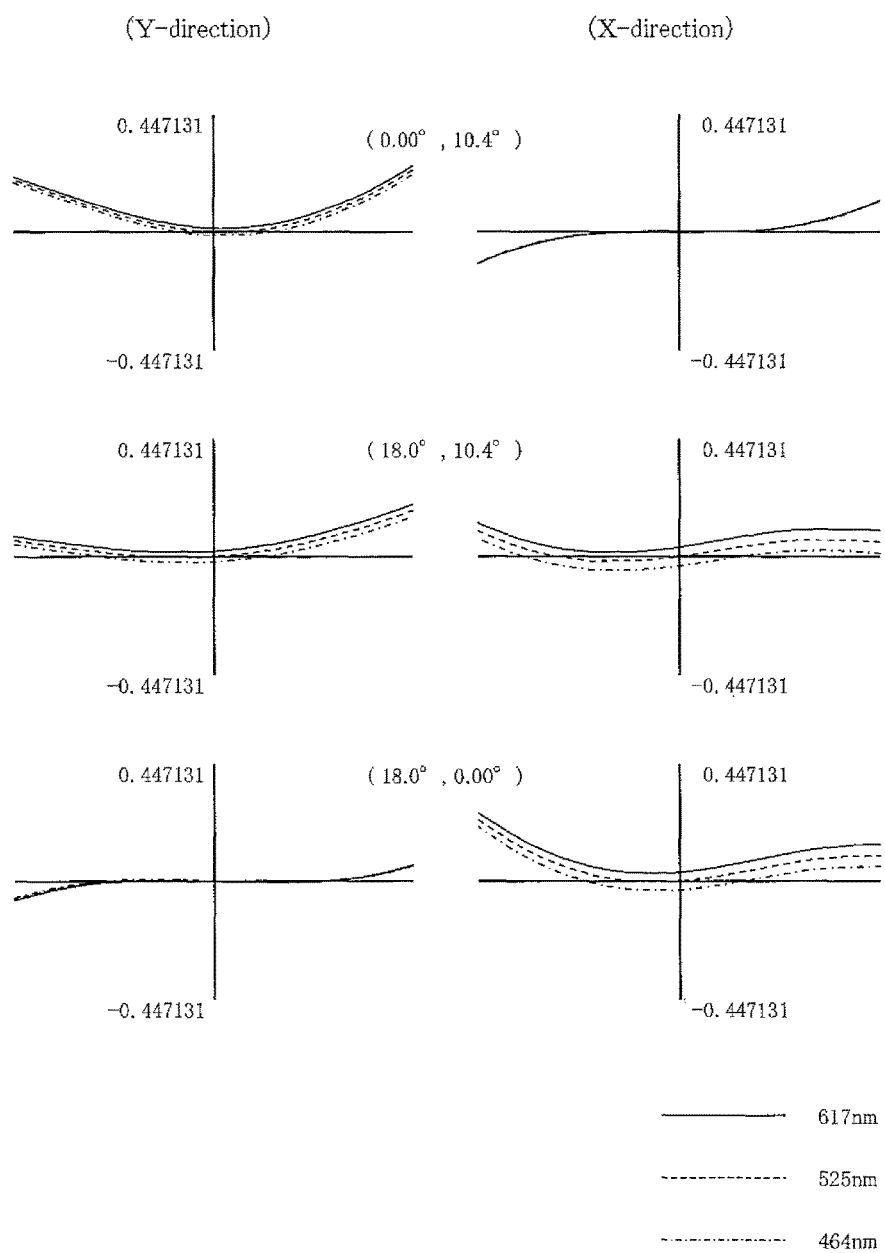
FIG. 17 is an aberration diagram for the direct-vision optical path through Example 3 of the decentered optical system.

FIG. 14 is a sectional view of a direct-vision optical path through Example 2 of the decentered optical system including a center chief ray, and FIG. 15 is a plan view of the direct-vision optical path through Example 2 of the decentered optical system. FIGS. 16 and 17 are aberration diagrams for the direct-vision optical path through Example 2 of the decentered optical system.

When the decentered optical system 1 is used as a direct-vision optical path through a see-through optical system, it includes a third optical element 30, a first optical element 10 and a second optical element 20 in order from an image plane $Im_2$ toward an object plane, and an aperture stop S is formed as an exit pupil on the object plane side of the second optical element 20. Assume here that a center chief ray Lc is defined by a light ray passing from the image plane $Im_2$ through the center of the exit pupil to the center of the object plane. The respective surfaces of the third 30, the first 10 and the second optical element 20 are decentered with respect to the center chief ray Lc.

Ray tracing through the direct-vision optical path through the decentered optical system 1 is now explained. A light ray exiting out from the image plane $Im_2$ enters the third optical element 30 from its first surface 31, exiting out from its second surface 32. The light ray from the second surface 32 of the third optical element 30 enters the first optical element 10 from its third surface 13. The light ray incident on the third surface 13 leaves the first optical element 10 from its second surface 12. The light ray exiting out from the first optical element 10 enters the second optical element 20 from its first surface 21, exiting out from its second surface 22. Exiting out from the second optical element 20, the light ray passes through the aperture stop S as the exit pupil for projection onto a viewer's pupil, a screen or the like.

It is here to be noted that Example 2 of the decentered optical system 1 may be used in the form of an image projection apparatus with an image display device 50 located at the image plane $Im_1$ or an imaging apparatus with an imaging device located at $Im_1$. While an ideal lens IL is shown in FIGS. 14 and 15, it is understood that as a matter of fact, the image plane $Im_2$ will be far away in the distance with the ideal lens IL removed.

Figure 18:
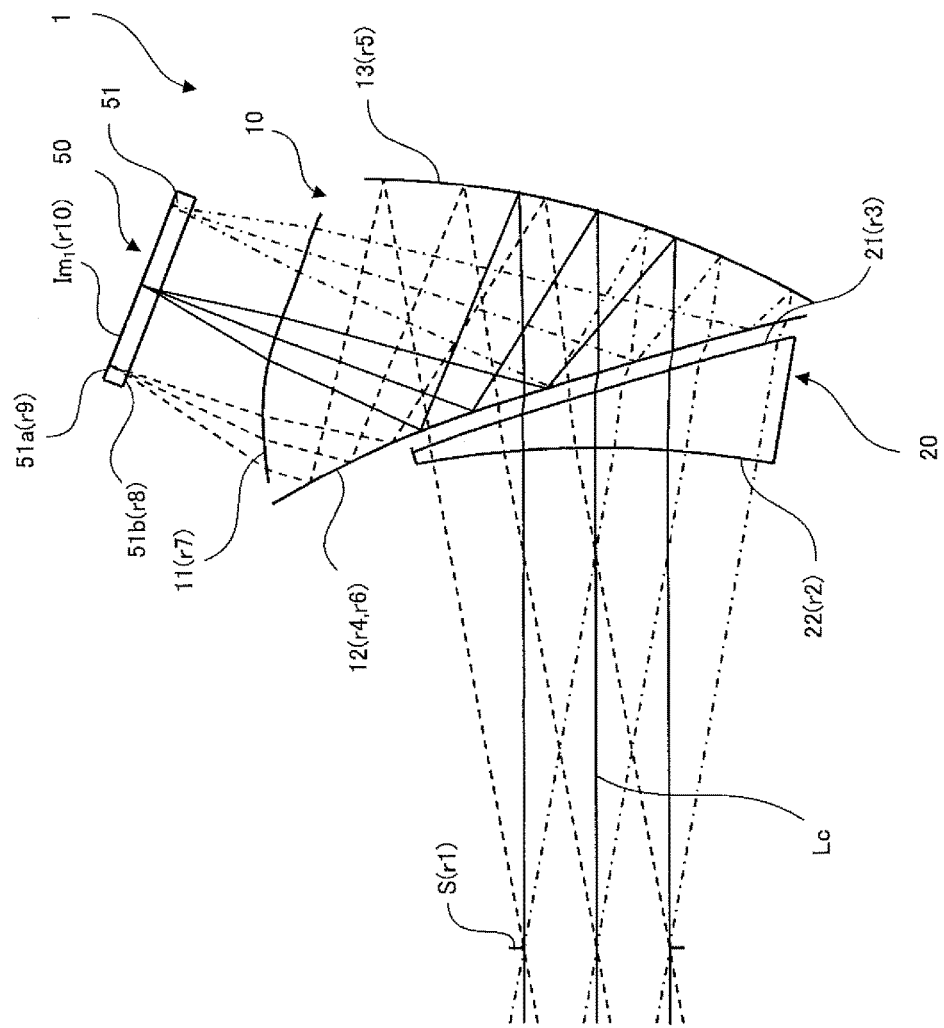
FIG. 18 is a sectional view of Example 3 of the decentered optical system including a center chief ray.
Figure 19:
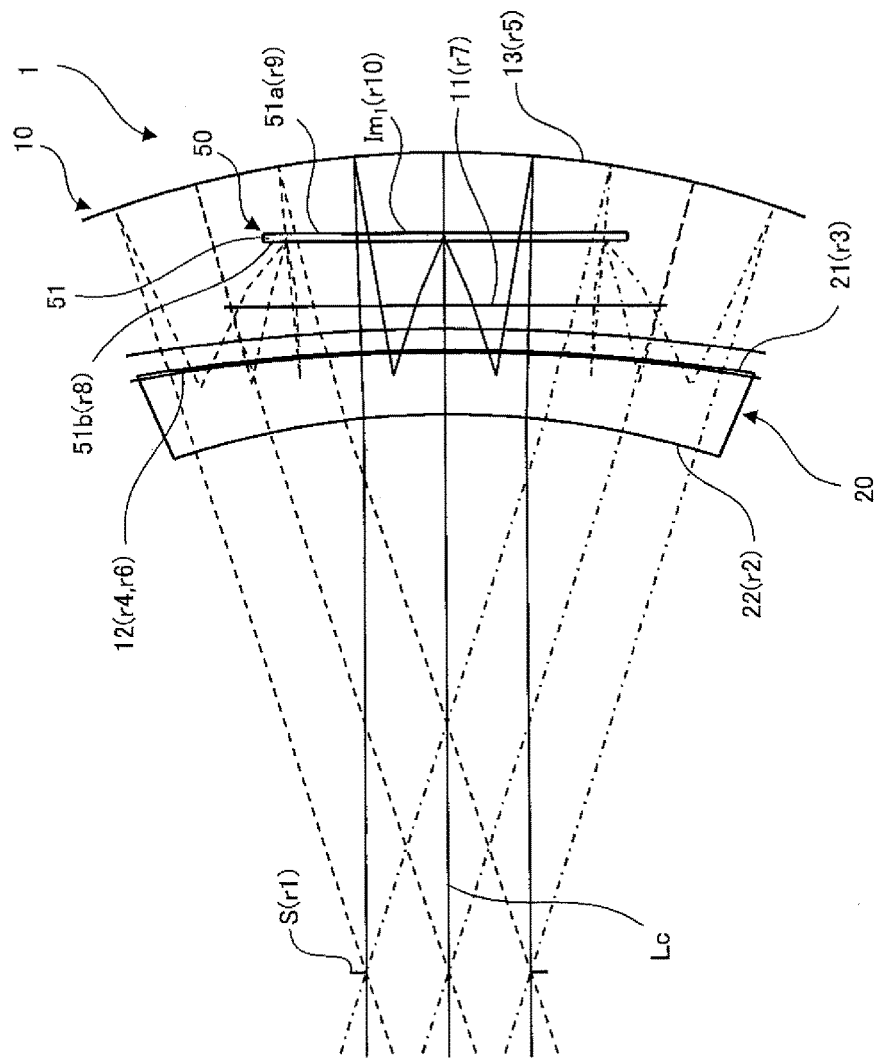
FIG. 19 is a plan view of Example 3 of the decentered optical system.
Figure 20:
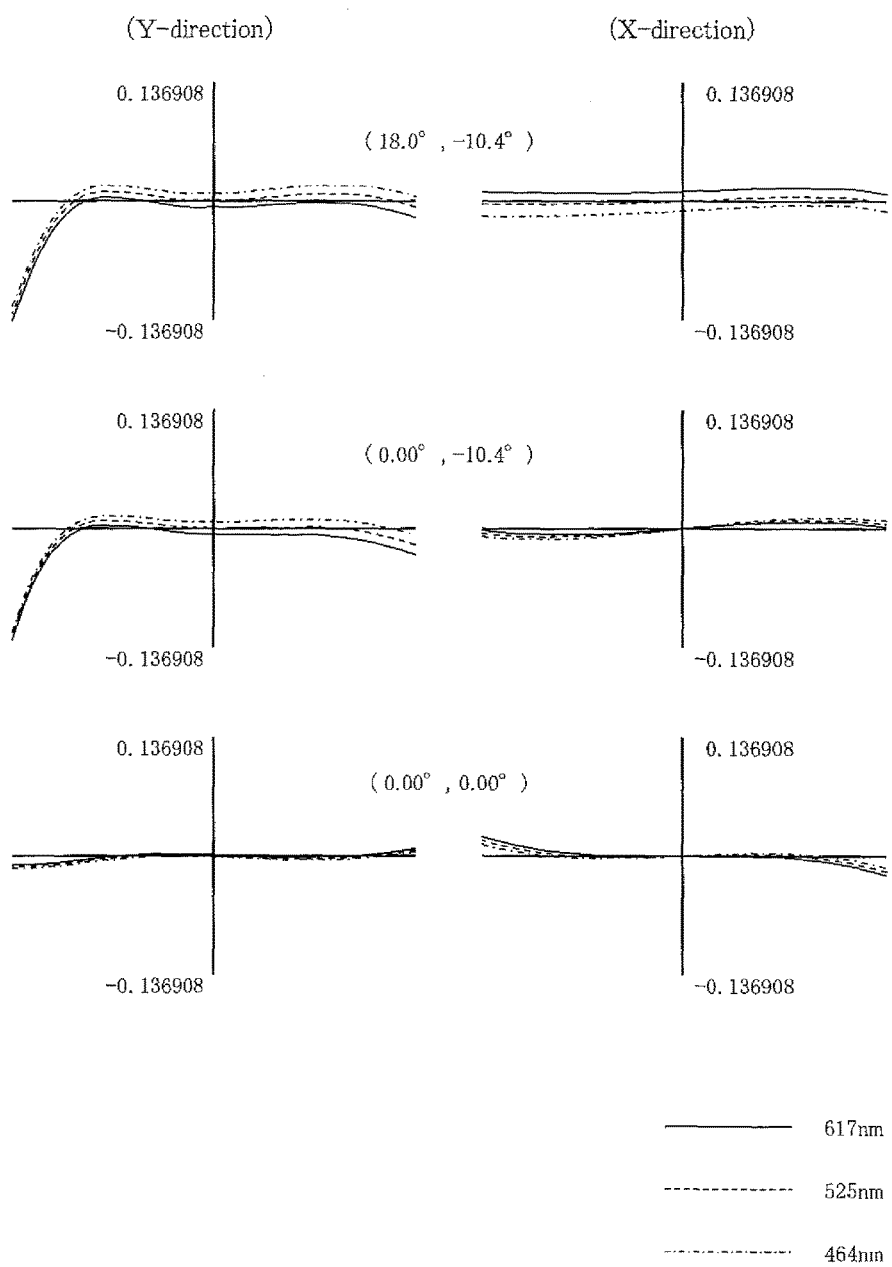
FIG. 20 is an aberration diagram for Example 3 of the decentered optical system.
Figure 21:
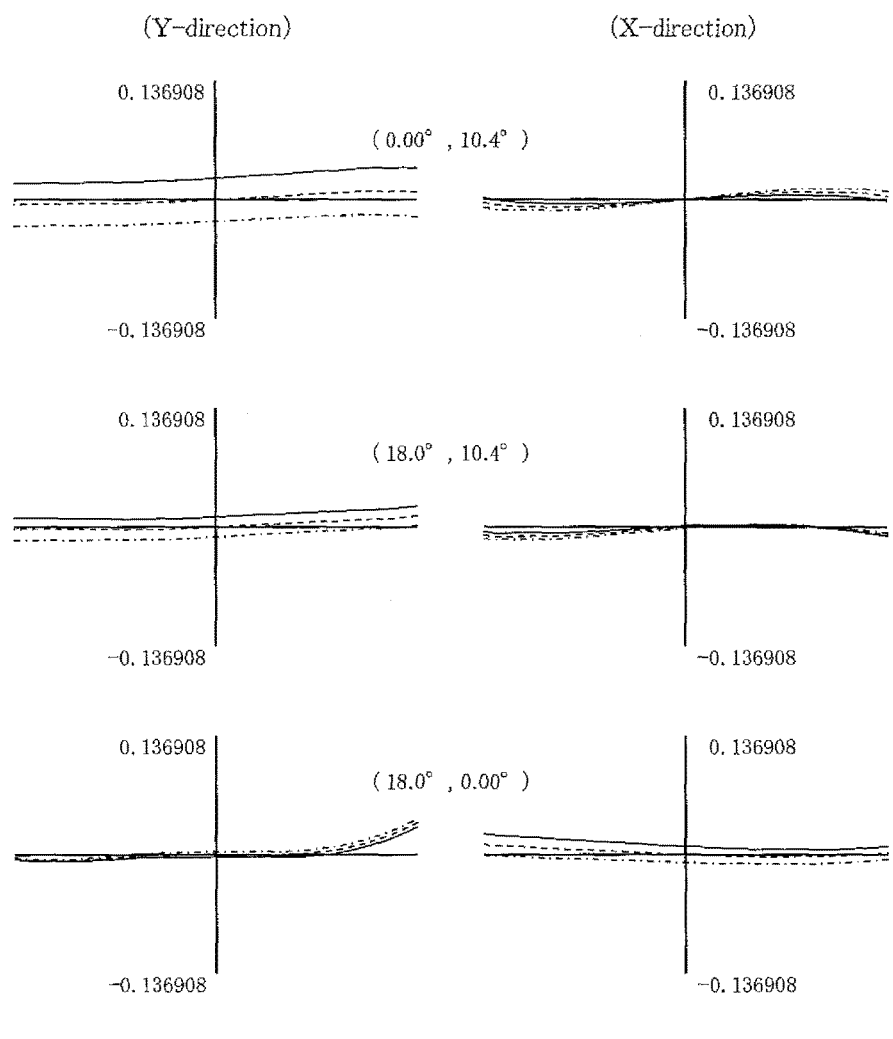
FIG. 21 is an aberration diagram for Example 3 of the decentered optical system.

FIG. 18 is a sectional view of Example 3 of the decentered optical system including a center chief ray, and FIG. 19 is a plan view of Example 3 of the decentered optical system. FIGS. 20 and 21 are aberration diagrams for Example 3 of the decentered optical system.

In order from an image plane $Im_1$ toward an object plane, Example 3 of the decentered optical system 1 includes a first optical element 10 and a second optical element 20, and an aperture stop S is formed as an exit pupil on the object plane side of the second optical element 20. Assume here that a center chief ray Lc is defined by a light ray passing from the image plane $Im_1$ through the center of the exit pupil to the center of the object plane. The respective surfaces of the first 10 and the second optical element 20 are decentered with respect to the center chief ray Lc.

Reference is now made to ray tracing in the case where the decentered optical system 1 is used with an image projection apparatus. A light ray exiting out from the image plane $Im_1$ as the display plane of an image display device 50 passes through the entrance 51a and the exit surface 51b of a cover glass 50, entering the first optical element 10 from its first surface 11. The light ray incident on the first surface 11 is reflected off from a second surface 12 and then a third surface 13, exiting out from the first optical element 10 from its second surface 12. The light ray exiting out from the first optical element 10 enters the second optical element 20 from its first surface 21, exiting out from its second surface 22. Exiting out from the second optical element 20, the light ray passes through the aperture stop S as the exit pupil for projection onto a viewer's pupil, a screen or the like.

Example 3 of the decentered optical system 1 further includes a direct-vision optical path using the third surface 13 of the first optical element 10 as a transmitting surface.

Figure 22:
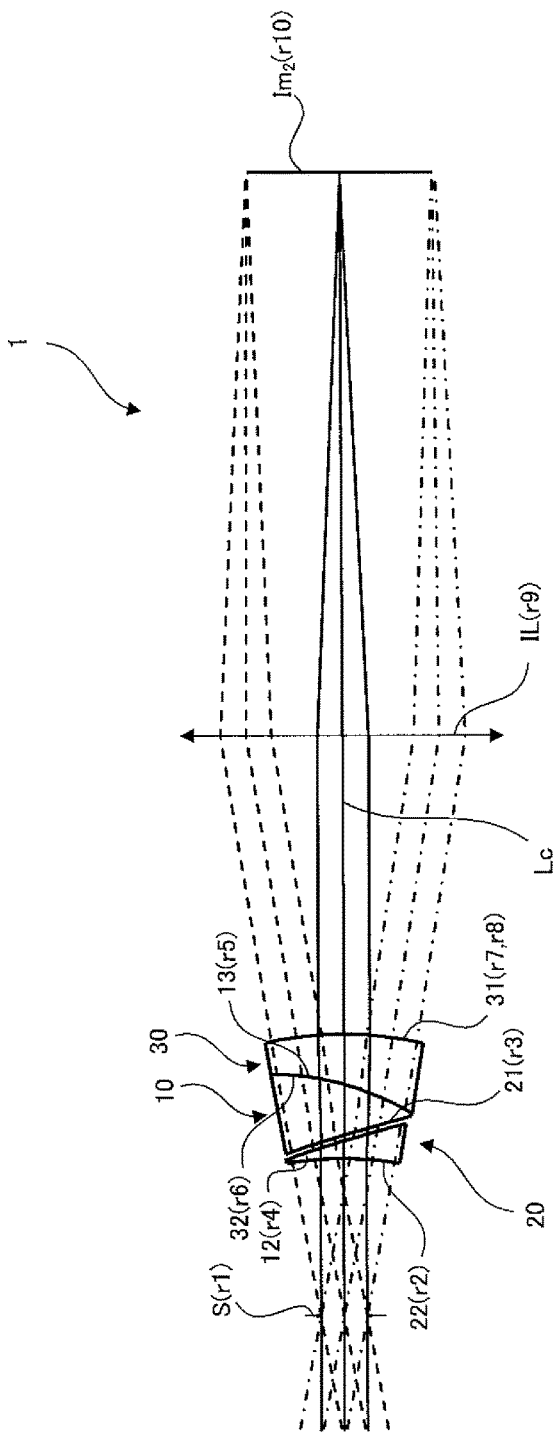
FIG. 22 is a sectional view of the direct-vision optical path through Example 3 of the decentered optical system including a center chief ray.
Figure 23:
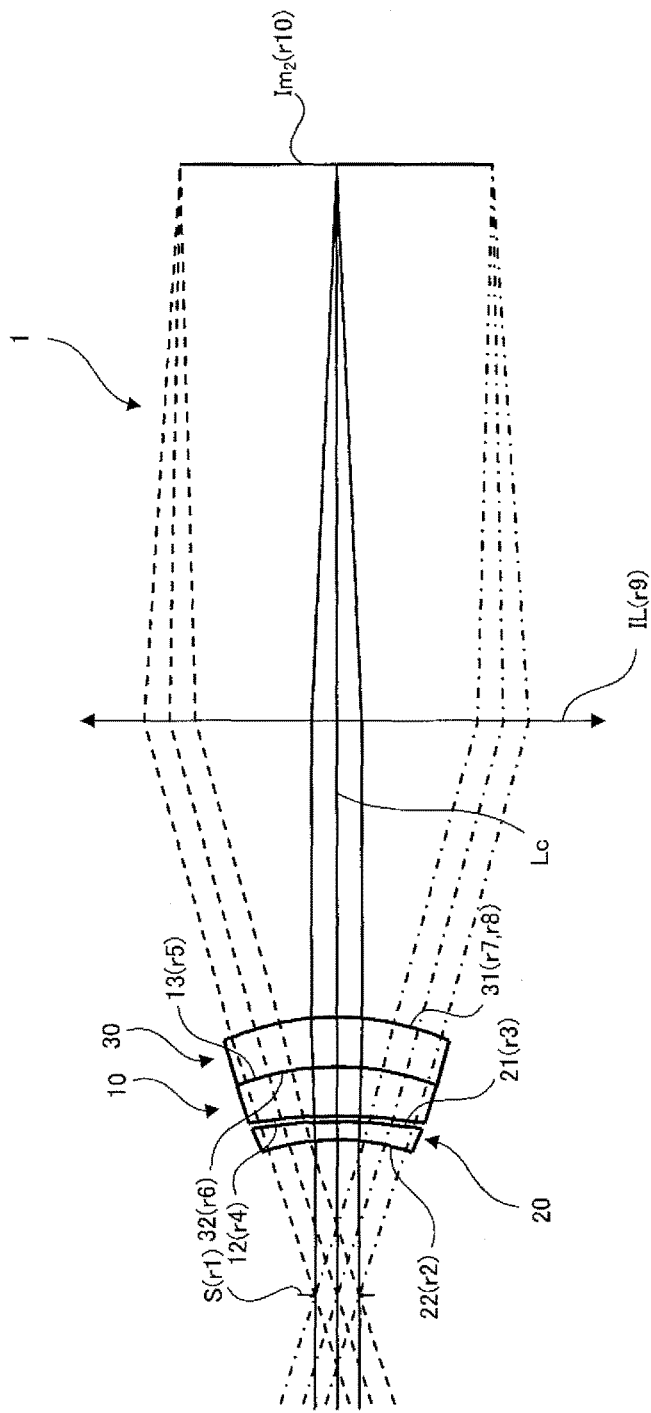
FIG. 23 is a plan view of the direct-vision optical path through Example 3 of the decentered optical system.
Figure 24:
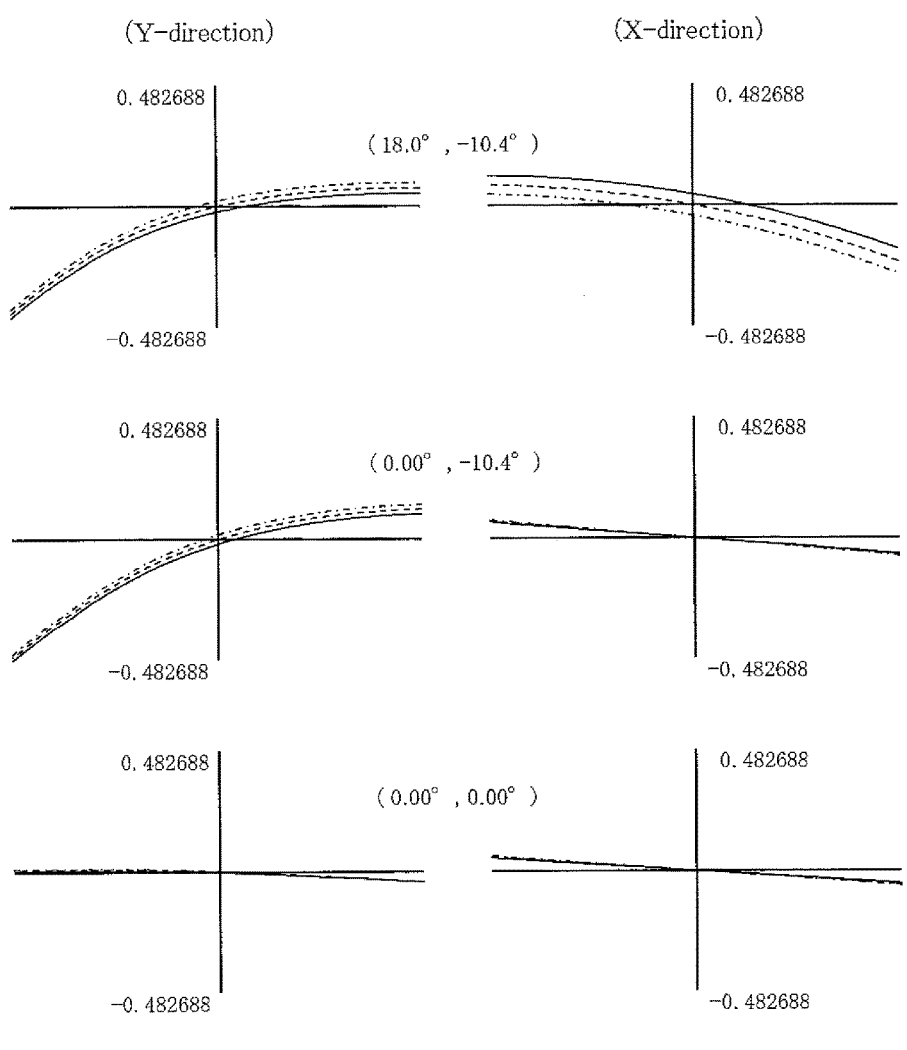
FIG. 24 is an aberration diagram for the direct-vision optical path through Example 3 of the decentered optical system.
Figure 25:
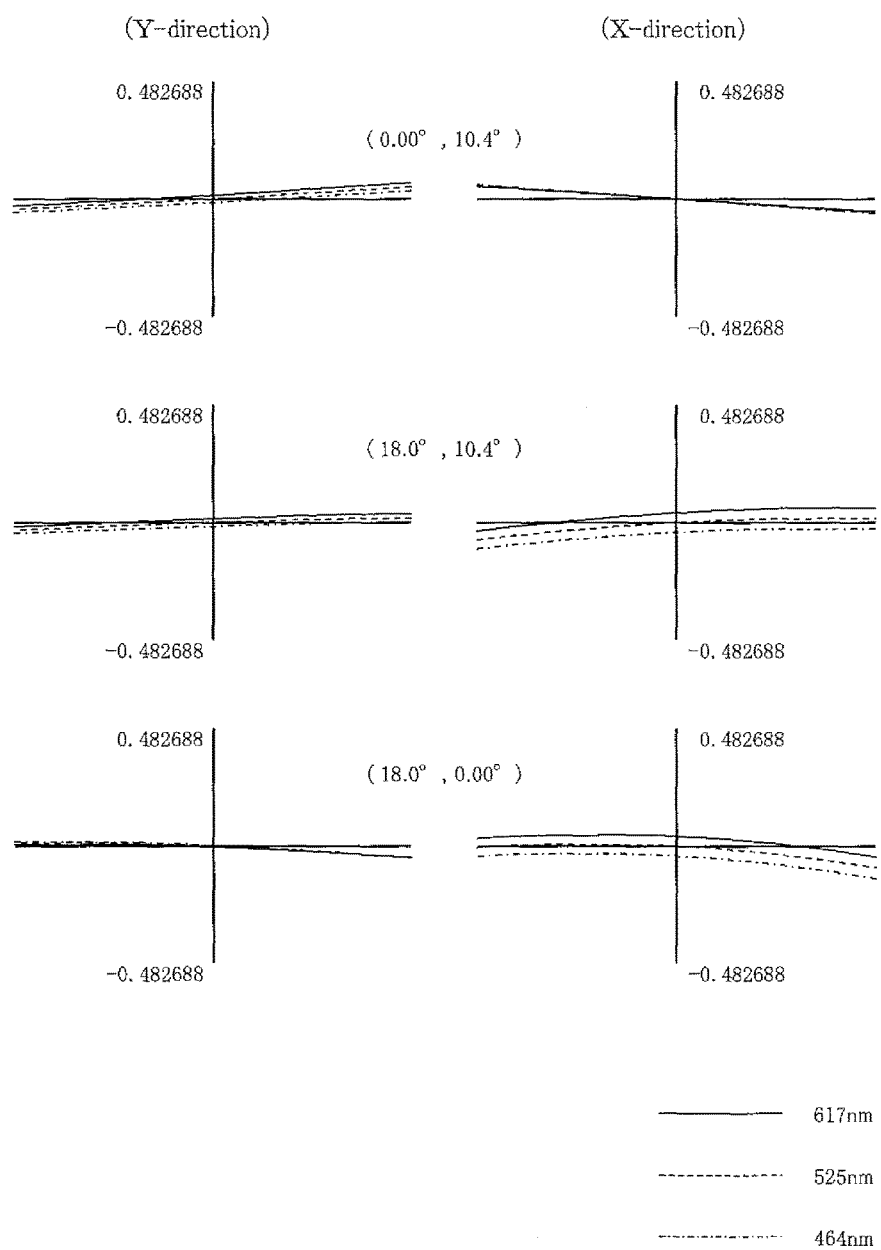
FIG. 25 is an aberration diagram for the direct-vision optical path through Example 3 of the decentered optical system.

FIG. 22 is a sectional view of a direct-vision optical path through Example 3 of the decentered optical system including a center chief ray, and FIG. 23 is a plan view of the direct-vision optical path through Example 3 of the decentered optical system. FIGS. 24 and 25 are aberration diagrams for the direct-vision optical path through Example 3 of the decentered optical system.

When the decentered optical system 1 is used as a direct-vision optical path through a see-through optical system, it includes a third optical element 30, a first optical element 10 and a second optical element 20 in order from an image plane $Im_2$ toward an object plane, and an aperture stop S is formed as an exit pupil on the object plane side of the second optical element 20. Assume here that a center chief ray Lc is defined by a light ray passing from the image plane $Im_2$ through the center of the exit pupil to the center of the object plane. The respective surfaces of the third 30, the first 10 and the second optical element 20 are decentered with respect to the center chief ray Lc.

Ray tracing through the direct-vision optical path through the decentered optical system 1 is now explained. A light ray exiting out from the image plane $Im_2$ enters the third optical element 30 from its first surface 31, exiting out from its second surface 32. The light ray exiting out from the second surface 32 of the third optical element 30 enters the first optical element 10 from its third surface 13. The light ray incident on the third surface 13 leaves the first optical element 10 from its second surface 12. The light ray exiting out from the first optical element 10 enters the second optical element 20 from its first surface 21, exiting out from its second surface 22. Exiting out from the second optical element 20, the light ray passes through the aperture stop S as the exit pupil for projection onto a viewer's pupil, a screen or the like.

It is here to be noted that Example 3 of the decentered optical system 1 may be used in the form of an image projection apparatus with an image display device 50 located at the image plane $Im_1$ or an imaging apparatus with an imaging device located at $Im_1$. While an ideal lens IL is shown in FIGS. 22 and 23, it is understood that as a matter of fact, the image plane $Im_2$ will be far away in the distance with the ideal lens IL removed.

Figure 26:
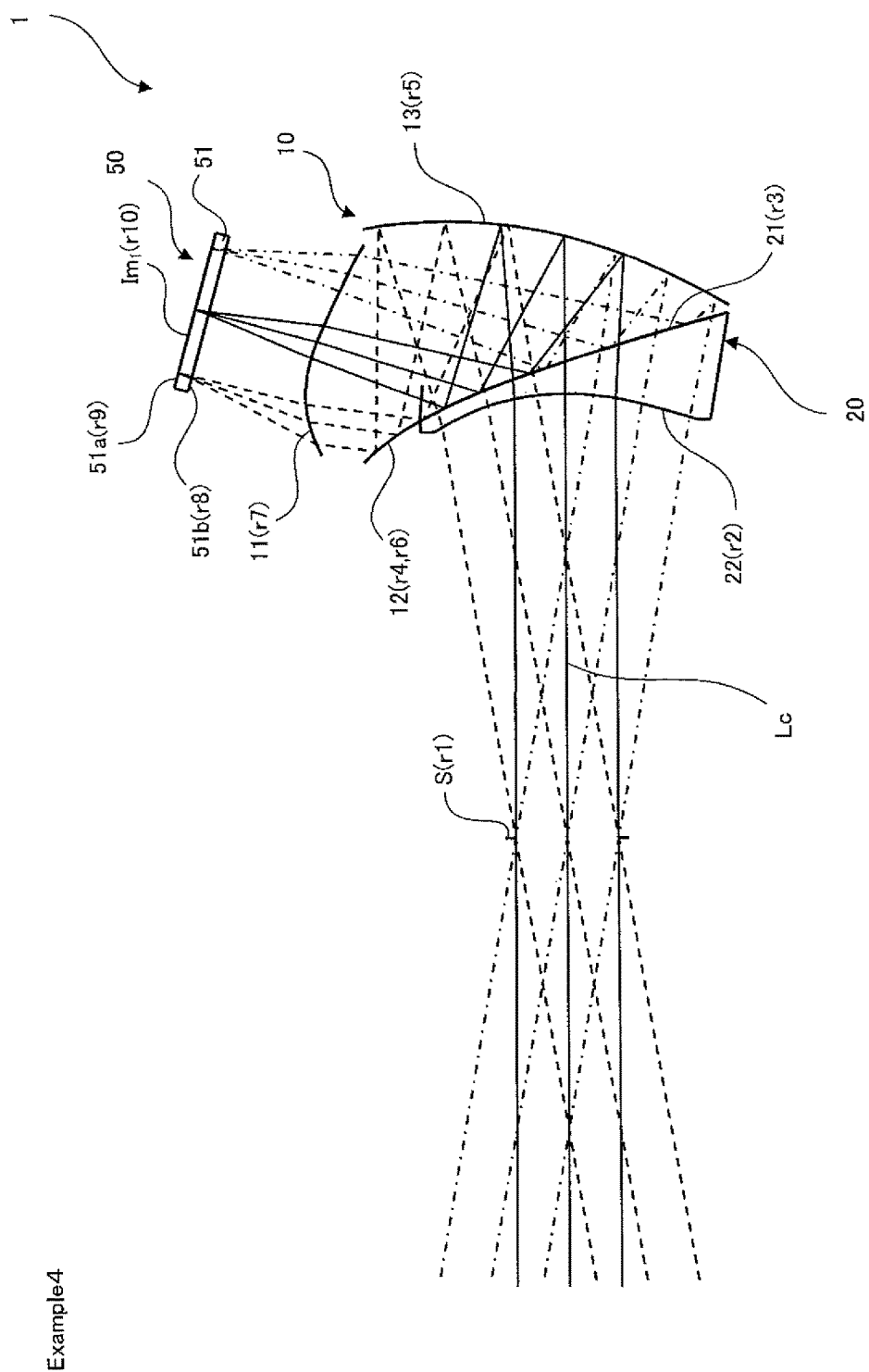
FIG. 26 is a sectional view of Example 3 of the decentered optical system including a center chief ray.
Figure 27:
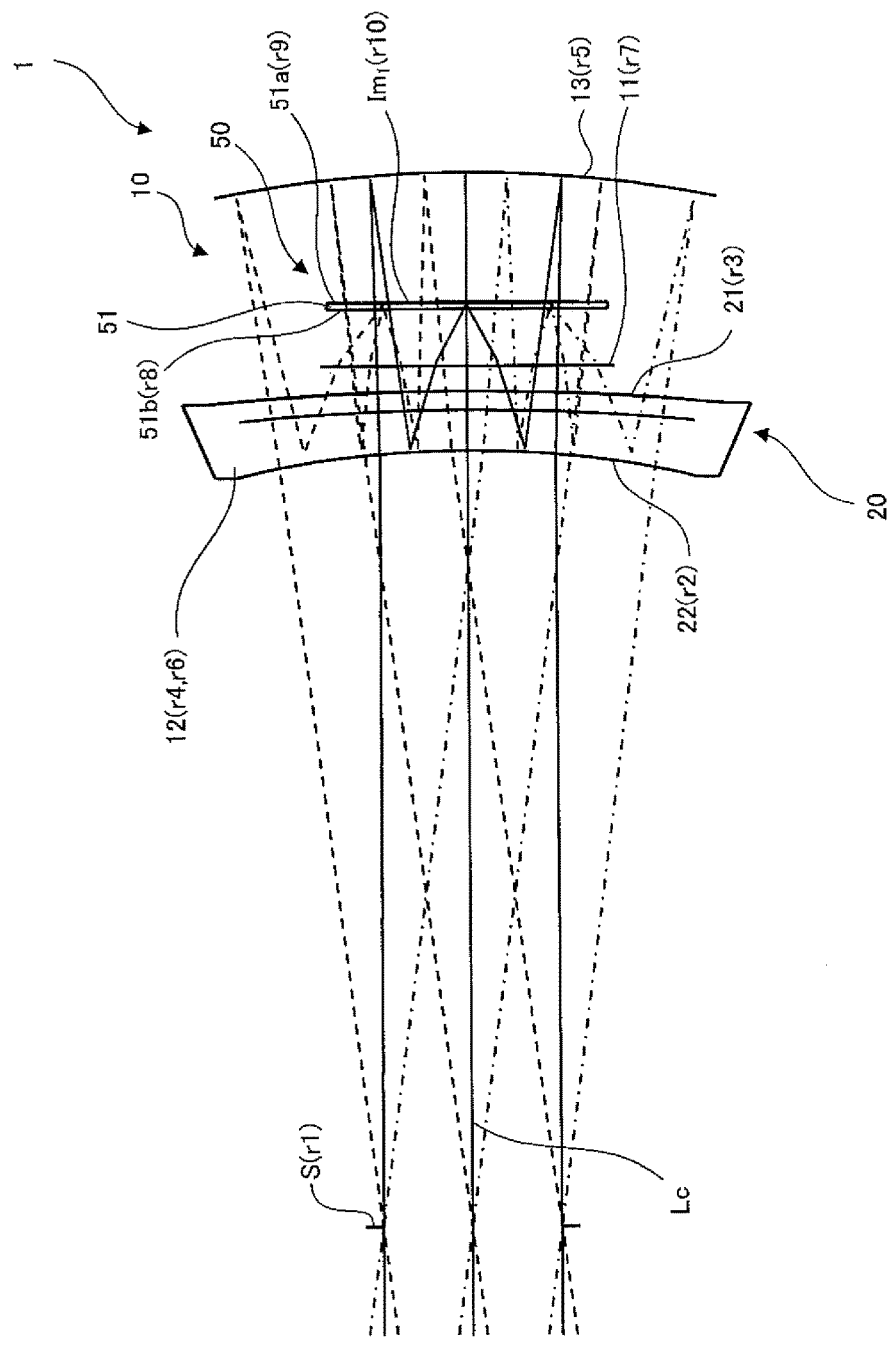
FIG. 27 is a plan view of Example 4 of the decentered optical system.
Figure 28:
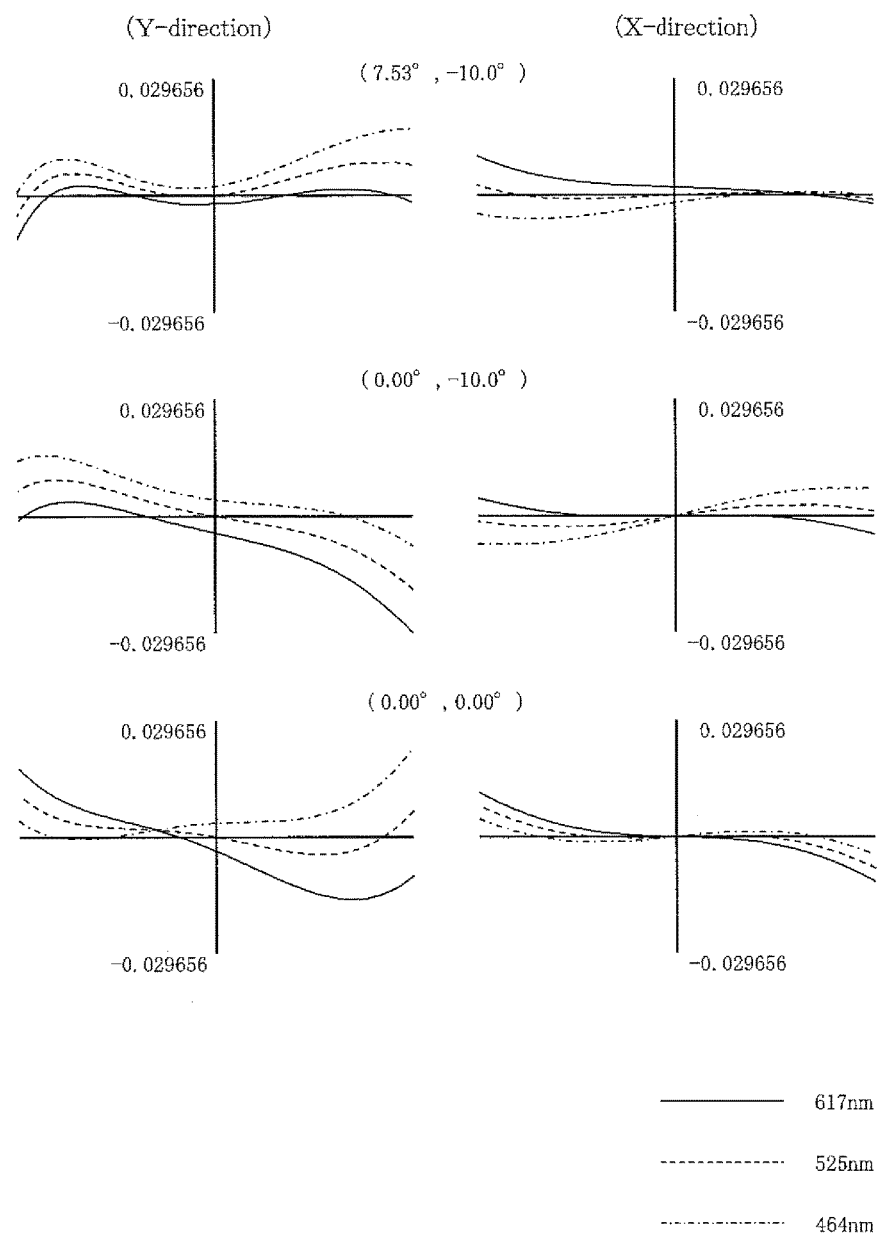
FIG. 28 is an aberration diagram for Example 4 of the decentered optical system.
Figure 29:
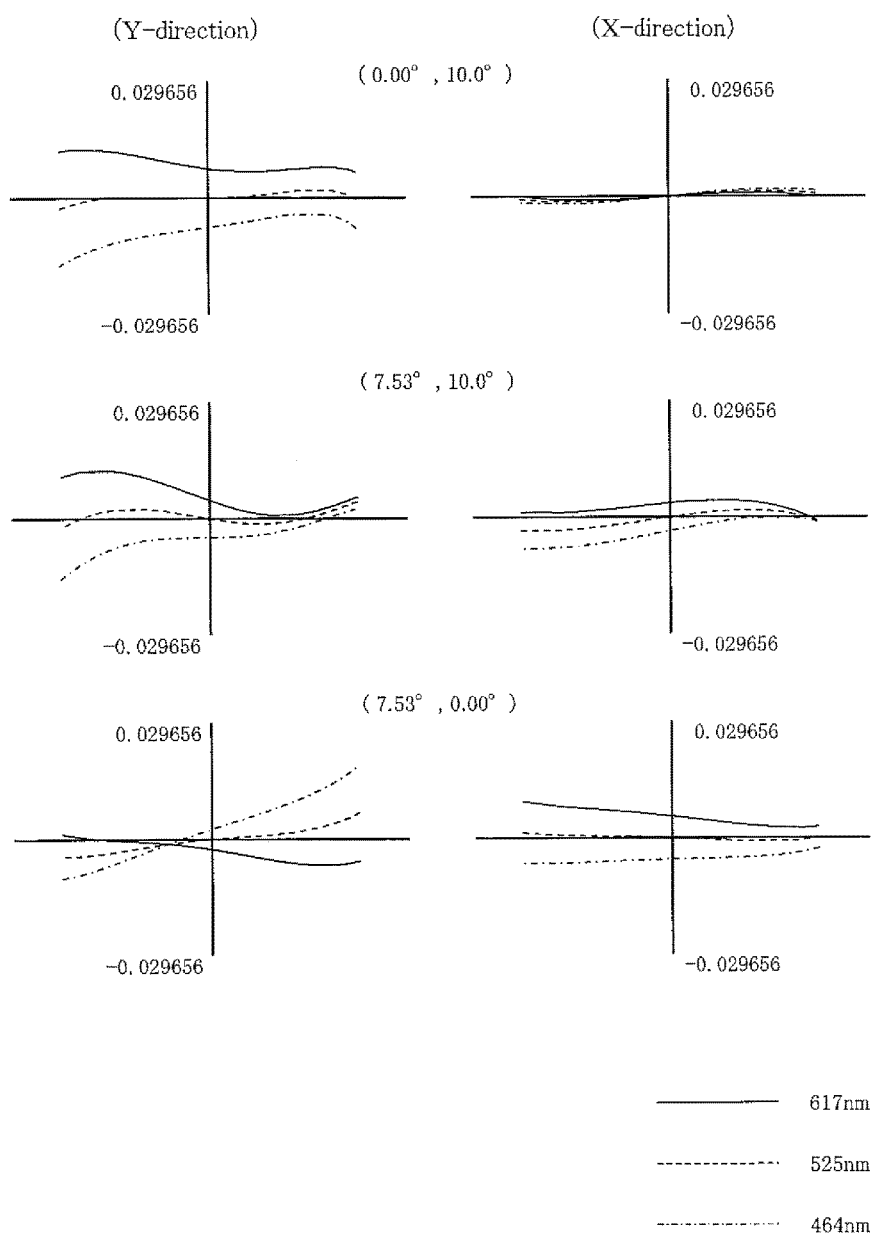
FIG. 29 is an aberration diagram for Example 4 of the decentered optical system.

FIG. 26 is a sectional view of Example 4 of the decentered optical system including the center chief ray, and FIG. 27 is a plan view of Example 4 of the decentered optical system. FIGS. 28 and 29 are aberration diagrams for Example 4 of the decentered optical system.

In order from an image plane $Im_1$ toward an object plane, Example 4 of the decentered optical system 1 includes a first optical element 10 and a second optical element 20, and an aperture stop S is formed as an exit pupil on the object plane side of the second optical element 20. Assume here that a center chief ray Lc is defined by a light ray passing from the image plane $Im_1$ through the center of the exit pupil to the center of the object plane. The respective surfaces of the first 10 and the second optical element 20 are decentered with respect to the center chief ray Lc.

Reference is now made to ray tracing in the case where the decentered optical system 1 is used with an image projection apparatus. A light ray exiting out from the image plane $Im_1$ as the display plane of an image display device 50 passes through the entrance 51*a* and the exit surface 51*b* of a cover glass 50, entering the first optical element 10 from its first surface 11. The light ray incident on the first surface 11 is reflected off from a second surface 12 and then a third surface 13, exiting out from the first optical element 10 from its second surface 12. The light ray exiting out from the first optical element 10 enters the second optical element 20 from its first surface 21, exiting out from its second surface 22. Exiting out from the second optical element 20, the light ray passes through the aperture stop S as the exit pupil for projection onto a viewer's pupil, a screen or the like.

Example 4 of the decentered optical system 1 further includes a direct-vision optical path using the third surface 13 of the first optical element 10 as a transmitting surface.

Figure 30:
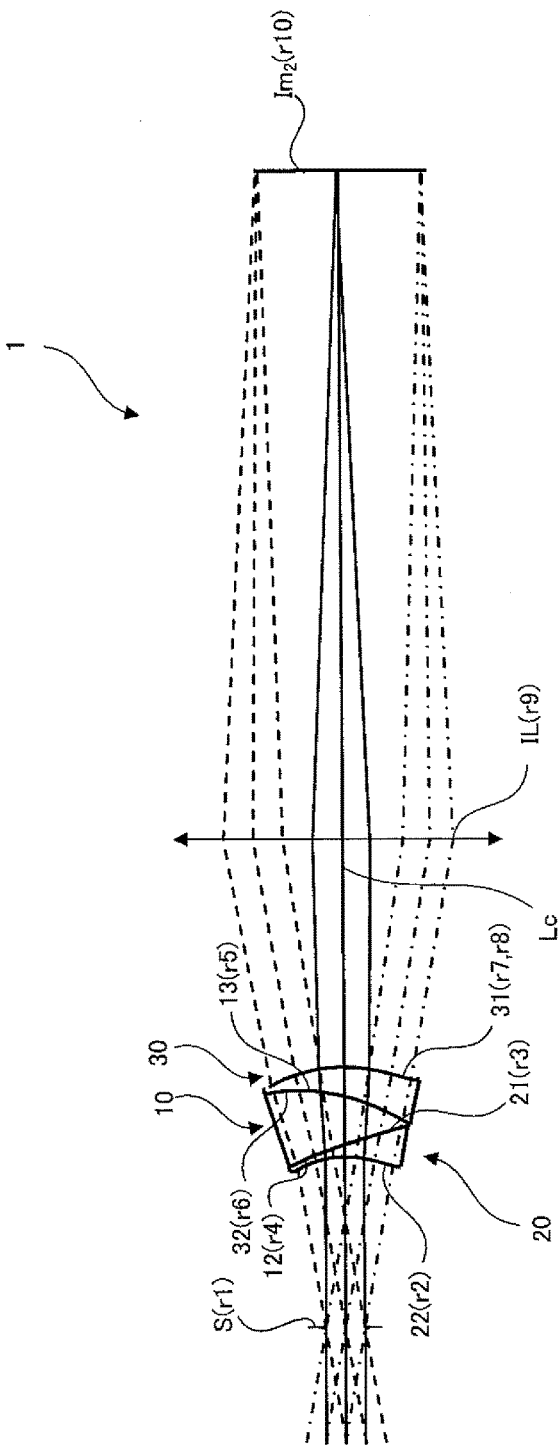
FIG. 30 is a sectional view of the direct-vision optical path through Example 4 of the decentered optical system including a center chief ray.
Figure 31:
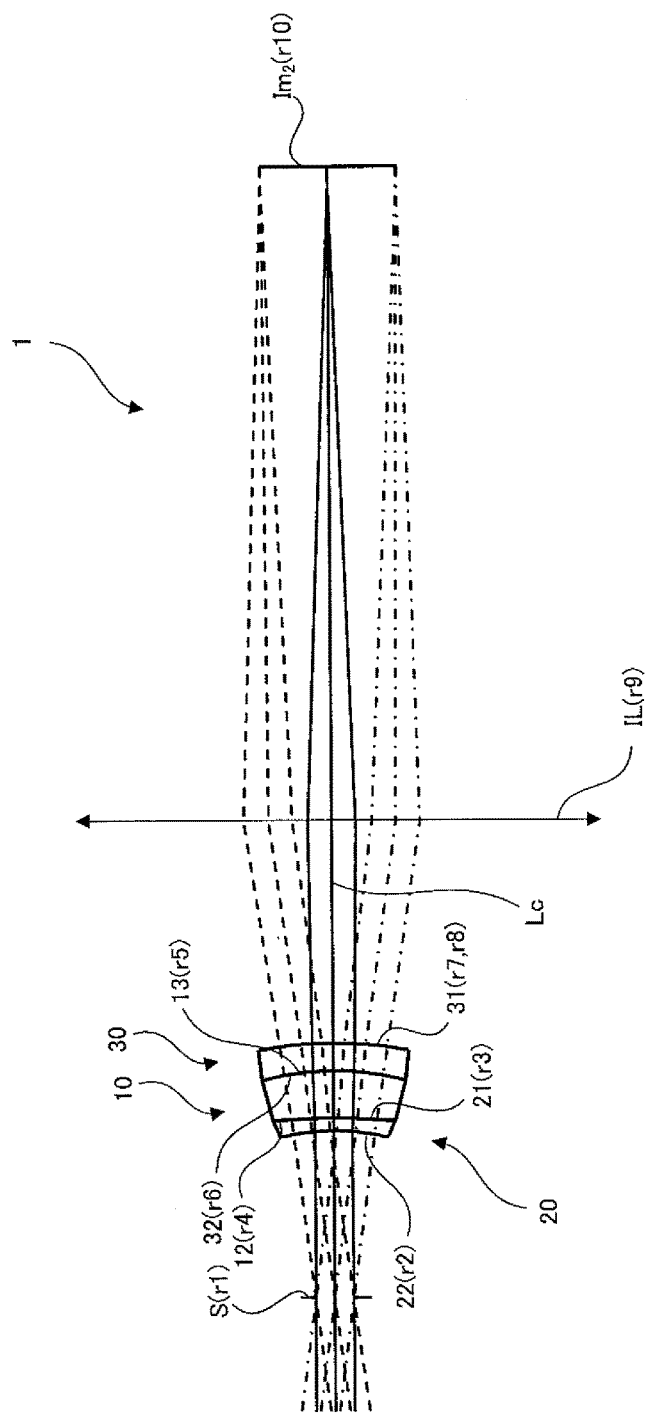
FIG. 31 is a plan view of the direct-vision optical path through Example 4 of the decentered optical system.
Figure 32:
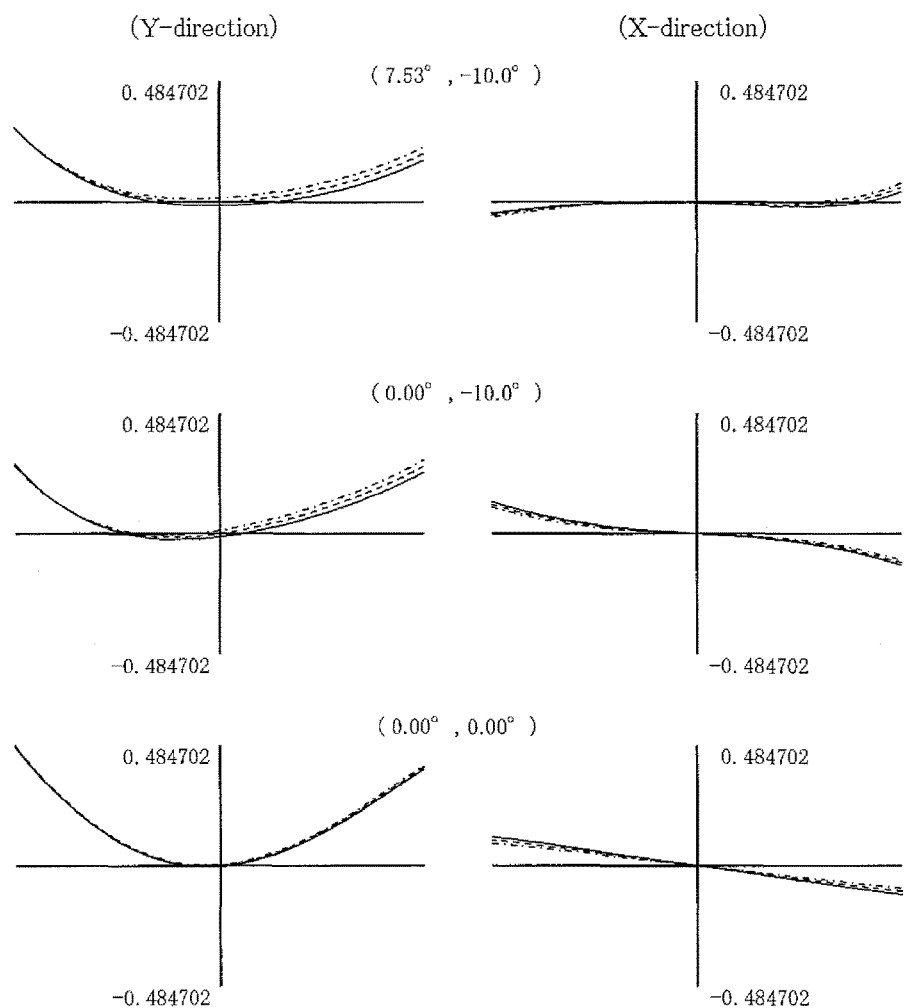
FIG. 32 is an aberration diagram for the direct-vision optical path through Example 4 of the decentered optical system.
Figure 33:
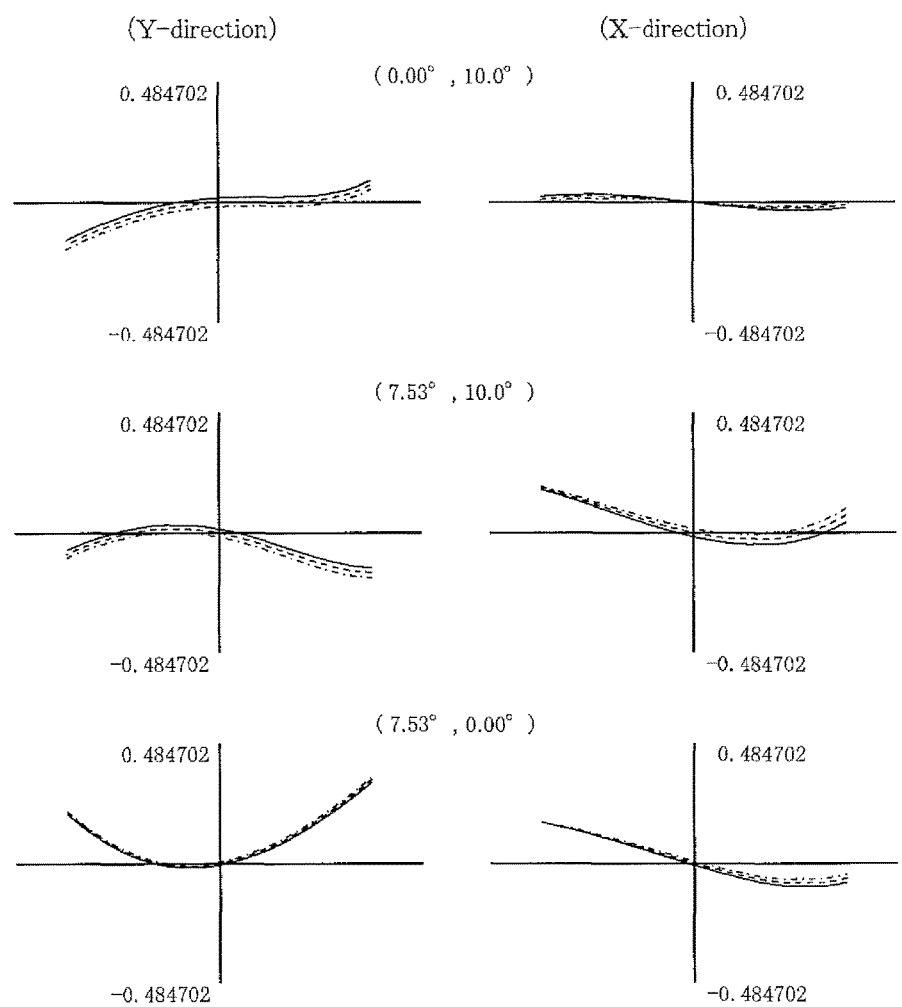
FIG. 33 is an aberration diagram for the direct-vision optical path through Example 4 of the decentered optical system.

FIG. 30 is a sectional view of a direct-vision optical path through Example 4 of the decentered optical system including a center chief ray, and FIG. 31 is a plan view of the direct-vision optical path through Example 4 of the decentered optical system. FIGS. 32 and 33 are aberration diagrams for the direct-vision optical path through Example 4 of the decentered optical system.

When the decentered optical system 1 is used as a direct-vision optical path through a see-through optical system, it includes a third optical element 30, a first optical element 10 and a second optical element 20 in order from an image plane $Im_2$ toward an object plane, and an aperture stop S is formed as an exit pupil on the object plane side of the second optical element 20. Assume here that a center chief ray Lc is defined by a light ray passing from the image plane $Im_2$ through the center of the exit pupil to the center of the object plane. The respective surfaces of the third 30, the first 10 and the second optical element 20 are decentered with respect to the center chief ray Lc.

Ray tracing through the direct-vision optical path through the decentered optical system 1 is now explained. A light ray exiting out from the image plane $Im_2$ enters the third optical element 30 from its first surface 31, exiting out from its second surface 32. The light ray exiting out from the second surface 32 of the third optical element 30 enters the first optical element 10 from its third surface 13. The light ray incident on the third surface 13 leaves the first optical element 10 from its second surface 12. The light ray exiting out from the first optical element 10 enters the second optical element 20 from its first surface 21, exiting out from its second surface 22. Exiting out from the second optical element 20, the light ray passes through the aperture stop S as the exit pupil for projection onto a viewer's pupil, a screen or the like.

It is here to be noted that Example 4 of the decentered optical system 1 may be used in the form of an image projection apparatus with an image display device 50 located at the image plane $Im_1$ or an imaging apparatus with an imaging device located at $Im_1$. While an ideal lens IL is shown in FIGS. 22 and 23, it is understood that as a matter of fact, the image plane $Im_2$ will be far away in the distance with the ideal lens IL removed.

Figure 34:
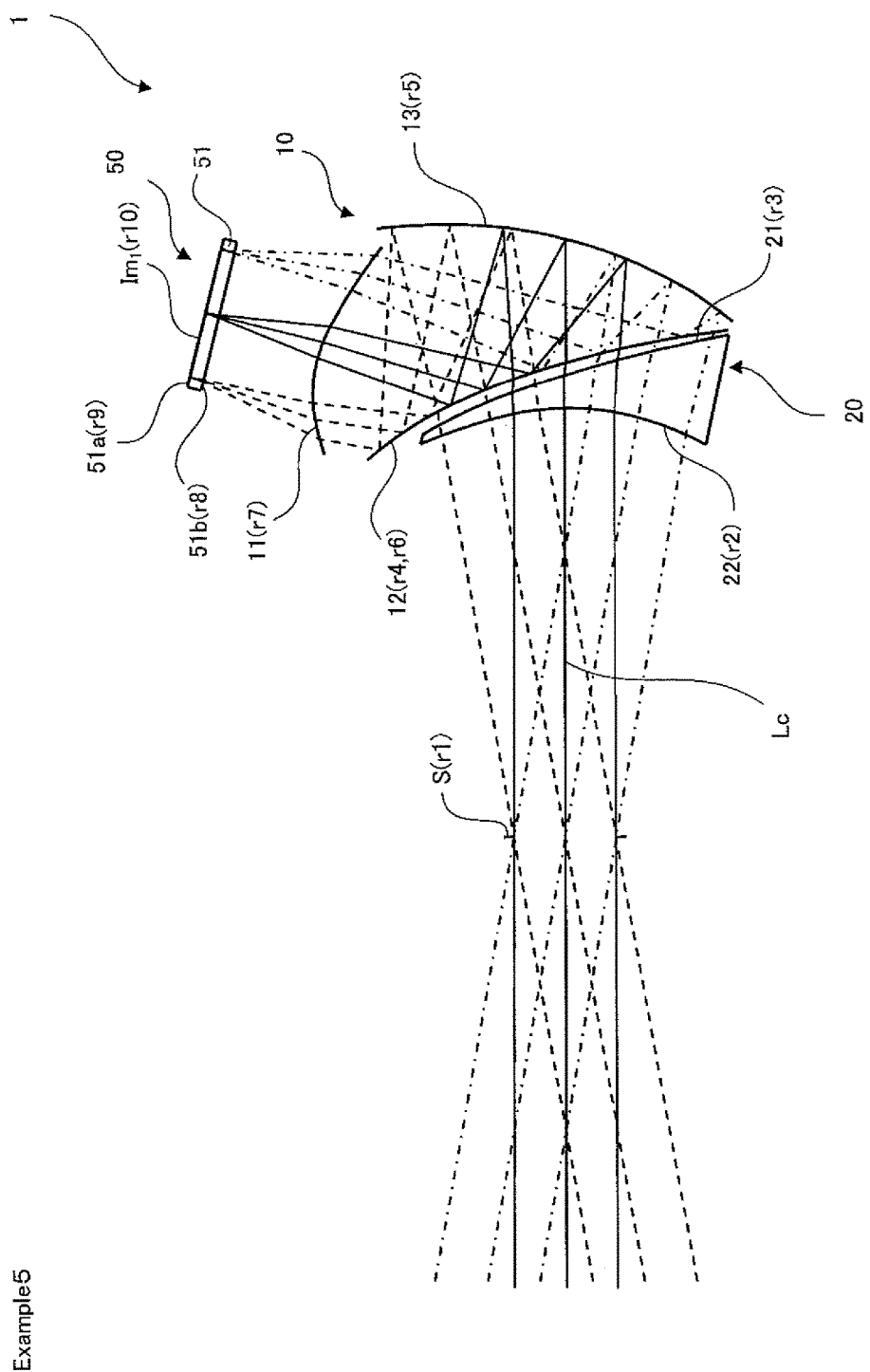
FIG. 34 is a sectional view of Example 5 of the decentered optical system including a center chief ray.
Figure 35:
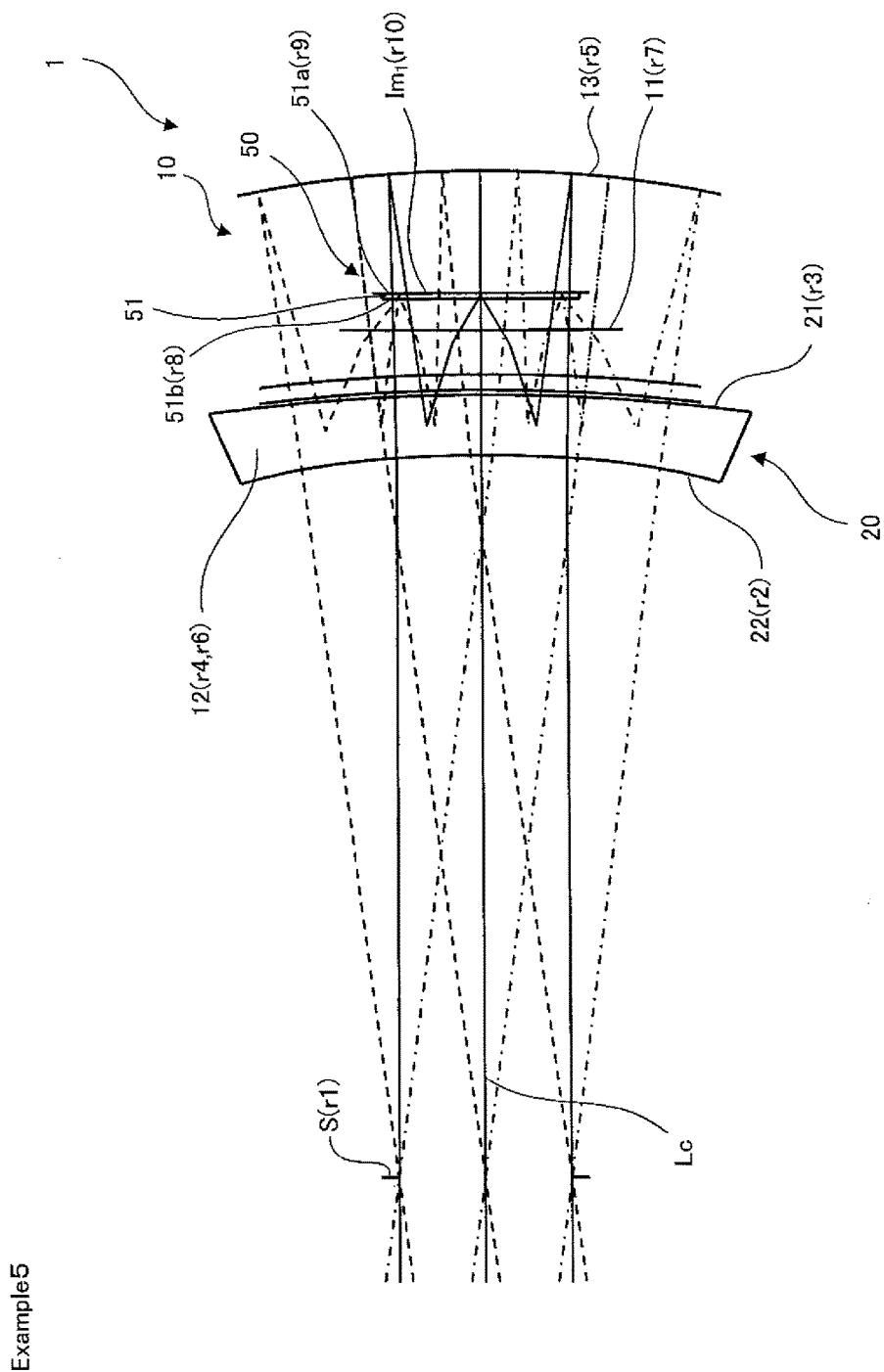
FIG. 35 is a plan view of Example 5 of the decentered optical system.
Figure 36:
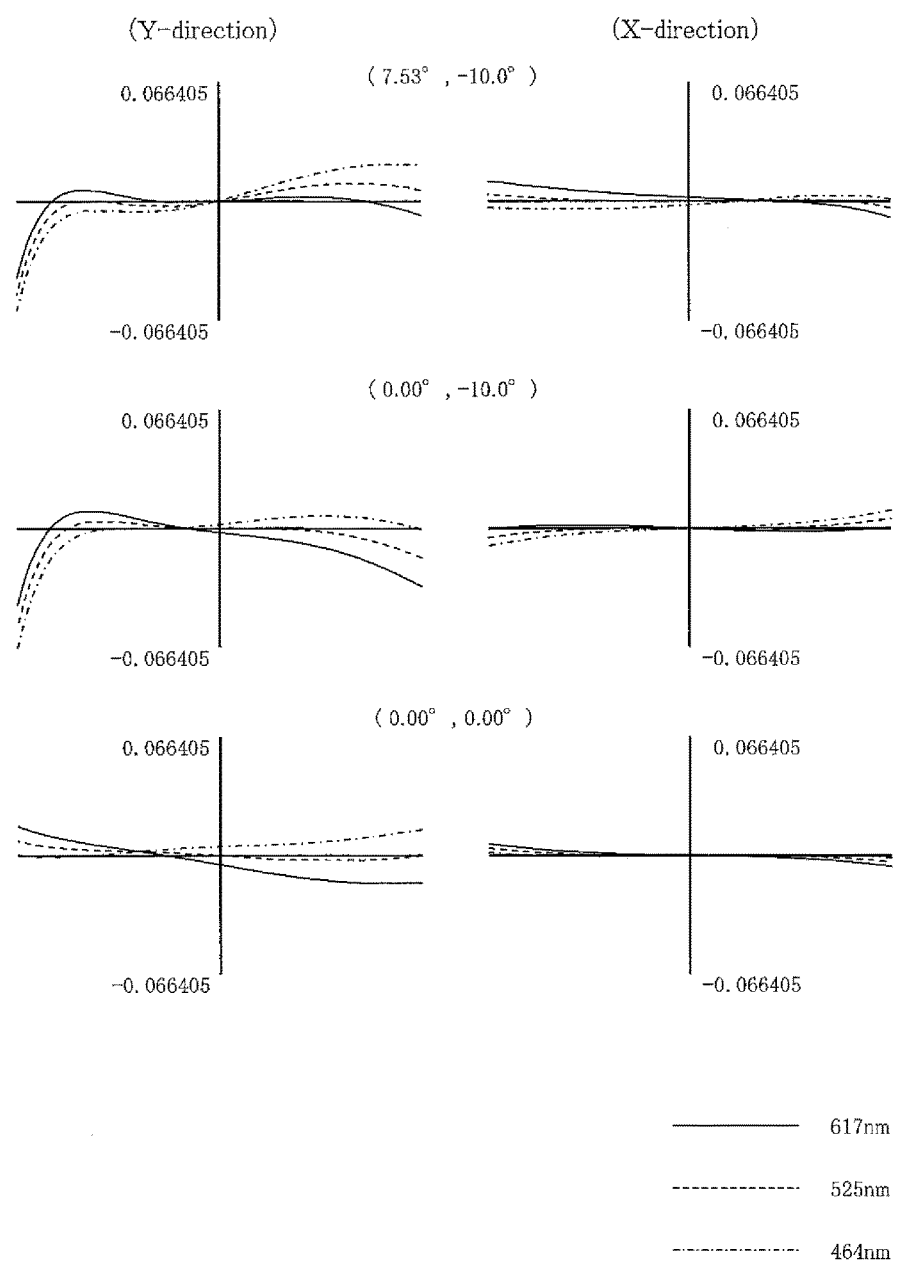
FIG. 36 is an aberration diagram for Example 5 of the decentered optical system.
Figure 37:
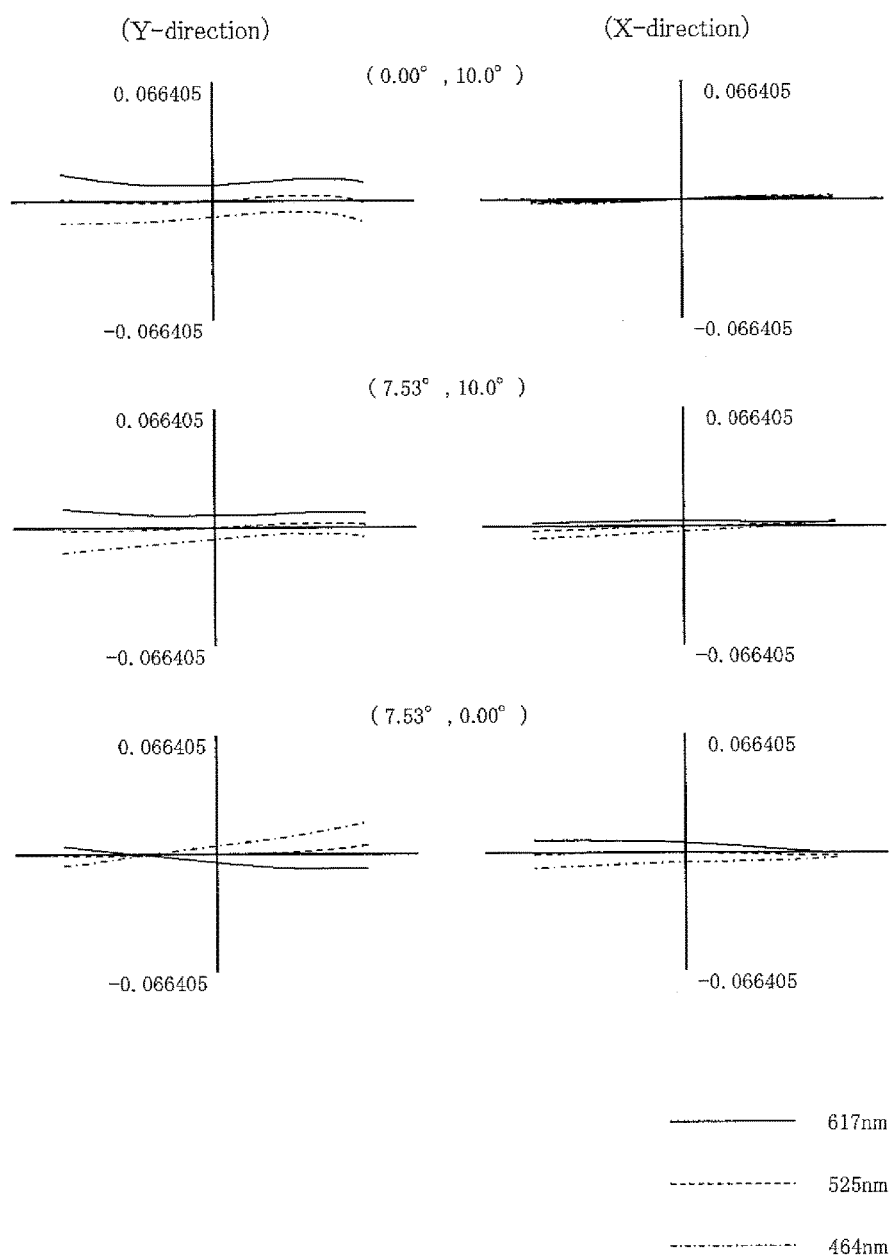
FIG. 37 is an aberration diagram for Example 5 of the decentered optical system.

FIG. 34 is a sectional view of Example 5 of the decentered optical system including a center chief ray, and FIG. 35 is a plan view of Example 5 of the decentered optical system. FIGS. 36 and 37 are aberration diagrams for Example 5 of the decentered optical system.

In order from an image plane $Im_1$ toward an object plane, Example 5 of the decentered optical system 1 comprises a first optical element 10 and a second optical element 20, and an aperture stop S is formed as an exit pupil on the object plane side of the second optical element 20. Assume here that a center chief ray Lc is defined by a light ray passing from the image plane $Im_1$ through the center of the exit pupil to the center of the object plane. The respective surfaces of the first 10 and the second optical element 20 are decentered with respect to the center chief ray Lc.

Reference is now made to ray tracing in the case where the decentered optical system 1 is used with an image projection apparatus. A light ray exiting out from the image plane $Im_1$ as the display plane of an image display device 50 passes through the entrance 51*a* and the exit surface 51*b* of a cover glass 50, entering the first optical element 10 from its first surface 11. The light ray incident on the first surface 11 is reflected off a second surface 12 and then a third surface 13, exiting out from the first optical element 10 from its second surface 12. The light ray exiting out from the first optical element 10 enters the second optical element 20 from its first surface 21, exiting out from its second surface 22. Exiting out from the second optical element 20, the light ray passes through the aperture stop S as the exit pupil for projection onto a viewer's pupil, a screen or the like.

Example 5 of the decentered optical system 1 further includes a direct-vision optical path using the third surface 13 of the first optical element 10 as a transmitting surface.

Figure 38:
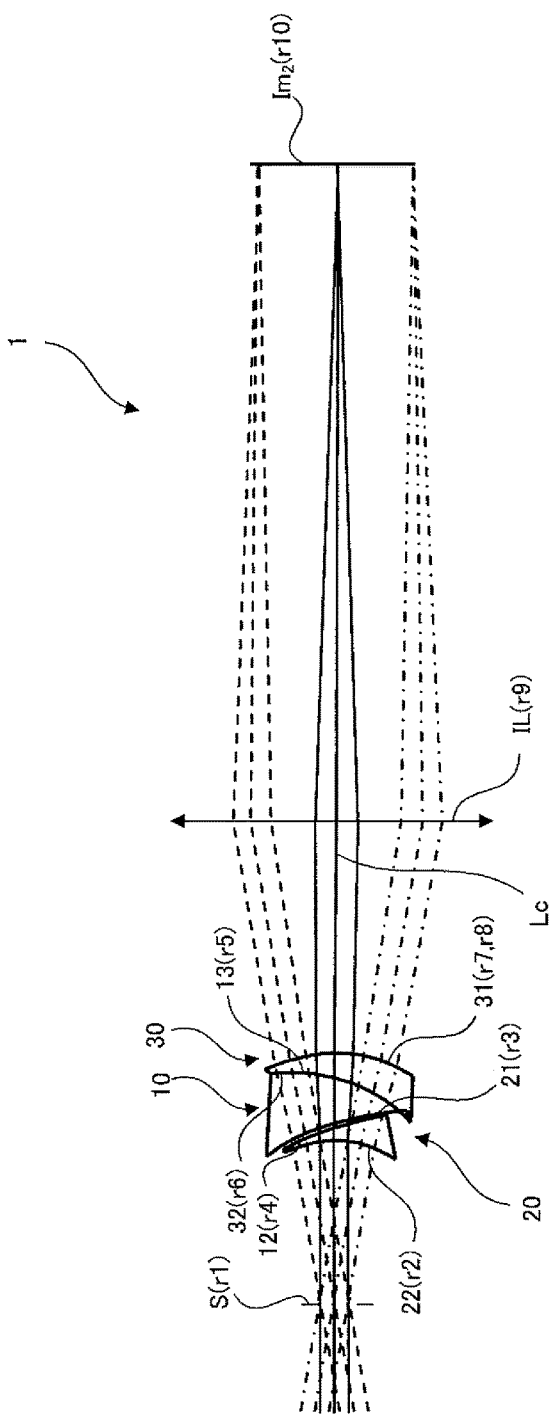
FIG. 38 is a sectional view of the direct-vision optical path through Example 5 of the decentered optical system including a center chief ray.
Figure 39:
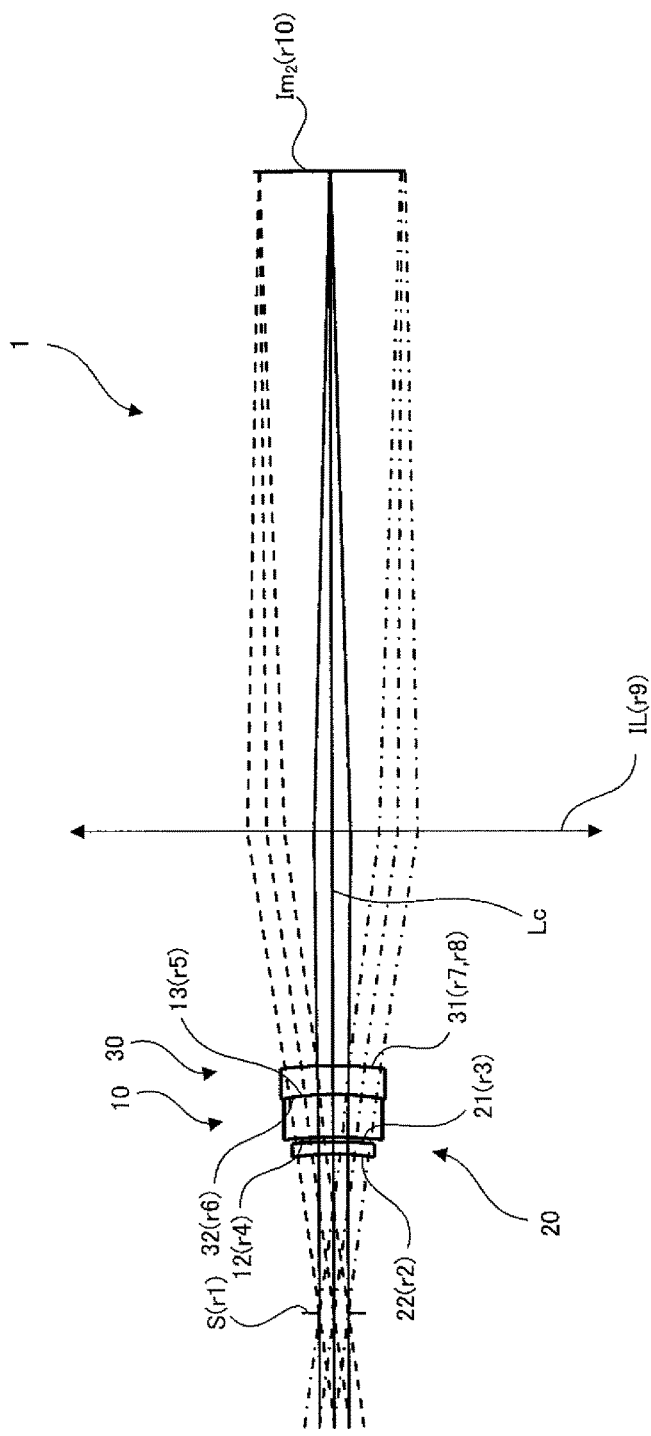
FIG. 39 is a plan view of the direct-vision optical path through Example 5 of the decentered optical system.
Figure 40:
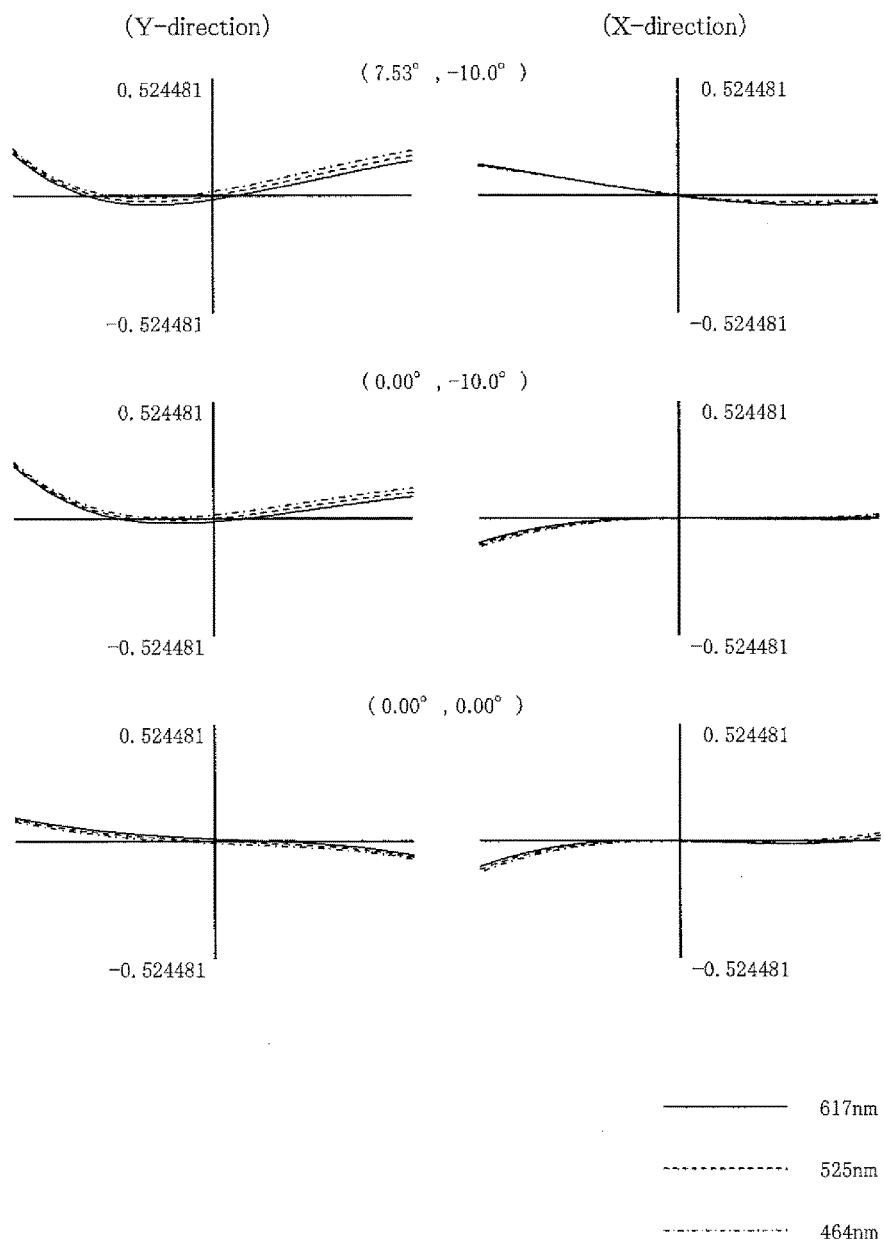
FIG. 40 is an aberration diagram for the direct-vision optical path through Example 5 of the decentered optical system.
Figure 41:
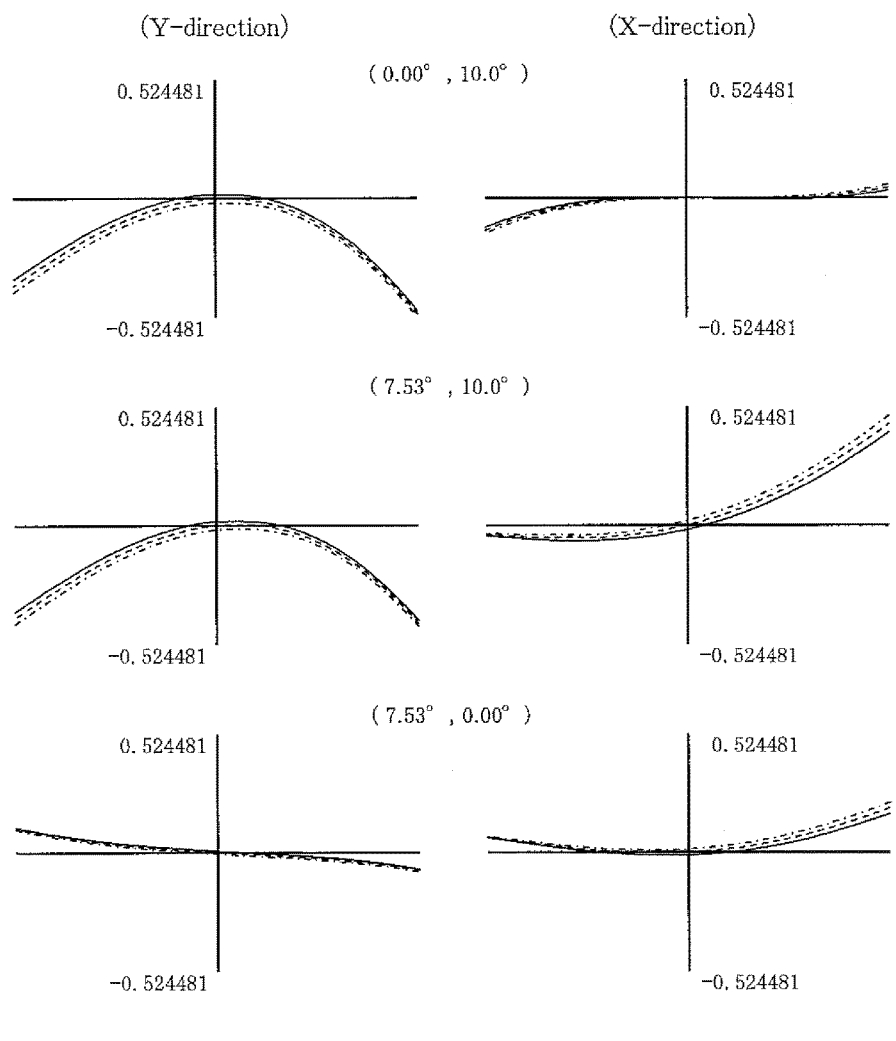
FIG. 41 is an aberration diagram for the direct-vision optical path through Example 5 of the decentered optical system.

FIG. 38 is a sectional view of a direct-vision optical path through Example 5 of the decentered optical system including the center chief ray, and FIG. 39 is a plan view of the direct-vision optical path through Example 5 of the decentered optical system. FIGS. 40 and 41 are aberration diagrams for the direct-vision optical path through Example 5 of the decentered optical system.

When the decentered optical system 1 is used as a direct-vision optical path through a see-through optical system, it includes a third optical element 30, a first optical element 10 and a second optical element 20 in order from an image plane $Im_2$ toward an object plane, and an aperture stop S is formed as an exit pupil on the image plane side of the second optical element 20. Assume here that a center chief ray Lc is defined by a light ray passing from the image plane $Im_2$ through the center of the exit pupil to the center of the object plane. The respective surfaces of the third 30, the first 10 and the second optical element 20 are decentered with respect to the center chief ray Lc.

Ray tracing through the direct-vision optical path through the decentered optical system 1 is now explained. A light ray exiting out from the image plane $Im_2$ enters the third optical element 30 from its first surface 31, exiting out from its second surface 32. The light ray exiting out from the second surface 32 of the third optical element 30 enters the first optical element 10 from its third surface 13. The light ray incident on the third surface 13 leaves the first optical element 10 from its second surface 12. The light ray exiting out from the first optical element 10 enters the second optical element 20 from its first surface 21, exiting out from the second surface 22. Exiting out from the second optical element 20, the light ray passes through the aperture stop S as the exit pupil for projection onto a viewer's pupil, a screen or the like.

It is here to be noted that Example 5 of the decentered optical system 1 may be used in the form of an image projection apparatus with an image display device 50 located at the image plane $Im_1$ or an imaging apparatus with an imaging device located at $Im_1$. While an ideal lens IL is shown in FIGS. 38 and 39, it is understood that as a matter of fact, the image plane $Im_2$ will be far away in the distance with the ideal lens IL removed.

Set out below are the constituting parameters of Examples 1 to 5.

The coordinate system used in the embodiment described herein is now explained.

As shown in FIG. 1, assume that the Z-axis is provided by an optical axis defined by a straight line extending to a point of intersection of the center chief ray Lc with the second surface 22 of the second optical element 20 in the decentered optical system 1, the Y-axis is defined by an axis that is orthogonal to the Z-axis and lies within the decentered plane of each of the surfaces forming the optical system, and the X-direction is defined by an axis orthogonal to the optical axis and Y-axis, say, an axis going through the sheet from top to bottom. Ray tracing is described by ray tracing from the object plane (not shown) on the exit pupil side toward the image plane Im.

The rotationally asymmetric surface used in the embodiment described herein is preferably a free-form surface.

The surface shape of the free-form surface FFS used in the embodiments of the invention is defined by the following formula (a). Note here that Z in that defining formula stands for the Z-axis of the free-form surface, and that a coefficient term with no data described is zero.

$$Z = cr^2/[1 + \sqrt{\{1-(1+k)c^2r^2\}}] + \sum_{j=2}^{66} C_j X^m Y^n \quad (1)$$

Here the first terms of Formula (a) is the spherical term, and the second term is the free-form surface term.

In the spherical term,
c is the radius of curvature of the apex,
k is the conic constant, and
r is $\sqrt{(X^2+Y^2)}$.

The free-form surface term is:

$$\sum_{j=2}^{66} C_j X^m Y^n = +C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 ...$$

In that term, $C_j$ (j is an integer of 2 or greater) is a coefficient. Generally, although the aforesaid free-form surface has not possibly a surface of symmetry in both the X-Z and Y-Z planes, yet it will have only one surface of symmetry parallel with the Y-Z plane by reducing all the odd-numbered terms for X down to zero. For instance, this may be achieved by reducing the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ ... in the aforesaid defining formula (a) down to zero.

Also, by reducing all the odd-numbered terms for Y down to zero, for instance, by reducing $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ ... in the aforesaid defining formula down to zero, the free-form surface will have only one surface of symmetry parallel with the X-Z plane.

If the optical system is decentered in any one direction of the aforesaid surfaces of symmetry, for instance, the Y-axis direction with respect to the surface of symmetry parallel with the Y-Z plane, and the X-axis direction with respect to the surface of symmetry parallel with the X-Z plane, it is then possible to improve assembling capability while making effective correction for rotationally asymmetric aberrations occurring from decentration.

It is here to be noted that the aforesaid defining formula (a) is provided for the purpose of illustration alone. The free-form surface according to the invention has a feature of using a rotationally asymmetric surface thereby making correction for rotationally asymmetric aberrations occurring from decentration while, at the same time, improving assembling capabilities. As a matter of course, the same effect is achievable for any other defining formula too.

Among aspheric data used in the examples described herein, there are surface data inclusive of aspheric lens surface data. Aspheric shape or configuration is represented by the following formula (b).

$$z = (y^2/r)/[1+\{1-(1+K)\cdot(y/r)^2\}^{1/2}] + A4y^4 + A6y^6 + A8y^8 + A10y^{10} \quad (b)$$

It is here to be noted that r is a paraxial radius of curvature, K is a conic coefficient, and A4, A6 and A8 are a $4^{th}$-order, a $6^{th}$-order and an $8^{th}$-order aspheric coefficient, respectively, and that the symbol "e" indicates that the subsequent numeral is a power exponent having 10 as base; for instance, "1.0e-5" means "$1.0 \times 10^{-5}$".

In the respective examples, the respective surfaces are decentered within the Y-Z plane. Each decentered surface is given the quantity of decentration of the apex position of that surface from the origin of the associated coordinate system (X, Y and Z in the X-, Y- and Z-axis directions) as well as the angles of tilt or inclination ($\alpha$, $\beta$, $\gamma$ (°)) with the center axes or the X-, Y- and Z-axes as center of that surface (the Z-axis of the aforesaid formula (a) for the free-form surface). Note here that the positive $\alpha$ and $\beta$ mean counterclockwise rotation with respect to the positive directions of the respective axes, and the positive $\gamma$ means clockwise rotation with respect to the positive direction of the positive Z-axis.

When, of the optical surfaces forming the optical system in each example, a specific surface (inclusive of a virtual surface) and the subsequent surface form together a coaxial optical system, surface separations are given to them. After decentration, they return back to the origin before decentration, and advance in the Z-axis direction given in terms of surface separations, become the origin of the next surface.

Refractive indices and Abbe constants are given on d-line (a wavelength of 587.56 nm) basis, and length is given on mm basis. Decentration of each surface is represented in terms of the quantity of decentration from a reference surface, as described above, and "∞" affixed to the radius of curvature means infinity.

As mentioned above, the symbol "e" indicates that the subsequent numeral is a power exponent having 10 as base; for instance, "1.0e-5" means "$1.0 \times 10^{-5}$".

Example 1 (Viewing of Electronic Images)

| Surface No. | Radius of Curvature | Surface Separation | Decentration |
|---|---|---|---|
| Object Plane | ∞ | −2000.00 | |
| 1 | Stop Surface | 0.00 | |
| 2 | −49.52 | 0.00 | Decentration [1] |
| 3 | FFS[1] | 0.05 | Decentration [2] |
| 4 | FFS[1] | 0.00 | Decentration [2] |
| 5 | FFS[2] | 0.00 | Decentration [3] |
| 6 | FFS[1] | 0.00 | Decentration [2] |
| 7 | FFS[3] | 0.00 | Decentration [4] |
| 8 | ∞ | 6.65 | Decentration [5] |
| 9 | ∞ | 1.10 | |
| 10 | ∞ | 0.00 | |
| Image plane | ∞ | 0.00 | |

Example 1 (Viewing of Electronic Images)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | 1.5254 | 56.2 |
| 6 | 1.5254 | 56.2 |
| 7 | | |
| 8 | | |
| 9 | 1.5163 | 64.1 |
| 10 | | |
| Image plane | | |

FFS[1]

| | | | | | |
|---|---|---|---|---|---|
| C4 | −5.5132e−003 | C6 | −6.4199e−004 | C8 | −7.8743e−006 |
| C10 | −4.5977e−005 | C11 | 4.5125e−007 | C13 | 8.1252e−006 |
| C15 | −1.1308e−005 | C17 | −5.7940e−007 | C19 | 1.1038e−007 |
| C21 | −2.2778e−008 | C22 | 2.8293e−009 | C24 | −2.3136e−008 |
| C26 | 2.2774e−008 | C28 | −1.4599e−008 | C30 | 3.5428e−010 |
| C32 | 1.4801e−011 | C34 | 5.0872e−011 | C36 | 1.1148e−009 |

FFS[2]

| | | | | | |
|---|---|---|---|---|---|
| C4 | −1.0262e−002 | C6 | −1.0510e−002 | C8 | 3.8845e−005 |
| C10 | −1.0465e−004 | C11 | −2.0187e−006 | C13 | −2.5817e−006 |
| C15 | 4.1664e−006 | C17 | −4.6567e−008 | C19 | −1.7782e−007 |
| C21 | 2.0718e−007 | C22 | 6.9279e−010 | C24 | 9.6685e−009 |
| C26 | 9.5965e−009 | C28 | −3.0441e−008 | C30 | −1.6795e−010 |
| C32 | −2.3758e−010 | C34 | −2.1711e−010 | C36 | 1.0468e−009 |

FFS[3]

| | | | | | |
|---|---|---|---|---|---|
| C4 | 1.6868e−002 | C6 | −4.5512e−002 | C8 | 3.2342e−003 |
| C10 | 1.6585e−003 | C11 | −2.5331e−005 | C13 | −1.4313e−005 |
| C15 | 4.0061e−004 | C17 | 5.4424e−006 | C19 | −2.0356e−005 |
| C21 | −2.7787e−005 | C22 | −8.7248e−006 | C24 | 2.3868e−006 |
| C26 | 1.6112e−006 | C28 | −1.3068e−006 | C30 | 1.3669e−008 |
| C32 | 9.7350e−008 | C34 | 2.5936e−007 | C36 | 1.9096e−007 |

Decentration [1]

| X | 0.00 | Y | 0.00 | Z | 27.95 |
|---|---|---|---|---|---|
| α | 0.00 | β | 0.00 | γ | 0.00 |

Decentration [2]

| X | 0.00 | Y | −1.08 | Z | 31.31 |
|---|---|---|---|---|---|
| α | 16.67 | β | 0.00 | γ | 0.00 |

Decentration [3]

| X | 0.00 | Y | −1.47 | Z | 39.32 |
|---|---|---|---|---|---|
| α | −17.62 | β | 0.00 | γ | 0.00 |

Decentration [4]

| X | 0.00 | Y | 18.04 | Z | 30.08 |
|---|---|---|---|---|---|
| α | 86.07 | β | 0.00 | γ | 0.00 |

Decentration [5]

| X | 0.00 | Y | 17.49 | Z | 32.82 |
|---|---|---|---|---|---|
| α | 68.91 | β | 0.00 | γ | 0.00 |

Example 1 (Direct-Vision Optical Path)

| Surface No. | Radius of Curvature | Surface Separation | Decentration |
|---|---|---|---|
| Object Plane | ∞ | 0.00 | |
| 1 | Stop Surface | 0.00 | |
| 2 | −49.52 | 0.00 | Decentration [1] |
| 3 | FFS[1] | 0.05 | Decentration [2] |
| 4 | FFS[1] | 0.00 | Decentration [2] |
| 5 | FFS[2] | 0.00 | Decentration [3] |
| 6 | FFS[2] | 0.00 | Decentration [3] |
| 7 | −56.60 | 0.00 | Decentration [4] |
| 8 | ∞ | 100.00 | |
| 9 | Ideal lens | 102.41 | |
| Image plane | ∞ | 0.00 | |

Example 1 (Direct-Vision Optical Path)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | 1.5254 | 56.2 |
| 6 | 1.5254 | 56.2 |
| 7 | | |
| 8 | | |
| 9 | | |
| Image plane | | |

FFS[1]

| | | | | | |
|---|---|---|---|---|---|
| C4 | −5.5132e−003 | C6 | −6.4199e−004 | C8 | −7.8743e−006 |
| C10 | −4.5977e−005 | C11 | 4.5125e−007 | C13 | 8.1252e−006 |
| C15 | −1.1308e−005 | C17 | −5.7940e−007 | C19 | 1.1038e−007 |
| C21 | −2.2778e−008 | C22 | 2.8293e−009 | C24 | −2.3136e−008 |
| C26 | 2.2774e−008 | C28 | −1.4599e−008 | C30 | 3.5428e−010 |
| C32 | 1.4801e−011 | C34 | 5.0872e−011 | C36 | 1.1148e−009 |

FFS[2]

| | | | | | |
|---|---|---|---|---|---|
| C4 | −1.0262e−002 | C6 | −1.0510e−002 | C8 | 3.8845e−005 |
| C10 | −1.0465e−004 | C11 | −2.0187e−006 | C13 | −2.5817e−006 |
| C15 | 4.1664e−006 | C17 | −4.6567e−008 | C19 | −1.7782e−007 |
| C21 | 2.0718e−007 | C22 | 6.9279e−010 | C24 | 9.6685e−009 |
| C26 | 9.5965e−009 | C28 | −3.0441e−008 | C30 | −1.6795e−010 |
| C32 | −2.3758e−010 | C34 | −2.1711e−010 | C36 | 1.0468e−009 |

-continued

| | Decentration [1] | | | | |
|---|---|---|---|---|---|
| X | 0.00 | Y | 0.00 | Z | 27.95 |
| α | 0.00 | β | 0.00 | γ | 0.00 |

| | Decentration [2] | | | | |
|---|---|---|---|---|---|
| X | 0.00 | Y | −1.08 | Z | 31.31 |
| α | 16.67 | β | 0.00 | γ | 0.00 |

| | Decentration [3] | | | | |
|---|---|---|---|---|---|
| X | 0.00 | Y | −1.47 | Z | 39.32 |
| α | −17.62 | β | 0.00 | γ | 0.00 |

| | Decentration [4] | | | | |
|---|---|---|---|---|---|
| X | 0.00 | Y | 0.00 | Z | 45.35 |
| α | 0.00 | β | 0.00 | γ | 0.00 |

Example 2 (Viewing of Electronic Images)

| Surface No. | Radius of Curvature | Surface Separation | Decentration |
|---|---|---|---|
| Object Plane | ∞ | −2000.00 | |
| 1 | Stop Surface | 0.00 | |
| 2 | Aspheric surface[1] | 0.00 | Decentration [1] |
| 3 | FFS[1] | 0.50 | Decentration [2] |
| 4 | FFS[1] | 0.00 | Decentration [2] |
| 5 | FFS[2] | 0.00 | Decentration [3] |
| 6 | FFS[1] | 0.00 | Decentration [2] |
| 7 | FFS[3] | 0.00 | Decentration [4] |
| 8 | ∞ | 6.52 | Decentration [5] |
| 9 | ∞ | 1.10 | |
| 10 | ∞ | 0.00 | |
| Image plane | ∞ | 0.00 | |

Example 2 (Viewing of Electronic Images)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | 1.5254 | 56.2 |
| 6 | 1.5254 | 56.2 |
| 7 | | |
| 8 | | |
| 9 | 1.5163 | 64.1 |
| 10 | | |
| Image plane | | |

| Aspheric surface[1] | | | |
|---|---|---|---|
| Radius of curvature | | | −70.46 |
| k | 1.5887e+001 | | |
| A4 | −2.3732e−005 | A6 | 5.6087e−008 |

| FFS[1] | | | | | |
|---|---|---|---|---|---|
| C4 | −5.2871e−003 | C6 | −1.4509e−003 | C8 | 3.5115e−005 |
| C10 | 1.3338e−005 | C11 | −4.5692e−006 | C13 | 5.7319e−006 |
| C15 | −1.3363e−005 | C17 | −8.3754e−007 | C19 | 4.0142e−008 |
| C21 | 1.5252e−007 | C22 | 1.2728e−008 | C24 | −7.8790e−009 |
| C26 | 2.6725e−008 | C28 | −1.4526e−008 | C30 | 1.0641e−009 |
| C32 | 6.1387e−010 | C34 | −1.2952e−009 | C36 | 8.2407e−010 |

| FFS[2] | | | | | |
|---|---|---|---|---|---|
| C4 | −9.7402e−003 | C6 | −9.9309e−003 | C8 | 4.5018e−005 |
| C10 | −7.1121e−005 | C11 | −5.1230e−006 | C13 | −9.1847e−006 |
| C15 | 2.5867e−008 | C17 | 4.6633e−010 | C19 | −1.2362e−007 |
| C21 | 2.8384e−007 | C22 | 2.4655e−009 | C24 | 1.3393e−008 |
| C26 | 1.1125e−008 | C28 | −3.7602e−008 | C30 | −1.8443e−010 |
| C32 | −5.2551e−010 | C34 | −2.5228e−010 | C36 | 1.3076e−009 |

| FFS[3] | | | | | |
|---|---|---|---|---|---|
| C4 | 1.9748e−002 | C6 | −1.6475e−002 | C8 | 2.4385e−003 |
| C10 | 3.8893e−003 | C11 | 2.3611e−005 | C13 | −2.8920e−004 |
| C15 | −1.0609e−004 | C17 | 2.5550e−005 | C19 | −1.1488e−005 |
| C21 | −4.4715e−005 | C22 | 6.1891e−007 | C24 | 3.9272e−006 |
| C26 | 6.3901e−006 | C28 | 1.2107e−006 | C30 | 8.8191e−008 |
| C32 | 8.8465e−008 | C34 | 4.3446e−007 | C36 | 2.1566e−007 |

| | Decentration [1] | | | | |
|---|---|---|---|---|---|
| X | 0.00 | Y | 0.00 | Z | 27.35 |
| α | 0.00 | β | 0.00 | γ | 0.00 |

| | Decentration [2] | | | | |
|---|---|---|---|---|---|
| X | 0.00 | Y | −0.62 | Z | 30.60 |
| α | 16.57 | β | 0.00 | γ | 0.00 |

| | Decentration [3] | | | | |
|---|---|---|---|---|---|
| X | 0.00 | Y | −1.18 | Z | 38.75 |
| α | −17.43 | β | 0.00 | γ | 0.00 |

| | Decentration [4] | | | | |
|---|---|---|---|---|---|
| X | 0.00 | Y | 18.02 | Z | 27.14 |
| α | 93.23 | β | 0.00 | γ | 0.00 |

| | Decentration [5] | | | | |
|---|---|---|---|---|---|
| X | 0.00 | Y | 17.49 | Z | 32.17 |
| α | 68.81 | β | 0.00 | γ | 0.00 |

Example 2 (Direct-Vision Optical Path)

| Surface No. | Radius of Curvature | Surface Separation | Decentration |
|---|---|---|---|
| Object Plane | ∞ | −2000.00 | |
| 1 | Stop Surface | 0.00 | |
| 2 | Aspheric surface[1] | 0.00 | Decentration [1] |
| 3 | FFS[1] | 0.50 | Decentration [2] |
| 4 | FFS[1] | 0.00 | Decentration [2] |
| 5 | FFS[2] | 0.00 | Decentration [3] |
| 6 | FFS[2] | 0.80 | Decentration [3] |
| 7 | Aspheric surface[2] | 1.00 | Decentration [4] |
| 8 | ∞ | 100.00 | |
| 9 | Ideal lens | 94.26 | |
| Image plane | ∞ | 0.00 | |

Example 2 (Direct-Vision Optical Path)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | | |
| 6 | 1.5254 | 56.2 |
| 7 | | |
| 8 | | |
| 9 | | |
| Image plane | | |

Aspheric surface[1]

| Radius of curvature | | | −70.46 |
|---|---|---|---|
| k | 1.5887e+001 | | |
| A4 | −2.3732e−005 | A6 | 5.6087e−008 |

Aspheric surface[2]

| Radius of curvature | | | −75.31 | |
|---|---|---|---|---|
| k | 6.4232e+000 | | | |
| A4 | −9.1652e−006 | A6 | 1.2968e−008 A8 | −7.6748e−012 |

FFS[1]

| C4 | −5.2871e−003 | C6 | −1.4509e−003 | C8 | 3.5115e−005 |
|---|---|---|---|---|---|
| C10 | 1.3338e−005 | C11 | −4.5692e−006 | C13 | 5.7319e−006 |
| C15 | −1.3363e−005 | C17 | −8.3754e−007 | C19 | 4.0142e−008 |
| C21 | 1.5252e−007 | C22 | 1.2728e−008 | C24 | −7.8790e−009 |
| C26 | 2.6725e−008 | C28 | −1.4526e−008 | C30 | 1.0641e−009 |
| C32 | 6.1387e−010 | C34 | −1.2952e−009 | C36 | 8.2407e−010 |

FFS[2]

| C4 | −9.7402e−003 | C6 | −9.9309e−003 | C8 | 4.5018e−005 |
|---|---|---|---|---|---|
| C10 | −7.1121e−005 | C11 | −5.1230e−006 | C13 | −9.1847e−006 |
| C15 | 2.5867e−008 | C17 | 4.6633e−010 | C19 | −1.2362e−007 |
| C21 | 2.8384e−007 | C22 | 2.4655e−009 | C24 | 1.3393e−008 |
| C26 | 1.1125e−008 | C28 | −3.7602e−008 | C30 | −1.8443e−010 |
| C32 | −5.2551e−010 | C34 | −2.5228e−010 | C36 | 1.3076e−009 |

Decentration [1]

| X | 0.00 | Y | 0.00 | Z | 27.35 |
|---|---|---|---|---|---|
| α | 0.00 | β | 0.00 | γ | 0.00 |

Decentration [2]

| X | 0.00 | Y | −0.62 | Z | 30.60 |
|---|---|---|---|---|---|
| α | 16.57 | β | 0.00 | γ | 0.00 |

Decentration [3]

| X | 0.00 | Y | −1.18 | Z | 38.75 |
|---|---|---|---|---|---|
| α | −17.43 | β | 0.00 | γ | 0.00 |

Decentration [4]

| X | 0.00 | Y | 0.00 | Z | 45.10 |
|---|---|---|---|---|---|
| α | 0.00 | β | 0.00 | γ | 0.00 |

Example 3 (Viewing of Electronic Images)

| Surface No. | Radius of Curvature | Surface Separation | Decentration |
|---|---|---|---|
| Object Plane | ∞ | −2000.00 | |
| 1 | Stop Surface | 0.00 | |
| 2 | Toroidal surface[1] | 0.00 | Decentration [1] |
| 3 | FFS[1] | 1.00 | Decentration [2] |
| 4 | FFS[1] | 0.00 | Decentration [3] |
| 5 | FFS[2] | 0.00 | Decentration [3] |
| 6 | FFS[1] | 0.00 | Decentration [2] |
| 7 | FFS[3] | 0.00 | Decentration [4] |

-continued

| Surface No. | Radius of Curvature | Surface Separation | Decentration |
|---|---|---|---|
| 8 | ∞ | 6.83 | Decentration [5] |
| 9 | ∞ | 1.10 | |
| 10 | ∞ | 0.00 | |
| Image plane | ∞ | 0.00 | |

Example 3 (Viewing of Electronic Images)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | 1.5254 | 56.2 |
| 6 | 1.5254 | 56.2 |
| 7 | | |
| 8 | | |
| 9 | 1.5163 | 64.1 |
| 10 | | |
| Image plane | | |

Toroidal surface[1]

| X-direction radius of curvature | −42.94 |
|---|---|
| Y-direction radius of curvature | −54.47 |

FFS[1]

| C4 | −5.6390e−003 | C6 | −1.0861e−003 | C8 | 1.7889e−005 |
| C10 | −1.0830e−004 | C11 | −1.4992e−007 | C13 | 7.4484e−006 |
| C15 | −1.1482e−005 | C17 | −6.1449e−007 | C19 | 2.6096e−007 |
| C21 | −4.7867e−008 | C22 | 8.7463e−010 | C24 | −1.9433e−008 |
| C26 | 2.1967e−008 | C28 | −1.1614e−009 | C30 | 2.1797e−010 |
| C32 | 2.4560e−011 | C34 | 1.1786e−011 | C36 | 9.6814e−010 |

FFS[2]

| C4 | −1.0601e−002 | C6 | −9.0828e−003 | C8 | 3.7010e−005 |
| C10 | −1.0402e−004 | C11 | −1.6395e−006 | C13 | −9.7302e−007 |
| C15 | −6.1727e−006 | C17 | −1.1351e−007 | C19 | −2.6630e−007 |
| C21 | 1.0337e−006 | C22 | 5.6435e−010 | C24 | 1.0488e−008 |
| C26 | 1.1554e−008 | C28 | −5.3497e−008 | C30 | −1.2475e−010 |
| C32 | −2.1422e−010 | C34 | −2.2161e−010 | C36 | 1.0441e−009 |

FFS[3]

| C4 | 2.3425e−002 | C6 | −2.2409e−002 | C8 | 2.5959e−003 |
| C10 | 3.6453e−003 | C11 | 2.3350e−005 | C13 | −9.2672e−005 |
| C15 | −6.7379e−005 | C17 | 2.3715e−005 | C19 | 1.6507e−005 |
| C21 | −4.9469e−005 | C22 | −6.2501e−008 | C24 | 3.5735e−006 |
| C26 | 6.0894e−006 | C28 | 4.6625e−007 | C30 | 1.6274e−008 |
| C32 | 1.0276e−007 | C34 | 3.3774e−007 | C36 | 1.9100e−007 |

Decentration [1]

| X | 0.00 | Y | 0.00 | Z | 27.39 |
| α | 0.00 | β | 0.00 | γ | 0.00 |

Decentration [2]

| X | 0.00 | Y | 0.66 | Z | 30.22 |
| α | 16.65 | β | 0.00 | γ | 0.00 |

Decentration [3]

| X | 0.00 | Y | −4.54 | Z | 37.81 |
| α | −21.18 | β | 0.00 | γ | 0.00 |

-continued

Decentration [4]

| X | 0.00 | Y | 18.06 | Z | 27.31 |
| α | 93.30 | β | 0.00 | γ | 0.00 |

Decentration [5]

| X | 0.00 | Y | 17.44 | Z | 32.35 |
| α | 68.31 | β | 0.00 | γ | 0.00 |

Example 3 (Direct-Vision Optical Path)

| Surface No. | Radius of Curvature | Surface Separation | Decentration |
|---|---|---|---|
| Object Plane | ∞ | −2000.00 | |
| 1 | Stop Surface | 0.00 | |
| 2 | Toroidal surface[1] | 0.00 | Decentration [1] |
| 3 | FFS[1] | 1.00 | Decentration [2] |
| 4 | FFS[1] | 0.00 | Decentration [2] |
| 5 | FFS[2] | 0.00 | Decentration [3] |
| 6 | FFS[2] | 0.00 | Decentration [3] |
| 7 | Toroidal surface[2] | 0.00 | Decentration [4] |
| 8 | ∞ | 100.00 | |
| 9 | Ideal lens | 97.94 | |
| Image plane | ∞ | 0.00 | |

Example 3 (Direct-Vision Optical Path)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | | |
| 6 | 1.5254 | 56.2 |
| 7 | | |
| 8 | | |
| 9 | | |
| Image plane | | |

Toroidal surface[1]

| X-direction radius of curvature | −42.94 |
|---|---|
| Y-direction radius of curvature | −54.47 |

Toroidal surface[2]

| X-direction radius of curvature | −50.37 |
|---|---|
| Y-direction radius of curvature | −63.19 |

FFS[1]

| C4 | −5.6390e−003 | C6 | −1.0861e−003 | C8 | 1.7889e−005 |
| C10 | −1.0830e−004 | C11 | −1.4992e−007 | C13 | 7.4484e−006 |
| C15 | −1.1482e−005 | C17 | −6.1449e−007 | C19 | 2.6096e−007 |
| C21 | −4.7867e−008 | C22 | 8.7463e−010 | C24 | −1.9433e−008 |
| C26 | 2.1967e−008 | C28 | −1.1614e−009 | C30 | 2.1797e−010 |
| C32 | 2.4560e−011 | C34 | 1.1786e−011 | C36 | 9.6814e−010 |

FFS[2]

| C4 | −1.0601e−002 | C6 | −9.0828e−003 | C8 | 3.7010e−005 |
| C10 | −1.0402e−004 | C11 | −1.6395e−006 | C13 | −9.7302e−007 |
| C15 | −6.1727e−006 | C17 | −1.1351e−007 | C19 | −2.6630e−007 |
| C21 | 1.0337e−006 | C22 | 5.6435e−010 | C24 | 1.0488e−008 |
| C26 | 1.1554e−008 | C28 | −5.3497e−008 | C30 | −1.2475e−010 |
| C32 | −2.1422e−010 | C34 | −2.2161e−010 | C36 | 1.0441e−009 |

-continued

| | Decentration [1] | | | | | |
|---|---|---|---|---|---|---|
| X | 0.00 | Y | 0.00 | Z | 27.39 |
| α | 0.00 | β | 0.00 | γ | 0.00 |

| | Decentration [2] | | | | | |
|---|---|---|---|---|---|---|
| X | 0.00 | Y | 0.66 | Z | 30.22 |
| α | 16.65 | β | 0.00 | γ | 0.00 |

| | Decentration [3] | | | | | |
|---|---|---|---|---|---|---|
| X | 0.00 | Y | −4.54 | Z | 37.81 |
| α | −21.18 | β | 0.00 | γ | 0.00 |

| | Decentration [4] | | | | | |
|---|---|---|---|---|---|---|
| X | 0.00 | Y | 0.00 | Z | 48.00 |
| α | 0.00 | β | 0.00 | γ | 0.00 |

Example 4 (Viewing of Electronic Images)

| Surface No. | Radius of Curvature | Surface Separation | Decentration |
|---|---|---|---|
| Object Plane | ∞ | −2000.00 | |
| 1 | Stop Surface | 0.00 | |
| 2 | FFS[1] | 0.00 | Decentration [1] |
| 3 | FFS[2] | 0.02 | Decentration [2] |
| 4 | FFS[2] | 0.00 | Decentration [2] |
| 5 | FFS[3] | 0.00 | Decentration [3] |
| 6 | FFS[2] | 0.00 | Decentration [2] |
| 7 | FFS[4] | 0.00 | Decentration [4] |
| 8 | ∞ | 8.87 | Decentration [5] |
| 9 | ∞ | 1.10 | |
| 10 | ∞ | 0.00 | |
| Image plane | ∞ | 0.00 | |

Example 4 (Viewing of Electronic Images)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | 1.5254 | 56.2 |
| 6 | 1.5254 | 56.2 |
| 7 | | |
| 8 | | |
| 9 | 1.5163 | 64.1 |
| 10 | | |
| Image plane | ∞ | 0.00 |

| FFS[1] | | | | | |
|---|---|---|---|---|---|
| C4 | −1.0032e−002 | C6 | −2.4973e−002 | C7 | 1.3134e−007 |
| C8 | 6.9808e−004 | C10 | −3.4098e−004 | C11 | −7.8122e−006 |
| C13 | 1.3709e−005 | C15 | 1.3582e−005 | C17 | −2.7523e−006 |
| C19 | 3.9501e−007 | C21 | −1.0456e−006 | C22 | −2.0118e−008 |
| C24 | 2.1849e−008 | C26 | −1.7069e−007 | C28 | −7.6802e−009 |

| FFS[2] | | | | | |
|---|---|---|---|---|---|
| C4 | −4.9345e−003 | C6 | −3.3074e−003 | C8 | −1.5802e−005 |
| C10 | −1.5178e−004 | C11 | −9.3793e−008 | C13 | 3.5963e−006 |
| C15 | −8.9405e−006 | C17 | −1.2003e−006 | C19 | 8.2523e−007 |
| C21 | −2.4836e−007 | C22 | 1.2322e−008 | C24 | −3.2874e−008 |
| C26 | 5.4685e−008 | C28 | −6.0686e−009 | C30 | 2.4249e−009 |
| C32 | −5.3124e−010 | C34 | 1.4313e−009 | C36 | −9.4394e−011 |

| FFS[3] | | | | | |
|---|---|---|---|---|---|
| C4 | −9.1832e−003 | C6 | −1.1729e−002 | C8 | 8.2873e−005 |
| C10 | −1.2215e−004 | C11 | −9.3058e−007 | C13 | −5.9052e−007 |
| C15 | 1.2091e−006 | C17 | −3.8408e−007 | C19 | 2.9212e−007 |
| C21 | 3.0338e−008 | C22 | −6.7029e−010 | C24 | 1.5016e−008 |
| C26 | −1.7688e−008 | C28 | −6.2540e−009 | C30 | −3.1860e−011 |
| C32 | −5.1604e−010 | C34 | 1.6360e−010 | C36 | 1.4148e−010 |

| FFS[4] | | | | | |
|---|---|---|---|---|---|
| C4 | 3.4486e−003 | C6 | −5.0960e−002 | C8 | 2.2030e−003 |
| C10 | −2.1521e−003 | C11 | −4.7861e−005 | C13 | 2.8587e−004 |
| C15 | 2.0433e−004 | C17 | 1.1697e−006 | C19 | −1.1528e−006 |
| C21 | 2.9272e−006 | C22 | 4.9652e−007 | C24 | 6.4714e−007 |
| C26 | −5.7877e−007 | C28 | −2.4843e−006 | C30 | 9.9781e−008 |
| C32 | −1.0223e−008 | C34 | 2.4711e−008 | C36 | −1.1872e−007 |

| | Decentration [1] | | | | | |
|---|---|---|---|---|---|---|
| X | 0.00 | Y | 0.00 | Z | 35.00 |
| α | 0.00 | β | 0.00 | γ | 0.00 |

| | Decentration [2] | | | | | |
|---|---|---|---|---|---|---|
| X | 0.00 | Y | 1.33 | Z | 37.06 |
| α | 18.70 | β | 0.00 | γ | 0.00 |

| | Decentration [3] | | | | | |
|---|---|---|---|---|---|---|
| X | 0.00 | Y | −2.73 | Z | 46.61 |
| α | −18.17 | β | 0.00 | γ | 0.00 |

| | Decentration [4] | | | | | |
|---|---|---|---|---|---|---|
| X | 0.00 | Y | 20.24 | Z | 36.43 |
| α | 80.70 | β | 0.00 | γ | 0.00 |

| | Decentration [5] | | | | | |
|---|---|---|---|---|---|---|
| X | 0.00 | Y | 19.47 | Z | 39.11 |
| α | 74.95 | β | 0.00 | γ | 0.00 |

Example 4 (Direct-Vision Optical Path)

| Surface No. | Radius of Curvature | Surface Separation | Decentration |
|---|---|---|---|
| Object Plane | ∞ | −2000.00 | |
| 1 | Stop Surface | 0.00 | |
| 2 | FFS[1] | 0.00 | Decentration [1] |
| 3 | FFS[2] | 0.02 | Decentration [2] |
| 4 | FFS[2] | 0.00 | Decentration [2] |
| 5 | FFS[3] | 0.00 | Decentration [3] |
| 6 | FFS[3] | 0.00 | Decentration [3] |
| 7 | FFS[4] | 0.00 | Decentration [4] |
| 8 | ∞ | 100.00 | |
| 9 | Ideal lens | 137.05 | |
| Image plane | ∞ | 0.00 | |

Example 4 (Direct-Vision Optical Path)

| Surface No. | Refractive Index | Abbe |
|---|---|---|
| Object Plane | | |
| 1 | | |

-continued

| | | |
|---|---|---|
| 2 | 1.5254 | 56.2 |
| 3 | | |
| 4 | 1.5254 | 56.2 |
| 5 | | |
| 6 | 1.5254 | 56.2 |
| 7 | | |
| 8 | | |
| 9 | | |
| Image plane | | |

FFS[1]

| | | | | | |
|---|---|---|---|---|---|
| C4 | −1.0032e−002 | C6 | −2.4973e−002 | C7 | 1.3134e−007 |
| C8 | 6.9808e−004 | C10 | −3.4098e−004 | C11 | −7.8122e−006 |
| C13 | 1.3709e−005 | C15 | 1.3582e−005 | C17 | −2.7523e−006 |
| C19 | 3.9501e−007 | C21 | −1.0456e−006 | C22 | −2.0118e−008 |
| C24 | 2.1849e−008 | C26 | −1.7069e−007 | C28 | −7.6802e−009 |

FFS[2]

| | | | | | |
|---|---|---|---|---|---|
| C4 | −4.9345e−003 | C6 | −3.3074e−003 | C8 | −1.5802e−005 |
| C10 | −1.5178e−004 | C11 | −9.3793e−008 | C13 | 3.5963e−006 |
| C15 | −8.9405e−006 | C17 | −1.2003e−006 | C19 | 8.2523e−007 |
| C21 | −2.4836e−007 | C22 | 1.2322e−008 | C24 | −3.2874e−008 |
| C26 | 5.4685e−008 | C28 | −6.0686e−009 | C30 | 2.4249e−009 |
| C32 | −5.3124e−010 | C34 | 1.4313e−009 | C36 | −9.4394e−011 |

FFS[3]

| | | | | | |
|---|---|---|---|---|---|
| C4 | −9.1832e−003 | C6 | −1.1729e−002 | C8 | 8.2873e−005 |
| C10 | −1.2215e−004 | C11 | −9.3058e−007 | C13 | −5.9052e−007 |
| C15 | 1.2091e−006 | C17 | −3.8408e−007 | C19 | 2.9212e−007 |
| C21 | 3.0338e−008 | C22 | −6.7029e−010 | C24 | 1.5016e−008 |
| C26 | −1.7688e−008 | C28 | −6.2540e−009 | C30 | −3.1860e−011 |
| C32 | −5.1604e−010 | C34 | 1.6360e−010 | C36 | 1.4148e−010 |

FFS[4]

| | | | | | |
|---|---|---|---|---|---|
| C4 | −3.3825e−003 | C6 | −1.6269e−002 | C7 | 1.3134e−007 |
| C8 | 4.1389e−004 | C10 | −3.6798e−005 | C11 | −9.3113e−006 |
| C13 | −9.5964e−007 | C15 | −5.0830e−006 | C17 | −6.1637e−007 |
| C19 | −6.6776e−007 | C21 | 1.1424e−007 | C22 | 5.4652e−009 |
| C24 | 7.3030e−009 | C26 | −3.4363e−008 | C28 | 1.8505e−008 |

Decentration [1]

| | | | | | |
|---|---|---|---|---|---|
| X | 0.00 | Y | 0.00 | Z | 35.00 |
| α | 0.00 | β | 0.00 | γ | 0.00 |

Decentration [2]

| | | | | | |
|---|---|---|---|---|---|
| X | 0.00 | Y | 1.33 | Z | 37.06 |
| α | 18.70 | β | 0.00 | γ | 0.00 |

Decentration [3]

| | | | | | |
|---|---|---|---|---|---|
| X | 0.00 | Y | −2.73 | Z | 46.61 |
| α | −18.17 | β | 0.00 | γ | 0.00 |

Decentration [4]

| | | | | | |
|---|---|---|---|---|---|
| X | 0.00 | Y | 6.24 | Z | 52.78 |
| α | 11.17 | β | 0.00 | γ | 0.00 |

Example 5 (Viewing of Electronic Images)

| Surface No. | Radius of Curvature | Surface Separation | Decentration |
|---|---|---|---|
| Object Plane | ∞ | −2000.00 | |
| 1 | Stop Surface | 0.00 | |
| 2 | FFS[1] | 0.00 | Decentration [1] |
| 3 | FFS[2] | 1.13 | Decentration [2] |
| 4 | FFS[3] | 0.00 | Decentration [3] |
| 5 | FFS[4] | 0.00 | Decentration [4] |

-continued

| Surface No. | Radius of Curvature | Surface Separation | Decentration |
|---|---|---|---|
| 6 | FFS[3] | 0.00 | Decentration [3] |
| 7 | FFS[5] | 0.00 | Decentration [5] |
| 8 | ∞ | 8.47 | Decentration [6] |
| 9 | ∞ | 1.10 | |
| 10 | ∞ | 0.00 | |
| Image plane | ∞ | 0.00 | |

Example 5 (Viewing of Electronic Images)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | 1.5254 | 56.2 |
| 6 | 1.5254 | 56.2 |
| 7 | | |
| 8 | | |
| 9 | 1.5163 | 64.1 |
| 10 | | |
| Image plane | | |

FFS[1]

| | | | | | |
|---|---|---|---|---|---|
| C4 | −8.6796e−003 | C6 | −2.5529e−002 | C7 | −1.6530e−007 |
| C8 | 6.7268e−004 | C10 | 5.9121e−005 | C11 | −2.2793e−005 |
| C13 | −1.6323e−005 | C15 | 1.6101e−005 | C67 | 1.4000e+001 |

FFS[2]

| | | | | | |
|---|---|---|---|---|---|
| C4 | −5.3895e−003 | C6 | −5.1377e−003 | C8 | 3.4225e−006 |
| C10 | −1.7368e−004 | C11 | −4.5939e−006 | C13 | 7.1279e−006 |
| C15 | −1.1185e−005 | C17 | −8.2765e−007 | C19 | 7.4509e−007 |
| C21 | −3.6159e−007 | C22 | 2.3648e−008 | C24 | −1.4669e−008 |
| C26 | 3.8161e−008 | C28 | 4.1544e−009 | C30 | 3.1880e−009 |
| C32 | −8.1184e−010 | C34 | 1.1538e−009 | C36 | 9.8510e−010 |

FFS[3]

| | | | | | |
|---|---|---|---|---|---|
| C4 | −5.6842e−003 | C6 | −6.5591e−003 | C8 | 3.6523e−005 |
| C10 | −1.1965e−004 | C11 | −6.9101e−006 | C13 | 9.7335e−006 |
| C15 | −1.0542e−005 | C17 | −1.0018e−006 | C19 | 4.7661e−007 |
| C21 | −2.9492e−007 | C22 | 3.4224e−008 | C24 | 2.5250e−009 |
| C26 | 2.4623e−008 | C28 | 9.9426e−009 | C30 | 4.1174e−009 |
| C32 | 4.5335e−010 | C34 | 6.7243e−010 | C36 | 6.9978e−010 |

FFS[4]

| | | | | | |
|---|---|---|---|---|---|
| C4 | −9.1806e−003 | C6 | −1.4054e−002 | C8 | 9.8029e−005 |
| C10 | −3.2411e−007 | C11 | −4.4663e−006 | C13 | −2.5707e−006 |
| C15 | −1.5223e−006 | C17 | −7.9748e−008 | C19 | 5.0967e−008 |
| C21 | 1.6752e−007 | C22 | 4.2193e−009 | C24 | 4.1842e−009 |
| C26 | 1.7881e−009 | C28 | −8.8281e−009 | C30 | 1.1941e−010 |
| C32 | −3.7263e−011 | C34 | −2.0181e−010 | C36 | 2.8338e−010 |

FFS[5]

| | | | | | |
|---|---|---|---|---|---|
| C4 | −1.4803e−004 | C6 | −1.2221e−002 | C8 | −1.2570e−004 |
| C10 | −7.2989e−004 | C11 | −1.1605e−006 | C13 | 1.6267e−004 |
| C15 | −2.4753e−004 | C17 | −4.5311e−006 | C19 | 1.8120e−005 |
| C21 | −1.1509e−005 | C22 | 2.8935e−008 | C24 | 1.6335e−006 |
| C26 | −1.8393e−006 | C28 | 2.8200e−006 | C30 | 8.5835e−008 |
| C32 | −1.3362e−007 | C34 | 1.6857e−007 | C36 | −1.0278e−007 |

Decentration [1]

| | | | | | |
|---|---|---|---|---|---|
| X | 0.00 | Y | −1.56 | Z | 33.49 |
| α | −3.19 | β | 0.00 | γ | 0.00 |

-continued

| Decentration [2] | | | | | | |
|---|---|---|---|---|---|---|
| X | 0.00 | Y | 0.15 | Z | 36.05 |
| α | 17.13 | β | 0.00 | γ | 0.00 |

| Decentration [3] | | | | | | |
|---|---|---|---|---|---|---|
| X | 0.00 | Y | 0.12 | Z | 35.88 |
| α | 16.02 | β | 0.00 | γ | 0.00 |

| Decentration [4] | | | | | | |
|---|---|---|---|---|---|---|
| X | 0.00 | Y | −2.62 | Z | 44.91 |
| α | −18.29 | β | 0.00 | γ | 0.00 |

| Decentration [5] | | | | | | |
|---|---|---|---|---|---|---|
| X | 0.00 | Y | 17.05 | Z | 40.66 |
| α | 58.70 | β | 0.00 | γ | 0.00 |

| Decentration [6] | | | | | | |
|---|---|---|---|---|---|---|
| X | 0.00 | Y | 18.67 | Z | 37.58 |
| α | 76.07 | β | 0.00 | γ | 0.00 |

Example 5 (Direct-Vision Optical Path)

| Surface No. | Radius of Curvature | Surface Separation | Decentration |
|---|---|---|---|
| Object Plane | ∞ | −2000.00 | |
| 1 | Stop Surface | 0.00 | |
| 2 | FFS[1] | 0.00 | Decentration [1] |
| 3 | FFS[2] | 1.13 | Decentration [2] |
| 4 | FFS[3] | 0.00 | Decentration [3] |
| 5 | FFS[4] | 0.00 | Decentration [4] |
| 6 | FFS[4] | 0.00 | Decentration [4] |
| 7 | FFS[5] | 0.00 | Decentration [5] |
| 8 | ∞ | 100.00 | |
| 9 | Ideal lens | 138.86 | |
| Image plane | ∞ | 0.00 | |

Example 5 (Direct-Vision Optical Path)

| Surface No. | Refractive Index | Abbe |
|---|---|---|
| Object Plane | | |
| 1 | | |
| 2 | 1.5254 | 56.2 |
| 3 | | |
| 4 | 1.5254 | 56.2 |
| 5 | | |
| 6 | 1.5254 | 56.2 |
| 7 | | |
| 8 | | |
| 9 | | |
| Image plane | | |

| FFS[1] | | | | | |
|---|---|---|---|---|---|
| C4 | −8.6796e−003 | C6 | −2.5529e−002 | C7 | −1.6530e−007 |
| C8 | 6.7268e−004 | C10 | 5.9121e−005 | C11 | −2.2793e−005 |
| C13 | −1.6323e−005 | C15 | 1.6101e−005 | | |

| FFS[2] | | | | | |
|---|---|---|---|---|---|
| C4 | −5.3895e−003 | C6 | −5.1377e−003 | C8 | 3.4225e−006 |
| C10 | −1.7368e−004 | C11 | −4.5939e−006 | C13 | 7.1279e−006 |
| C15 | −1.1185e−005 | C17 | −8.2765e−007 | C19 | 7.4509e−007 |
| C21 | −3.6159e−007 | C22 | 2.3648e−008 | C24 | −1.4669e−008 |
| C26 | 3.8161e−008 | C28 | 4.1544e−009 | C30 | 3.1880e−009 |
| C32 | −8.1184e−010 | C34 | 1.1538e−009 | C36 | 9.8510e−010 |

| FFS[3] | | | | | |
|---|---|---|---|---|---|
| C4 | −5.6842e−003 | C6 | −6.5591e−003 | C8 | 3.6523e−005 |
| C10 | −1.1965e−004 | C11 | −6.9101e−006 | C13 | 9.7335e−006 |
| C15 | −1.0542e−005 | C17 | −1.0018e−006 | C19 | 4.7661e−007 |
| C21 | −2.9492e−007 | C22 | 3.4224e−008 | C24 | 2.5250e−009 |
| C26 | 2.4623e−008 | C28 | 9.9426e−009 | C30 | 4.1174e−009 |
| C32 | 4.5335e−010 | C34 | 6.7243e−010 | C36 | 6.9978e−010 |

| FFS[4] | | | | | |
|---|---|---|---|---|---|
| C4 | −9.1806e−003 | C6 | −1.4054e−002 | C8 | 9.8029e−005 |
| C10 | −3.2411e−007 | C11 | −4.4663e−006 | C13 | −2.5707e−006 |
| C15 | −1.5223e−006 | C17 | −7.9748e−008 | C19 | 5.0967e−008 |
| C21 | 1.6752e−007 | C22 | 4.2193e−009 | C24 | 4.1842e−009 |
| C26 | 1.7881e−009 | C28 | −8.8281e−009 | C30 | 1.1941e−010 |
| C32 | −3.7263e−011 | C34 | −2.0181e−010 | C36 | 2.8338e−010 |

| FFS[5] | | | | | |
|---|---|---|---|---|---|
| C4 | −4.1078e−003 | C6 | −1.7072e−002 | C7 | −2.6397e−005 |
| C8 | 3.3517e−004 | C10 | 1.3286e−004 | C11 | −6.8613e−006 |
| C13 | −2.3618e−006 | C15 | 1.5688e−006 | | |

| Decentration [1] | | | | | |
|---|---|---|---|---|---|
| X | 0.00 | Y | −1.56 | Z | 33.49 |
| α | −3.19 | β | 0.00 | γ | 0.00 |

| Decentration [2] | | | | | |
|---|---|---|---|---|---|
| X | 0.00 | Y | 0.15 | Z | 36.05 |
| α | 17.13 | β | 0.00 | γ | 0.00 |

| Decentration [3] | | | | | |
|---|---|---|---|---|---|
| X | 0.00 | Y | 0.12 | Z | 35.88 |
| α | 16.02 | β | 0.00 | γ | 0.00 |

| Decentration [4] | | | | | |
|---|---|---|---|---|---|
| X | 0.00 | Y | −2.62 | Z | 44.91 |
| α | −18.29 | β | 0.00 | γ | 0.00 |

| Decentration [5] | | | | | |
|---|---|---|---|---|---|
| X | 0.00 | Y | −1.06 | Z | 50.90 |
| α | −0.67 | β | 0.00 | γ | 0.00 |

Set out below are the values of Conditions (1) to (7) in Examples 1 to 5.

| | Example 1 | Example 2 | Example 3 |
|---|---|---|---|
| $D_{MAX}$ | 0.005 | 0.5 | 1 |
| f (X) | 22.3214 | 22.075 | 25.1256 |
| f (Y) | 22.3214 | 22.075 | 25.5734 |
| $D_{MAX}/f$ (X) | 0.00224 | 0.02265 | 0.0398 |
| $D_{MAX}/f$ (Y) | 0.00224 | 0.02265 | 0.0443 |
| Dc | 0.05 | 0.5 | 1 |
| Dup | 0.05 | 0.5 | 1 |
| Dun | 0.05 | 0.5 | 1 |
| (Dc − Dup)/$D_{MAX}$ | 0 | 0 | 0 |
| (Dc − Dun)/$D_{MAX}$ | 0 | 0 | 0 |
| R1Po (X) | −49.5195 | −70.4578 | −42.9415 |
| R1Po (Y) | −49.5195 | −70.4578 | −54.4691 |
| ER | 27.9498 | 27.3508 | 27.38634 |
| R1Po (X)/ER | −1.77173 | −2.57608 | −1.56799 |
| R1Po (Y)/ER | −1.77173 | −2.57608 | −1.98891 |
| R1Po/f (X) | −2.21848 | −3.19175 | −1.70907 |
| R1Po/f (Y) | −2.21848 | −3.19175 | −2.41298 |
| R2Pi (X) | −56.5962 | −75.3085 | −50.3713 |
| R2Pi (Y) | −56.5962 | −75.3085 | −63.194 |

-continued

| | | | |
|---|---|---|---|
| D2Pi1Po | 11.41458 | 12.46121 | 14.1361 |
| \|R2Pi (X) − R1Po (X)\|/D2Pi1Po | 0.61997 | 0.389262 | 0.525595 |
| \|R2Pi (X) − R1Po (X)\|/D2Pi1Po | 0.61997 | 0.389262 | 0.617208 |
| φ2 (X) | −0.01767 | −0.01328 | −0.01985 |
| φ2 (Y) | −0.01767 | −0.01328 | −0.01582 |
| φ1 (X) | −0.02019 | −0.01419 | −0.02329 |
| φ1 (Y) | −0.02019 | −0.01419 | −0.01836 |
| φ2 (X)/φ1 (X) | −0.874962 | −0.935589 | −0.852498 |
| φ2 (Y)/φ1 (Y) | −0.874962 | −0.935589 | −0.861934 |

| | Example 4 | Example 5 |
|---|---|---|
| $D_{MAX}$ | 0.02 | 1.129737 |
| f (X) | 28.49 | 28.32861 |
| f (Y) | 26.3852 | 28.0112 |
| $D_{MAX}$/f (X) | 0.000702 | 0.03988 |
| $D_{MAX}$/f (Y) | 0.000758 | 0.040332 |
| Dc | 0.02 | 0.999963 |
| Dup | 0.02 | 1.045148 |
| Dun | 0.02 | 0.4937 |
| (Dc − Dup)/$D_{MAX}$ | 0 | −0.04 |
| (Dc − Dun)/$D_{MAX}$ | 0 | 0.448125 |
| R1Po (X) | −49.838 | −57.606 |
| R1Po (Y) | −20.0212 | −19.5858 |
| ER | 35 | 33.488 |
| R1Po (X)/ER | −1.42394 | −1.7202 |
| R1Po (Y)/ER | −0.57203 | −0.58486 |
| R1Po/f (X) | −1.74932 | −2.03349 |
| R1Po/f (Y) | −0.7588 | −0.69921 |
| R2Pi (X) | −147.821 | −121.719 |
| R2Pi (Y) | −30.7342 | −29.2874 |
| D2Pi1Po | 11.64397 | 12.125 |
| \|R2Pi (X) − R1Po (X)\|/D2Pi1Po | 8.414891 | 5.287654 |
| \|R2Pi (X) − R1Po (X)\|/D2Pi1Po | 0.920049 | 0.800132 |
| φ2 (X) | −0.00676 | −0.00822 |
| φ2 (Y) | −0.03254 | −0.03414 |
| φ1 (X) | −0.02007 | −0.01736 |
| φ1 (Y) | −0.04995 | −0.05106 |
| φ2 (X)/φ1 (X) | −0.337152 | −0.935589 |
| φ2 (Y)/φ1 (Y) | −0.65143 | −0.668745 |

Figure 42:
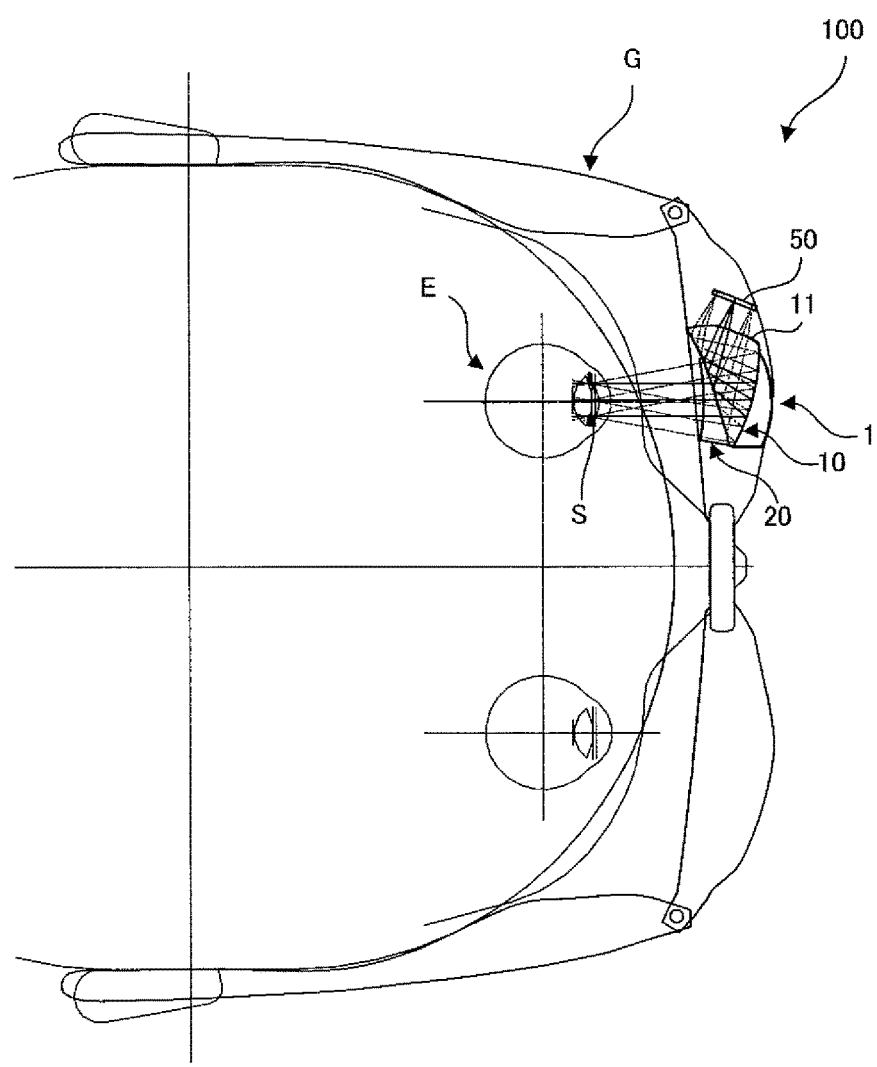
FIG. 42 is illustrative of an image projection apparatus 100 comprising a decentered optical system 1 according to one embodiment of the invention, which is built in eyeglasses G.

FIG. 42 is illustrative of an image projection apparatus 100 comprising glasses G having a built-in decentered optical system 1 described herein.

The image projection apparatus 100 of the invention comprises a decentered optical system 1 described herein and an image display device 50 that is located on an object plane opposite to the first surface 11 of a first optical element 10 to display images. This apparatus allows for image projection at high resolutions albeit having a compact and simple structure.

The imaging apparatus of the invention comprises a decentered optical system 1 described herein, an imaging device located in a position opposite to the second surface 22 of a second optical element 20 for taking images, and an aperture stop S as an entrance pupil located in a given position opposite to the second surface 22 of the second optical element 20. This apparatus allows for imaging at high resolutions albeit having a compact and simple structure.

While the present invention has been explained with reference to various embodiments, it is to be understood that the present invention is not necessarily limited to them and other embodiments comprising suitable combinations of them are included in the category of the invention too.

EXPLANATION OF THE REFERENCE NUMERALS

1: Decentered optical system
50: Image display device (in the case of an image projection apparatus), or imaging device (in the case of an imaging apparatus
10: First optical element
20: Second optical element
30: Third optical element
Im: Image plane (an image display plane in the case of an image projection apparatus or an image-formation plane in the case of an imaging apparatus)
S: Aperture stop (pupil)
60: Quantity-of-light control (liquid crystal shutter)

What is claimed is:

1. A decentered optical system, comprising:
a first optical element comprising at least three, mutually decentered optical surfaces including a first surface through which light can transmit, a second surface through which light can transmit and which is capable of internal reflection, and a third surface through which light can transmit and which is capable of internal reflection, wherein said first optical element is filled inside with a medium having a refractive index greater than 1, and at least one of the three optical surfaces has a rotationally asymmetric configuration, and
a second optical element located on a second surface side of said first optical element and comprising at least two, mutually decentered optical surfaces including a first surface through which light can transmit and a second surface through which light can transmit and which has an outwardly concave configuration, wherein said second optical element is filled inside with a medium having a refractive index greater than 1, and at least one of said two optical surfaces has a rotationally asymmetric configuration, wherein:
said first optical element and said second optical element are spaced away from each other in an effective area through which a light beam passes, and satisfy the following condition (1):

$$0 < D_{MAX}/f \leq 0.3 \quad (1)$$

where $D_{MAX}$ is a maximum value of a distance as measured in said effective area through which said light beam passes on a section including a center chief ray of said light beam in a direction parallel with said center chief ray between the second surface of said first optical element and the first surface of said second optical element, and f is a focal length of said decentered optical system.

2. The decentered optical system as recited in claim 1, characterized in that said second surface of said second optical element has such a configuration as to have a plurality of symmetric surfaces in said effective area.

3. The decentered optical system as recited in claim 2, characterized in that said second surface of said second optical element is defined by a spherical surface, an aspheric surface, a toric surface, or a rotationally asymmetric surface.

4. The decentered optical system as recited in claim 1, characterized by satisfying the following condition (1'):

$$0.00025 < D_{MAX}/f \leq 0.1 \quad (1').$$

5. The decentered optical system as recited in claim 2, characterized in that said first optical element and said second optical element satisfy the following conditions (2) and (3):

$$-2 < (Dc - Dup)/D_{MAX} < 2 \quad (2)$$

$$-2 < (Dc - Dun)/D_{MAX} < 2 \quad (3)$$

where Dc is a separation on said center chief ray between said first optical element and said second optical element, Dup is a separation at a first end on the second surface side of said first optical element in said effective area, and Dun is a separation at a second end opposite to said first end in said effective area.

6. The decentered optical system as recited in claim 1, characterized in that the second surface of said first optical element and the first surface of said second optical element have the same surface configuration in said effective area.

7. The decentered optical system as recited in claim 1, characterized in that the second surface of said first optical element, and the first surface of said second optical element is defined by a rotationally asymmetric surface.

8. The decentered optical system as recited in claim 1, characterized in that a maximum value of an absolute value of an exit angle of all chief rays out of said second surface of said second optical element is not greater than 10.

9. The decentered optical system as recited in claim 1, characterized in that a maximum value of an absolute value of an exit angle of all chief rays out of said second surface of said second optical element is not greater than 5.

10. The decentered optical system as recited in claim 1, characterized in that the second surface of said second optical element satisfies the following condition (4):

$$-4 \leq R1P_o/ER \leq -0.01 \quad (4)$$

where $R1P_o$ is a radius of curvature of the second surface of the second optical element, and ER is an eye relief.

11. The decentered optical system as recited in claim 1, characterized in that the second surface of said second optical element satisfies the following condition (5):

$$-4 \leq R1P_o/f \leq -0.1 \quad (5)$$

where $R1P_o$ is a radius of curvature of the second surface of the second optical element, and f is a focal length of the overall decentered optical system.

12. The decentered optical system as recited in claim 1, characterized in that the second surface of said second optical element satisfies the following condition (5'):

$$-4.2 \leq R1P_o/f \leq -0.4 \quad (5')$$

where $R1P_o$ is a radius of curvature of the second surface of the second optical element, and f is a focal length of the overall decentered optical system.

13. The decentered optical system as recited in claim 1, characterized by further including a third optical element that is located on a third surface side of said first optical element, that has at least two, mutually decentered optical surfaces including a first surface and a second surface through which light can transmit, and that is filled inside with a medium having a refractive index greater than 1.

14. The decentered optical system as recited in claim 13, characterized in that the third surface of said first optical element is a half mirror which reflects off light from within said first optical element and through which light from outside said first optical element transmits.

15. The decentered optical system as recited in claim 13, characterized in that the third surface of said first optical element has a hologram structure varying in properties with an angle of incident light.

16. The decentered optical system as recited in claim 13, characterized by further including a quantity-of-light control for controlling the quantity of light outside the first surface side of said third optical element.

17. An image projection apparatus, characterized by comprising:

the decentered optical system as recited in claim 1, and an image display device located in a position opposite to the first surface of said first optical element for displaying images.

18. An imaging apparatus, characterized by comprising:

the decentered optical system as recited in claim 1, an imaging device located for imaging in a position opposite to the first surface of said first optical element, and an aperture stop located in a given position opposite to the second surface of said second optical element.

19. A decentered optical system, comprising:

a first optical element comprising at least three, mutually decentered optical surfaces including a first surface through which light can transmit, a second surface through which light can transmit and which is capable of internal reflection, and a third surface through which light can transmit and which is capable of internal reflection, wherein said first optical element is filled inside with a medium having a refractive index greater than 1, and at least one of the three optical surfaces has a rotationally asymmetric configuration, a second optical element located on a second surface side of said first optical element and comprising at least two, mutually decentered optical surfaces including a first surface through which light can transmit and a second surface through which light can transmit and which has an outwardly concave configuration, wherein said second optical element is filled inside with a medium having a refractive index greater than 1, and a third optical element located on a third surface side of said first optical element and comprising at least two, mutually decentered optical surfaces including a first surface through which light can transmit and which has an outwardly convex configuration and a second surface through which light can transmit, wherein said third optical element is filled inside with a medium having a refractive index greater than 1.

20. The decentered optical system as recited in claim 19, characterized in that said second surface of said second optical element, and the first surface of said third optical element has such a configuration as to have a plurality of symmetric surfaces in an effective area through which a light beam passes.

21. The decentered optical system as recited in claim 20, characterized in that the second surface of said second optical element is defined by a spherical surface, an aspheric surface, or a toric surface.

22. The decentered optical system as recited in claim 19, characterized in that said second optical element, and said third optical element satisfies the following condition (6):

$$0.1 \leq |R2Pi - R1P_o|/D2Pi1P_o \leq 12 \quad (6)$$

where R2Pi is a radius of curvature of the first surface of the third optical element, $R1P_o$ is a radius of curvature of the second surface of the second optical element, and $D2Pi1P_o$ is a distance between the first surface of the third optical element and the second surface of the second optical element in a direction along a center chief ray of a light beam.

23. The decentered optical system as recited in claim 19, characterized in that the second surface of said first optical element and the first surface of said second optical element have the same surface configuration in said effective area.

24. The decentered optical system as recited in claim 19, characterized in that the second and third surfaces of said first optical element are opposed to each other, and the third surface of said first optical element is defined by a concave reflecting surface concave on the second surface side of said first optical element.

25. The decentered optical system as recited in claim 19, characterized in that the third surface of said first optical element is cemented to the second surface of said third optical element.

26. The decentered optical system as recited in claim 19, characterized in that the third surface of said first optical element is defined by a rotationally asymmetric surface.

27. The decentered optical system as recited in claim 19, characterized in that the second surface of said first optical element is defined by a rotationally asymmetric surface.

28. The decentered optical system as recited in claim 19, characterized in that the first surface of said first optical element is defined by a rotationally asymmetric surface.

29. The decentered optical system as recited in claim 19, characterized in that said second optical element and said third optical element satisfy the following condition (7):

$$0.1 \leq \phi2/\phi1 \leq 1.3 \tag{7}$$

where $\phi1$ is a power of the second surface of said second optical element at a point of intersection with a center chief ray, and $\phi2$ is a power of the first surface of said third optical element at a point of intersection with the center chief ray.

30. The decentered optical system as recited in claim 19, characterized in that the third surface of said first optical element is a half mirror which reflects off light from within said first optical element and through which light from outside said first optical element transmits.

31. The decentered optical system as recited in claim 19, characterized in that the third surface of said first optical element has a hologram structure varying in properties with an angle of incident light.

32. The decentered optical system as recited in claim 19, characterized by further including a quantity-of-light control for controlling the quantity of light outside the first surface side of said third optical element.

33. An image projection apparatus, characterized by comprising:

the decentered optical system as recited in claim 19, and an image display device located in a position opposite to the first surface of said first optical element for displaying images.

* * * * *